United States Patent [19]
Penn

[11] Patent Number: 5,848,198
[45] Date of Patent: Dec. 8, 1998

[54] METHOD OF AND APPARATUS FOR ANALYZING IMAGES AND DERIVING BINARY IMAGE REPRESENTATIONS

[76] Inventor: Alan Irvin Penn, 14 Clemson Ct., Rockville, Md. 20850

[21] Appl. No.: 371,918

[22] Filed: Jan. 12, 1995

Related U.S. Application Data

[63] Continuation-in-part of Ser. No. 133,394, Oct. 8, 1993, abandoned.

[51] Int. Cl.⁶ .................................................. G06K 9/36
[52] U.S. Cl. .......................................................... 382/276
[58] Field of Search ................................... 382/276, 278, 382/295, 296, 298, 232, 248, 249

[56] References Cited

U.S. PATENT DOCUMENTS

| | | | |
|---|---|---|---|
| 3,898,617 | 8/1975 | Kashioka et al. | 382/181 |
| 4,281,312 | 7/1981 | Knudson | 382/232 |
| 4,694,407 | 9/1987 | Ogden | 364/518 |
| 4,831,659 | 5/1989 | Miyaoka et al. | 382/232 |
| 4,839,807 | 6/1989 | Doi et al. | 364/413.13 |
| 4,907,156 | 3/1990 | Doi et al. | 32/128 |
| 4,941,193 | 7/1990 | Barnsley et al. | 382/249 |
| 4,941,194 | 7/1990 | Shimura | 382/232 |
| 5,065,447 | 11/1991 | Barnsley et al. | 382/249 |
| 5,123,054 | 6/1992 | Hara et al. | 382/128 |
| 5,133,020 | 7/1992 | Giger et al. | 382/128 |

OTHER PUBLICATIONS

T. Matsumoto et al., "Potential Usefulness of Computerized Nodule Detection in Screening Programs for Lung Cancer," Jun. 1992, *Investigatve Radiology*, pp. 471–475.

M. Rabbani et al., "Image Compression Techniques for Medical Diagnostic Imaging Systems," May 1991, *Journal of Digital Imaging*, vol. 4, No. 2, pp. 65–78.

C–C Chen et al., "Fractal Feature Analysis and Classification in Medical Imaging," *IEEE Transactions on Medical Imaging*, vol. 8, No. 2, Jun. 1989, pp. 133–142.

R. Gonzalez et al., *Digital Image Processing*, Second Edition, Addison–Wesley Publishing Company, pp. 130–135.

T. Ramabadran et al., The Use of Contextual Information in the Reversible Compression of Medical Images, *IEEE Transactions on Medical Imaging*, vol. 11, No. 2, Jun. 1992, pp. 185–195.

C. Priebe et al., "The application of fractal analysis to mammographic tissue clarification," *Cancer Letters*, 77 (1994), pp. 183–189.

*Primary Examiner*—Jose L. Couso
*Attorney, Agent, or Firm*—Lowe Hauptman Gopstein & Berner

[57] ABSTRACT

Data from multiple image sources are processed with a memory storing a library of data catalogs, each corresponding to one of the image sources. The catalogs have entries corresponding to the images. Each catalog entry has signal values specifying how to (1) generate an Analysis Image corresponding to the source image, (2) generate binary images from the Analysis Image, (3) model the binary images with fractal mathematics, and (4) generate an output signal related to the Original Image. The Analysis Image contains transformed pixel data in which pixels correspond spatially to the Original Image but in which gray-scale planes are more easily segmented and modeled. Binary Images conforming to standards specified in the catalog are constructed as segments of gray-scale planes within the Analysis Image. Binary models are formed with Hutchinson operators suitably constrained to force finite approximations to attractors to conform to standards specified in the catalog. Reversible output signals include Original Image representations having lower prediction-error entropy; irreversible output signals include representations of the Original Image suitable for feature analysis.

41 Claims, 33 Drawing Sheets

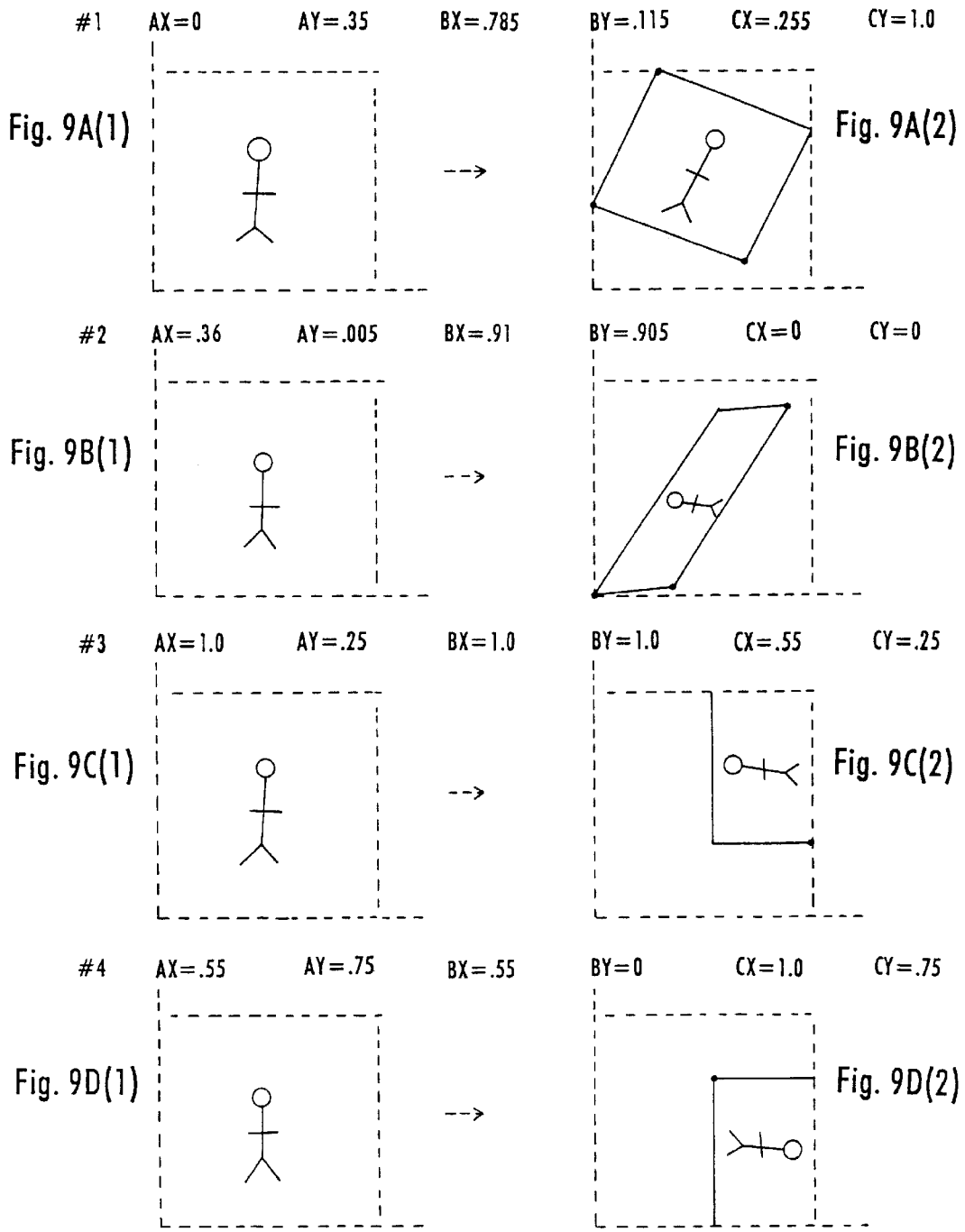

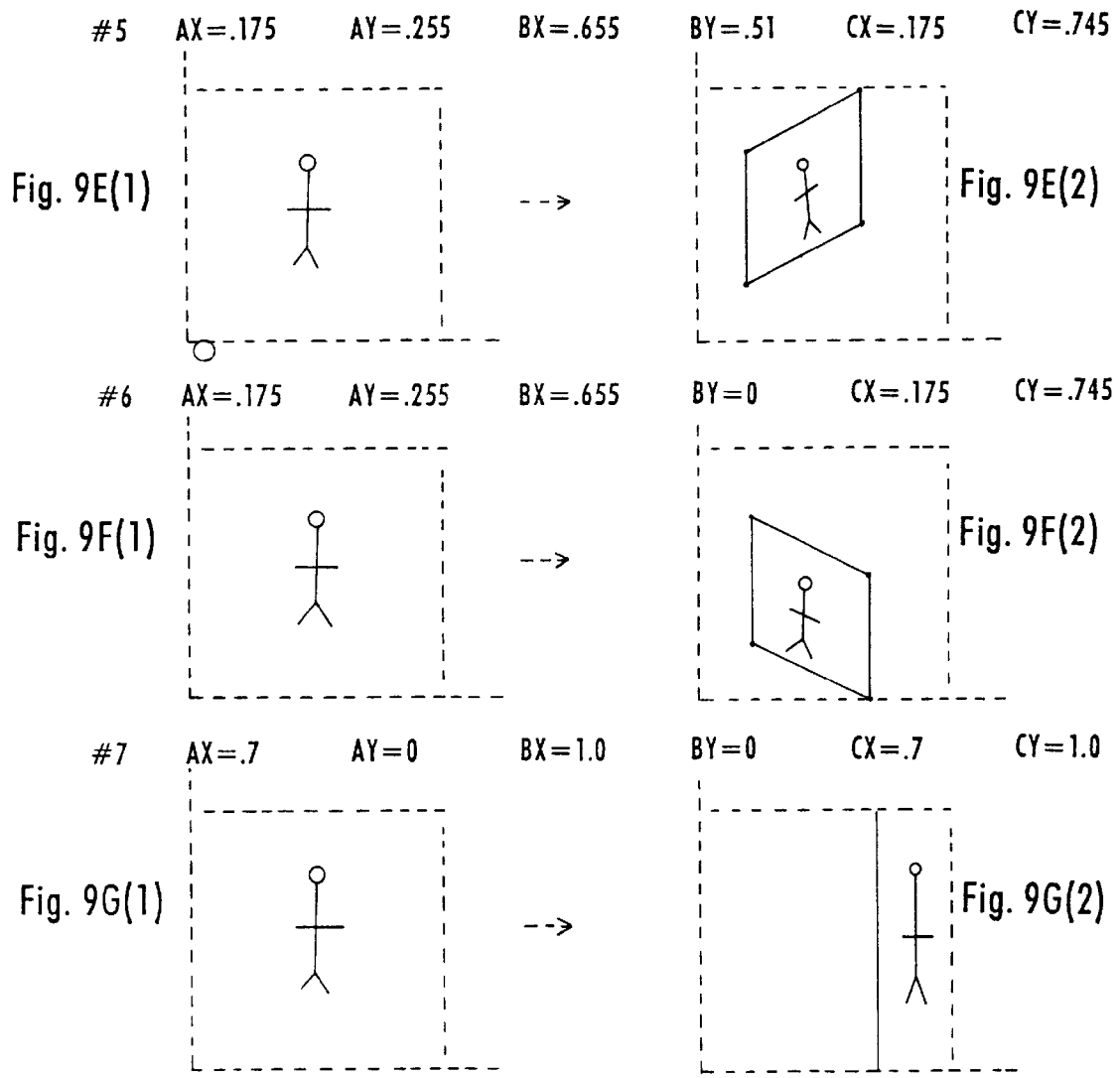

Fig. 18

| Level | 1 | 2 | 3 | 4 | VARIABLE 5 | 6 | 7 | 8 | 9 | 10 | 11 | 12 | 13 | ERROR POINTS |
|---|---|---|---|---|---|---|---|---|---|---|---|---|---|---|
| 15 |   |   |   |   |   |   |   |   |   |   |   |   |   | 233 |
| 16 | 0 | 0 | 1 | -1 | 7 | -1 | 0 | 0 | -7 | -8 | -4 | 0 | -4 | 219 |
| 17 | 0 | 0 | 0 | 4 | 8 | -3 | 0 | 0 | -4 | -2 | 0 | 4 | -8 | 209 |
| 18 | 1 | 0 | 1 | 0 | 3 | -1 | 0 | 0 | -4 | -4 | 0 | 7 | -8 | 219 |
| 19 | 0 | 0 | 0 | 0 | 0 | -3 | 0 | 0 | -8 | -8 | -4 | 0 | -4 | 158 |
| 20 | 0 | -2 | -2 | 0 | 0 | 0 | 0 | 0 | -1 | -3 | 0 | 0 | -7 | 124 |
| 21 | 0 | 0 | 0 | 1 | 4 | 0 | 0 | -2 | 0 | -3 | 0 | -2 | -3 | 111 |
| 22 | -1 | 0 | 0 | 0 | 0 | -1 | -1 | 0 | -3 | -3 | -2 | -1 | 0 | 117 |
| 23 | 0 | -1 | 0 | 0 | -1 | 0 | -3 | 0 | -3 | -3 | 0 | -1 | -3 | 124 |
| 24 | 0 | -1 | 0 | -8 | 0 | 0 | 0 | 0 | 0 | -3 | 0 | -1 | -3 | 122 |
| 25 | 0 | 0 | -4 | 1 | 0 | 0 | -11 | 1 | -4 | 0 | -2 | -2 | 0 | 107 |
| 26 | 0 | 0 | -4 | 0 | 0 | 0 | 0 | 0 | 0 | 0 | -1 | -1 | 0 | 97 |
| 27 | -1 | -1 | 0 | 0 | 1 | 0 | 0 | 0 | 0 | 0 | -1 | 0 | -4 | 111 |
| 28 | 0 | 0 | -3 | 0 | 0 | 0 | 0 | 0 | -3 | -4 | -2 | 1 | 0 | 109 |
| 29 | 1 | 0 | 0 | 1 | 0 | -1 | -2 | 0 | -10 | -1 | 0 | 3 | 0 | 102 |
| 30 | 1 | 1 | 0 | 0 | 0 | 0 | 0 | 2 | -3 | -1 | 0 | 1 | -4 | 97 |
| 31 | 0 | 0 | 0 | 0 | -1 | 1 | 0 | 0 | -4 | 0 | 0 | -3 | -4 | 109 |
| 32 | -2 | 0 | 1 | 0 | 0 | 0 | 1 | 4 | -2 | -5 | -2 | 0 | 0 | 123 |
| 33 | 0 | 1 | 0 | 0 | 0 | 0 | 3 | 0 | -2 | -1 | -2 | -1 | 0 | 113 |
| 34 | 0 | 0 | -1 | 0 | 0 | 0 | 4 | 0 | -3 | -3 | -1 | -5 | 1 | 107 |
| 35 | 0 | 0 | 0 | 0 | 0 | 1 | 0 | 0 | -4 | -5 | 0 | -4 | -4 | 127 |
| 36 | 0 | 3 | 0 | 0 | 0 | 0 | 0 | 0 | -8 | -2 | 0 | 0 | -3 | 126 |
| 37 | -1 | 0 | 1 | 0 | 0 | 1 | 0 | 0 | -1 | -1 | 0 | -3 | -3 | 135 |
| 38 | 0 | 0 | -1 | 0 | 0 | 0 | 0 | 0 | -3 | -6 | 1 | -2 | -5 | 148 |
| 39 | 3 | 0 | 0 | 0 | 0 | 0 | 0 | 1 | -3 | -1 | 1 | 1 | -7 | 162 |
| 40 | 2 | -1 | 0 | 0 | 0 | 0 | 2 | 0 | 0 | -4 | -2 | 1 | 0 | 183 |
| 41 | 1 | 0 | 0 | 1 | 0 | 0 | 0 | 0 | -10 | -2 | -2 | 0 | 1 | 183 |
| 42 | 0 | 0 | 0 | 0 | 0 | 0 | 0 | 0 | -2 | -4 | -4 | -1 | 0 | 201 |
| 43 | 0 | 0 | -1 | 0 | 0 | 0 | 0 | 0 | 0 | -3 | -2 | 0 | 2 | 184 |
| 44 | 0 | 0 | -1 | 0 | -1 | -1 | 3 | 2 | -7 | -4 | -3 | 1 | 0 | 164 |
| 45 | 0 | 0 | 0 | 1 | 0 | 0 | 0 | 1 | -1 | 0 | -2 | -1 | -1 | 179 |
| 46 | 1 | 0 | 1 | 0 | -1 | 0 | 0 | 0 | 0 | -2 | -2 | 0 | 0 | 171 |
| 47 | 0 | 0 | 0 | 0 | 0 | 0 | 2 | 0 | 0 | -2 | 0 | -4 | 0 | 180 |
| 48 | 2 | 0 | 0 | -1 | 0 | 0 | 0 | 0 | 0 | -1 | -3 | 0 | 0 | 189 |
| 49 | 0 | 0 | -2 | 0 | 0 | 1 | 4 | 0 | -4 | -3 | -1 | -1 | 2 | 148 |
| 50 | 0 | 0 | 0 | 0 | 0 | 0 | 0 | 0 | 0 | 0 | 0 | 0 | 0 | 157 |
| 51 | 0 | 0 | -2 | 0 | 2 | -1 | 0 | 0 | -7 | -3 | 0 | 0 | 1 | 144 |
| 52 | 0 | 0 | 0 | 0 | 0 | 0 | 0 | 0 | -3 | 0 | -2 | 0 | 0 | 160 |
| 53 | 1 | -2 | -1 | 0 | 0 | 0 | 0 | 0 | -3 | -3 | 1 | 0 | -2 | 202 |

Fig. 20

| CHANGE | CODE | OCCURRENCES |
|---|---|---|
| -11 | 00001010 | 1 |
| -10 | 01001110 | 2 |
| -9 | n/a | - |
| -8 | 010000 | 6 |
| -7 | 000011 | 5 |
| -6 | 00001011 | 1 |
| -5 | 0100110 | 4 |
| -4 | 0001 | 24 |
| -3 | 0110 | 32 |
| -2 | 0101 | 31 |
| -1 | 001 | 47 |
| 0 | 1 | 278 |
| 1 | 0111 | 38 |
| 2 | 00000 | 9 |
| 3 | 010001 | 6 |
| 4 | 010010 | 6 |
| 5 | n/a | - |
| 6 | n/a | - |
| 7 | 01001111 | 2 |
| 8 | 0000100 | 2 |
| 9 | n/a | - |
| 10 | n/a | - |
| 11 | n/a | - |

METHOD OF AND APPARATUS FOR ANALYZING IMAGES AND DERIVING BINARY IMAGE REPRESENTATIONS

RELATION TO CO-PENDING APPLICATION

The present application is a Continuation in Part of my application, Ser. No. 08/133,394, filed Oct. 8, 1993 now abandoned.

FIELD OF THE INVENTION

The present invention relates to a method of and apparatus for automatically processing digitized images for detecting, identifying, and analyzing anomalies and abnormalities within the images and for compressing, filtering and processing the digitized images. The invention also relates to a method of and apparatus using fractal mathematics for modeling and generating parameters for (1) digitized images and (2) fractal characteristics used for diagnostic and analytic purposes.

BACKGROUND AND DISCUSSION OF THE INVENTION

Images obtained from radiography (X-rays), magnetic resonance imaging (MRI), ultrasound and other medical imaging techniques are commonly used for detecting lesions, nodules, and other anatomical abnormalities. However, many significant abnormalities are not found due to observer error. Studies have shown that in visual analysis of chest X-ray images, radiologists fail to diagnose existing pulmonary nodules in more than 30% of cases.

The importance of developing a system for accurately alerting radiologists to locations of potential pathological conditions is well established in the medical community; to this end, a variety of schemes have been proposed for automatic detection. Literature describes systems employing geometric techniques applied to edge-enhanced images, linear and nonlinear filtering in difference imaging, identification of specific nodule-like shapes, and texture analysis. The importance of developing efficient methods of compressing and transmitting image data has been specifically noted by the National Institute of Medicine and the United States Public Health Service.

U.S. Pat. No. 4,907,156 (Doi) discloses a method of creating a signal enhanced image by removing low frequency background data caused by anatomical structures. An image having an enhanced signal-to-noise ratio is compared with an image having a suppressed signal-to-noise ratio. The present invention shares a similarity with Doi to the extent that one of the goals is to filter out image background structures. The present invention differs from Doi by the way the background structures are filtered, leading to derivation of diagnostic parameters and significantly improved data compression.

U.S. Pat. No. 5,133,020 (Giger) discloses a method wherein two or more breast images are correlated using cumulative gray-level frequency distributions to determine variations and abnormalities. The present invention is similar to Giger because cumulative gray-scale image levels are analyzed to determine abnormalities. The present invention differs from Giger in that abnormalities are detected by using (1) fractal modeling of binary images (rather than histogram analysis at the various gray-scale levels) and (2) analysis of a single image (rather than two or more). Hence, the present invention can be used when a single image is acquired whereas Giger's only described embodiment requires acquisition of at least a pair of images.

Fractal analysis has been proposed to classify anatomical structures and diagnose diseased conditions. The literature reflects a variety of articles exploring fractal analysis to the lung, heart, liver, brain, breast, vascular tree, urinary ducts, bronchial airways, bowel folds, retinal vessels, and dental radiographs. The present invention shares a similar goal and approach with prior art literature by analyzing the fractal form of the anatomical structure to obtain accurate models of normal conditions, leading to detection and identification of abnormalities. The present invention differs from these works, inter alia, in the methodology used for (1) modeling anatomical features and (2) representing the image data in a data signal. In addition, abnormalities are identified in response to features derived from gray-scale level variations.

The present invention uses fractal mathematics to generate a signal containing a representation of image data. The representation may be either reversible or irreversible. A reversible representation of an image results from a process of image to data transformation wherein the data can be transformed back to the image; an irreversible representation of an image results from a process of image to data transformation wherein the data cannot be transformed back to the image. The invention generates reversible and irreversible representations which cannot be generated with other known apparatuses. The apparatus and method of the invention also transforms the reversible representation back to the original data.

In order to understand the innovation and importance of the reversible and irreversible representations generated by the invention it is necessary to understand the present state of the art.

Reversible representations of the image data are used, inter alia, to transform the image data into a form which is more readily compressed using entropy or statistical coding. In general, the reversible representations are used to decorrelate the pixel values so that subsequent statistical coding is more efficient. Three forms of reversible decorrelation are normally used: predictive, transform and multiresolution. (See, e.g., Ramabadran TV, Chen K. "The Use of Contextual Information in the Reversible Compression of Medical Images," *IEEE Transactions on Medical Imaging,* 111. No.2 (June 1992), 185–195). The apparatus and method of the present invention can be used to generate a reversible representation having removed regional redundancies different from those of existing methodologies. The present invention can be used in conjunction with existing systems.

Reversible representations of the image are also used as a compressed form of the image. As an example, when entropy coding is applied directly to the image gray-scale values the result is a reversible representation containing less data than the original image data. The method of the present invention can be used to generate a reversible representation of the image data containing less data than the original image data and differs from known reversible representations.

Reversible compression schemes are generally considered to have two steps: decorrelation and coding. In fact, I have discovered reversible compression schemes have three steps: specification of a decorrelation process, decorrelation and coding. As an example, in the Joint Photographic Experts Group (JPEG) lossless industry standard, the decorrelation process is specified by one of a limited number of options indicating the direction from which a pixel value is predicted. In most applications, the decorrelation process is pre-specified. However, in one process performed in accordance with the present invention the source image is analyzed and a decorrelation process is defined for the specific image. The amount of information necessary to specify the decorrelation process is less than the added savings realized in the decorrelation and coding steps. Thus the output signal, including the coded decorrelation process and the coded decorrelated image data, is an improved form of image compression.

The coded decorrelation specification produced by the process of the invention is a second order correction to a predefined decorrelation process. As an example, if the predefined decorrelation process is an option of JPEG lossless, the coded decorrelation specification defines additional steps for transforming pixel values of the source image before the JPEG is decorrelated. A single process of the invention operates on all images within a class but produces unique signals defining the additional decorrelation steps for each image within the class.

The predefined decorrelation generates a derived image upon which the analysis is performed. A derived image which decorrelates the pixel values is typically referred to with the term "error image" or an equivalent term such as "decorrelated image" or "difference image." (See, e.g. Ramabadran, ibid). The term "decorrelated image" is used herein to mean the decorrelated image obtained from the predefined decorrelator.

The relationship between the original image and the decorrelated image is one in which either image can be derived from the other. As a consequence, any signal containing information about one image also contains information about the other image and any reversible transformation on one image induces a related reversible transformation on the other image. Thus, if the decorrelated image is transformed, the transformation induces a corresponding change to the original image; if the transformation on the decorrelated image produces a change in entropy of the decorrelated image, the transformation induces a corresponding change in original image compressibility.

If the goal is, for example, to improve the original image compressibility by transforming the pixel values of this original image, this transformation can be specified by defining the equivalent transformation on the decorrelated image. It is then a simple matter to translate the transformation on the decorrelated image back to the original. The specification of the corresponding transformation on the original image is the specification of a second order decorrelation process which is to be encoded. For ease of explanation, the preferred embodiment is concerned with a method and device which modifies the pixel values of a decorrelated image obtained using a JPEG lossless decorrelator so there is a wanted change or wanted signal of the original image. Thus the decorrelated image becomes the image on which analysis is performed. The original image is used to obtain quantitative measures induced by transformations on the decorrelated image. Those skilled in the art can readily generate a signal for the original image which corresponds to the signal from the decorrelated image.

The preferred embodiment is described in terms of an Original Image and an Analysis Image (the decorrelation image) in this context. However, the Analysis Image can equivalently be thought of as another form of source image from which an information signal is obtained. The Analysis Image may be derived from and related to the Original Image in ways other than decorrelation. An example is an Analysis Image which enhances features of the Original Image. As a second example, the Analysis Image and the Original Image are the same.

Irreversible representations of the image data are used, inter alia, for feature analysis, i.e., to quantify the probability that the image contains an object with a certain form. As an example, feature analysis uses fractal characterizations to identify when a portion of a mammographic image has fractal textual features which are known to match fractal textual features of tumors. Data used for this textual analysis include derived characterizations relating to fractal dimensionality. (See, e.g., Priebe C. E., Soka J. L., Lorey R. A., Rogers G. W., Poston W. L., Kallergi M., Qian W., Clarke L. P., Clark R. A. "The Application of Fractal Analysis to Mammographic Tissue Classification," *Cancer Letters* 77 (1994) 183–189.) However, it is known that pathologies can also be identified by the orientation of edges found within a mammographic image. (See, e.g., Kegelmeyer W. P. Jr, Pruneda J. M., Bourland P. D., Hillis A. R., Riggs M. W., Nipper M. L. "Computer-aided Mammographic Screening for Spiculated Lesions," *Radiology*, 191. No.2 (May 1994) 331–337). The present invention uses fractal modeling to generate statistics related to edge-orientation characteristics which are suitable for feature analysis. Prior art disclosures have used estimates of local fractal dimensionality to describe texture and to facilitate the identification of edges (e.g., see Chen, ibid). No known prior art disclosures have used fractal models to generated edge-orientation characteristics which are developed from a regional, rather than local, analysis of pixel data. The present invention can use fractal models to generate images in which features are attenuated or enhanced.

The field of fractal mathematics was invented by Benoit B. Mandelbrot in 1975. U.S. Pat. No. 4,941,193 (Barnsley-1) discloses a method of performing fractal image compression using an iterated function system (IFS). Barnsley-1 describes methods of generating fractal transformations wherein binary images are modeled using fractal transformations, and for extending binary images to multiple gray-scale or color images. Barnsley-1 discloses two methods of drawing fractals. One of these methods, referred to as "the chaos game," uses a partial sequence of random or pseudo-random integers to generate a set of points which trace out an approximation to the true fractal (the "attractor"). The second, referred to as the multiple reduction copying machine (MRCM), generates a sequence of images of increasing complexity, such that each image of the sequence is closer to the attractor. The present invention is similar to Barnsley-1 in that fractal geometry is used to model natural objects. The present invention differs from Barnsley-1 because, inter alia, in the present invention:

(1) specified linear dependencies between affine transformation coefficients restrict a fractal model to match the form of a dominant fractal like feature;

(2) a small number of affine transformations models each entry in a catalog of forms;

(3) images with multiple gray-scale levels are analyzed using plural independently modeled binary images which are derived from the original image;

(4) procedures used for analysis of an image depend (a) on the class from which the image is obtained and (b) which one of plural processes is selected; the analysis procedures use contextual information known to exist in all images in that class for that process;

(5) the measure used in evaluating the performance of modeling a binary image need not be a Hausdorff distance between the model and a target image; the measure is, in certain instances, related to the value of a payoff function (e.g., entropy of a modified image) derived from, inter alia, the fractal model;

(6) procedures used for generating an image of a fractal model depend on the form of the target binary analysis images for the specific class of images and the selected process. The procedures use known information about the targets to achieve performance superior to the two methodologies for generating fractal images disclosed in Barnsley-1.

Two procedures are used in accordance with the present invention. In the first procedure, a single predetermined pseudo-random sequence for the chaos game for reasons described infra. The prior art describes the use of plural sequences based on efficiencies and capabilities of computer environments. In the second procedure, a modified MCRM is used which assures rapid convergence for a class of binary images. (Peitgen H.-O., Jurgens H., Saupe D. *Chaos and Fractals, New Frontiers of Science*, Springer-Verlag, 1992.)

The invention enables development and utilization of fractal "standards" catalogs for modeling recurrent features found within an image. Each standard is defined by a small number of independent variables, a system of dependencies which can be used to define a Hutchinson operator and other characteristics described infra. If there are I independent variables in a standard then there is a function f defined as follows from $$\prod_{i=1}^{I} [0,1]_i$$

to a unit square of pixels, where the pixels are ordered:

The arrangement of the pixels defines a natural equivalence relationship for partitioning a unit square into rectangular pieces such that the pixels are representatives of the equivalence classes. Each point in a domain of f defines a Hutchinson operator having an attractor which is a subset of the unit square. The image of f is defined to be the pixel values of the ordered set of pixels determined as follows: the value for each pixel is 1 if the equivalence class of the pixel has a non-empty intersection with an attractor of the Hutchinson operator; otherwise the value of the pixel is 0.

The domain of f is approximated by a finite number, L, of lattice points in $$\prod_{i=1}^{I} [0,1]_i.$$

Hence f is approximated by a finite sequence $\{S_j=1,L\}$ where $S_j$ maps the integer j to a lattice point and then the lattice point to the image under f.

In general, given an arbitrary $S_j$, it is not possible to identify which pixels have value 1 and which have value 0. This is true since the attractor of a Hutchinson operator may come arbitrarily close to the boundary between partition rectangles, and finite methods can only approximate this attractor. Consequently, approximations to the attractor may intersect incorrect partition rectangles and assign 1's and 0's to the wrong pixels.

In the prior art, when the chaos game is utilized, a partial sequence of random or pseudo-random integers approximates the attractor for each j. The error in the approximation to the attractor is a function of the specific random or pseudo-random partial sequence used. If M random numbers are needed for each j, then the first M numbers of the sequence are used for j=1, the second M numbers for j=2, etc. The advantage of these methods is that suitably constructed random or pseudo-random sequences are readily available on most computers systems and need not be specified by a predetermined algorithm. The disadvantage is that the approximations to the attractor which are generated depend on lattice point ordering; moreover if a lattice point is revisited, the approximation may be different. These methods effectively approximate $S_j$ by a random set having values that are distributions of $\{0,1\}$ partitions of the unit square.

In one process of the preferred embodiment of the present invention, the approximations to the attractor are regenerated for image coding and compression, as well as decompression, implementation of convergence algorithms and other uses. Hence $S_j$ is approximated by a partial sequence which defines a specific partition rather than a random set of possible partitions. This is performed by using the same pre-selected partial sequence of random integers for the evaluation of each j.

In a second process of the disclosed embodiment, the MRCM method is modified to enable a rapid convergence of the sequence of images to the attractor. The modification involves constructing the binary images so the top left portion of each image is black and the lower right portion of each image is white. Each "lens" in the MRCM is masked so it always produces a reduced image with the top left having a black color. The top-left of a collage formed from these reduced images is then forced so it is also black. This modified collage is used as the input for the next iteration. This procedure rapidly converges to an image which is fixed under the modified MRCM; this fixed image is a close approximation to the true attractor.

U.S. Pat. No. 5,065,447 (Barnsley-2) discloses a fractal image compression method wherein a target image is divided into a fine grid and similarities among pieces of the grid are identified. The present invention shares a similarity with Barnsley-2 only to the extent that fractal transformations are used. The present invention models only a small number of self-similarities inherent within recurrent structures; Barnsley-2 models a large number of similarities between different small grid pieces which are selected without regard to contextual importance.

A contractive affine transformation maps an image into a reduced copy of itself. Each affine transformation is defined by six numbers defining how an image plane is rotated, translated, inverted and sheared. Contractivity constrains the maps to those which also shrink images relative to a standard metric in the Euclidean plane.

A Hutchinson operator, formed from a collection of contractive affine transformations, maps an image into a collage of reduced copies. When a Hutchinson operator is iterated, the resultant sequence of images converges to an image, called the attractor which is fixed under that operator. This attractor is determined by, and identified with the Hutchinson operator; it is independent of the original image which started the iteration. Given the Hutchinson operator, the attractor is the corresponding pictorial representation.

Attractors which can be generated from Hutchinson operators include a variety of naturally occurring self-similar structures and geometric patterns which can be tiled by a collage of reduced copies of the target image. The reduced copies can be shrunk, rotated, inverted and sheared.

THE INVENTION

In the present invention a matrix of pixel values representing an Analysis Image is analyzed and a matrix of pixel values representing corresponding pixels of an Original Image is processed. The matrices representing the Analysis Image and the Original Image can be the same or different. The invention performs the following steps for each source image:

(1) selecting (a) a process applicable to a class of images from which the Original Image is drawn, i.e., of which the Original Image is member, and (b) specification information for the class of images from which the Original Image is drawn; (The process and specification information are preferably selected from a data library which stores them.)

(2) deriving information from the pixel values of the Original Image, and generating a matrix of pixel values for a corresponding Analysis Image as indicated by specification information selected in step (1);

(3) generating a set of binary images from data representing the Analysis Image data as indicated by the specification information selected in step (1);

(4) modeling the binary images of the set using specification information selected in step (1). Each binary model is uniquely specified by (a) affine transformation parameters (b) specifications obtained in step (1) and (c) other data derived from the pixel values of the Analysis Image;

(5) generating a signal containing information about the source image in response to the affine transformation parameters, specifications, and derived data obtained in step (4).

The data representation of the Original Image obtained in step (5) is stored in memory or transmitted to a local or remote site for further use. In certain embodiments the data representation is reversible, in which case the Original Image can be reconstructed from the generated signal. In other embodiments, the Original Image data representation obtained in step (5) is non-reversible, in which case the Original Image cannot be reconstructed from the generated signal. The pixel values of the Original Image can be reconstructed from the transmitted or stored reversible data representation.

The method of the present invention is able to operate in three modes, namely Modes 1, 2 and 3.

In Mode 1, the library of specifications is updated.

Mode 2 is used to generate a data signal derived from the source image and store or transmit the data signal in a form which can be used by other processes and apparatuses. Examples of data which are derived and used in subsequent processes are: (a) statistics of shape, form, texture, and edge characteristics of objects in the image (these statistics are used inter alia by computer-aided diagnostic systems); (b) representations of transformed images to be supplied to existing industry standard data compression systems; (c) coded representations of images to be supplied to a picture archiving and storage system; (d) coded representations of images in which features are attenuated or enhanced.

In Mode 3, the pixel values of the Original Image are reconstructed.

Each data library of the type used in step (1) contains stored signals representing:

(i) a coded procedure for obtaining a matrix of pixel values representing the Analysis Image from the matrix of pixel values representing the Original Image;

(ii) a catalog of "standard" fractal-like forms in the Analysis Image;

(iii) a coded method of segmenting the Analysis Image according to the locations of the fractal-like forms;

(iv) a coded procedure for obtaining a set of binary images for each segment;

(v) a coded procedure for modeling the binary images; and (vi) a specification of output data.

A structure or form is considered to be fractal-like if it can be modeled to a high degree of accuracy by a Hutchinson operator with a small number of affine transformations. Accordingly, linear forms within the Analysis Image are included as primitive fractal forms. Linear forms frequently occur due to artifacts in the imaging equipment. Fractal-like forms of Original Images are known from prior and continuing research in certain fields, particularly anatomical forms in the medical field, and are readily obtained for the Analysis Images.

As an example of an Analysis Image, the Original Image is a gray-scale level pixel representation of a chest x-ray film and the Analysis Image is a difference image in which pixels of the Analysis Image spatially correspond to pixels in the Original Image. Numeric values of pixels in the Analysis Image are defined as the gray-scale difference between pixel values of the Original Image and the average gray-scale value of the pixels of the Original Image immediately above and immediately to the left of the pixels of the Original Image. The numeric value of each pixel in the left column of the Analysis Image equals the difference between the values of (a) the pixel immediately above a particular pixel of interest and (b) the particular pixel of interest; the value of each pixel in the top row equals the difference between the values of (a) the pixel immediately to the left of the particular pixel and (b) the particular pixel of interest. The numeric value of the pixel which is in both the left column and the top row is zero. For simplicity of description, the gray-scale values of the derived image have both positive and negative values. An example of a fractal-like form in a chest x-ray is a crossing rib pattern. A segment of such a pattern can be defined as: the part of a standard digitized chest x-ray image encompassing a single quadrilateral space defined by four ribs: the posterior segments of two adjacent ribs, which are roughly horizontal, and the anterior segments of two other adjacent ribs, which angle obliquely. A segment in the Analysis Image contains pixels corresponding to pixels in the segment in the Original Image.

Subimages corresponding to entries of the catalog are identified. A variety of methods are available for such identification, including known placement of fractal-like features, visual identification, and pattern matching using geometric and fractal algorithms.

For each segment a set of binary images is obtained. The set of binary images normally contains multiple binary images, but may contain a single image. As an example, binary images are defined as follows: Each binary image contains a corresponding binary element for each pixel in a subset of the Analysis Image. The binary elements are constrained to be "1" in a solid portion on the top and left and are "0" in a solid portion on the bottom and right. The boundary between the 1's and 0's traces a line corresponding roughly to Analysis Image pixels having a common gray-scale value, that is, a common "difference value" in the Original Image. This binary image thus retains information about the Original Image. Each binary image has a structure matching the specification but has specific characteristics relating to the information content of the derived image segment.

The binary image defined above is uniquely specified by the boundary between the 1's and 0's. The binary image is modeled as a fractal using a modified form of the MRCM methodology. The modified MRCM methodology is based on the fact that the binary images are constructed in a way which insures that the top left portion contains only 1's (black on MRCM output) and the lower right portion contains only 0's (white on MRCM output). Each "lens" in the MRCM is masked so it always produces a reduced image with the top left portion of the reduced image containing only 1's and bottom right containing only 0's. The entire image produced by the MRCM is masked so that the top-left of the collage contains only 1's and the bottom right of the collage contains only 0's. This modified collage is the input for the next iteration. This procedure rapidly converges to an image which is fixed under the modified MRCM; the fixed image is the model of the Hutchinson operator.

The boundary between the 1's and 0's, or equivalently the partitioned image, is specified by a small number of affine transformation parameters. Accordingly, information content of the Original Image is indicated by the affine transformation values which are used to generate the boundary in the binary image and the common gray-scale value of pixels in the Analysis Image which define the boundary.

Signals representing the affine transformation parameters and the common gray-scale value are combined to transform the pixel values in the Original Image. The Transformed Image displays improved compressibility when JPEG lossless industry standard is used.

Pixel values of the Transformed Image are derived as a signal which is supplied to a standard JPEG data compressor. JPEG lossless performs the following steps:

(1) pixel values of the original image are predicted on the basis of adjacent pixels, and (2) the prediction errors are coded using entropy coding.

The distribution of prediction errors corresponds to the distribution of gray-scale values in the Analysis Image. The signals representing the affine transformation parameters and the common gray-scale value are also combined to transform the original image in a way which decreases the size of the entropy code of procedure step (2).

The Analysis Image for a chest x-ray displays a Laplace-like distribution of values with a near-zero mean. The distribution is normalized to a zero mean.

Entropy codes work by assigning short code words, i.e. code words having a low number of bits, to the most frequently occurring events and longer code words to the rarer events. Since the Analysis Image has a Laplace distribution with a normalized zero mean distribution, large (in absolute value) gray-scale values have a low probability of occurring and are assigned long code words by the entropy encoder. Small (near zero) gray-scale values have a high probability of occurring and are assigned short code words. The overall code length, which is directly related to the entropy of gray scale distribution of the Analysis Image, is decreased by transforming the Original Image in a way which reduces the absolute pixel values for a set of pixels in the Analysis Image, or equivalently, reduces the absolute difference values in the Original Image. The effect of such a change is to shorten the code words required to specify pixels in the designated set of pixels.

The signals representing the affine transformation parameters and the common gray-scale value are combined to generate a collection of binary image models, as described above. Each binary image model modifies the Original Image in a way to reduce the entropy of the prediction error distribution as follows: for every pixel in a segment of the Original Image which corresponds to a 1 in the binary image model the pixel intensity is lowered (or raised) by a value equal to the common gray-scale value along the corresponding boundary in the Analysis Image. Pixels on the boundary between 0's and 1's in the binary model are the only pixels in the segment of the Original Image having changed differences. The reduced entropy within the segment of the corresponding Analysis Image is effectively transferred to the perimeter of the segment. However, since the coordinates of the segment perimeter are known and the magnitude of the change is known, the induced change on pixels located on the segment perimeter of the Analysis Image are readily modified to bring them back to the original values thereof. Thus, only changes on the boundary between the 0's and 1's impact the coding process.

When the signal representing the affine transformation parameters reduces the entropy of the pixel values in the Analysis Image, the variance of the error distribution is reduced. The distribution becomes more peaked around the mean. Entropy coding of this modified distribution generates an increased variation between the length of code words at the extreme and the length of code words near the mean when compared to entropy coding of the original distribution. This increased variation causes an exaggerated improvement when the image is re-processed for different structures. As an example, a medical image can be processed to reduce edge effects of ribs and can be processed to reduce the effects of equipment-generated linear artifacts. The combined improvement obtained from a two pass process is larger than the sum of the improvements obtained from each pass.

Existing compression methods, such as JPEG lossless, reduce local information redundancy; only neighbors of pixels are examined to determine information content. In the process of the present invention, information content is obtained from a large segment. As a consequence, with the process of the present invention, it is possible to identify and code information which cannot be identified using existing systems.

The net improvement in compression is the difference between the reduction realized by a more efficient coding technique and the space required to specify the affine transformation parameters and the common gray-scale code. In the example given, the measure of performance of modeling is the reduction in entropy of the prediction-error distribution. However, the measure can be expanded to incorporate both entropy reduction and the cost of specifying the transformation.

Another fractal-like form in a chest x-ray is a pulmonary nodule. A nodule-segment is a rectangle that surrounds the nodule, and the derived images and binary images are constructed as above. An example of how the signal derived using this process can provide highly concentrated information for subsequent analysis is as follows: The difference value in the original image (the gray-scale value in the analysis image) is the projection of the gradient of the pixel intensity values in the direction of a predictor. Thus the entropy reduction is a cumulative measure along the length of the boundary of the projection of the gradient of the pixel intensity in the direction of the predictor. That is, the entropy reduction is a measure of the contrast and orientation of the boundary. If the boundary traverses the edge of the nodule, the entropy reduction is a measure of the edge contrast and orientation. If entropy reductions are calculated for a set of different predictors, for example from the four corners of a rectangle towards the center of the rectangle, a vector representation of the edge including orientation information is derived. Since edge orientation is a known method of characterizing important features, including pathologies in medical images, a representation of the entropy reductions can be used as an output signal for subsequent use by feature analyses systems.

As a second example, when a pixel in the Original Image has an intensity level d, the corresponding pixel in the Analysis Image has a vector [0,,,,,,d] which is canonically mapped to, and indexed, by the gray scale level d.

A binary target image obtained for level d of the Analysis Image corresponds to a threshold cutoff image of the Original Image in which all the points at the given gray-scale level or below are "0" and all the points at a higher gray-scale level or below are "0" and all the points at a higher gray-scale level are "1". The binary image clearly contains information about the pixels in the original image. A multiple gray-scale subimage of the original digitized image is selected according to some preset criterion. For example, the multiple gray-scale image might be of a rib-segment or tumor segment as defined above. The set of pixels in each binary subimage is contained in the multiple gray-scale subimage but may vary depending on the gray-scale level; that is, the binary subimages may have different spatial coordinates.

For each gray-scale level, the threshold cutoff binary subimage is modeled using fractal mathematics. The transformation parameters of the affine transformations, the error measure of the fractal model and the spatial coordinates of the binary image (collectively referred to as the binary image parameters) are used for image filtering, image compression and analysis, and image enhancement.

A signal derived from the binary image parameters provides highly concentrated information about the original image. As an example the following methodology is used to generate a probability estimate of the existence of a nodule. The methodology is explained using an analogy to geometric forms.

Assume a large picture collection. The first picture is a five-sided star (with a solid interior) having 10 equal-length line segments. The last picture is a circle. The intervening pictures slowly change the shape of the star into a circle by expanding the interior and smoothing out the corners. The changes need not be symmetric, only gradual.

Each picture is modeled by a series of 10 equal-length line segments. Each approximation can be characterized by the following:

(1) 40 values which define starting and ending x and y coordinates for each of the 10 lines;

(2) constraints requiring (a) the end of one line to be the beginning of exactly one other line, and (b) all lines to have the same length.

The first picture can be modeled with no error. The model for the last picture has an error since a circle cannot be constructed from a finite number of lines. Intervening pictures may, or may not, have an error. For each picture of this (first) set of pictures, 41 parameters are recorded: the 40 starting and ending (x and y) values and a measure of the model error. Some reasonable measure of error, such as the average distance of the picture from the line segments, is utilized. The 41 parameters slowly and gradually change from one picture to the next.

Now consider a second set of pictures, divided into first, second and third groups having the same number of pictures in each group. In this second set the first and third groups of pictures look exactly the same as the pictures in the first set above. However, a large bubble is present in the pictures of the second group. The same 41 parameters and constraints model pictures in the second set.

However, it is difficult or impossible to tell if a bubble is present by detecting the 41 parameter values for any single picture. In the first set of pictures all three groups share similar properties. The first and third groups have smooth, gradual changes in the 41 parameter values which enable predictions of what happens in the second group. In the second set of pictures the second group behaves in a different way; the first and last groups are not a good predictor of what happens in the second group. The parameter values for an individual picture may, or may not, indicate the presence of a bubble; the consistency and predictability of the changes from one picture to the next indicate a bubble.

In accordance with the method of the present invention, the fractal form of each image is modeled, rather than the geometric form. The geometric form describes how points relate to each other to form patterns, such as lines, squares and circles. The fractal form describes the self-similarity of the picture, i.e., how the whole picture relates to its parts. In the method of the present invention, the sequence of pictures in the example use binary images at the various threshold cutoff planes.

In the absence of anatomical abnormalities, a rib segment is dominated in plural gray-scale level target binary images by fractal-like forms having similar geometric and fractal properties. Such a situation is analogous to the first picture set in which the star was changed to a circle. The target binary images vary slightly and regularly in variable values, error measures and spatial coordinates from one gray-scale level to the next.

When a target image is dominated by the fractal-like form of the standard, the error measure between the attractor of the Hutchinson operator and the target image is consistent from one cumulative topographical level to the next and is reliably small. When the digitized image contains an anomaly or abnormality, such as a lesion or nodule in a chest x-ray image, the anomaly or abnormality appears in some, but not all, of the gray-sale levels in which the dominant fractal-like form is evident. The specific subset of gray-scale levels may vary depending on the anomaly or abnormality and the specifics of the digitized image. When an anomaly or abnormality is present, the manner in which the parameters vary is similar to the second set of the star analogy in which a bubble appears for some of the pictures in the second group. The pattern of change of the affine transformation values, the error measure and the spatial position differ for the gray-scale levels including the abnormality. The error measure changes since the constraints are designed to force the fractal attractor to have the form of a specific fractal-like structure, not a fractal-like structure with a bubble.

Most fractal-like features in natural objects occur in plural spatial locations. Examples are recurring patterns of intersecting ribs and branching bronchial vessels. However, the definition of fractals assures that every fractal-like image has recurring subimages with similar characteristics. Thus plural subimages must exist with similar fractal-like forms.

In the method of the present invention, there is established a range of gray-scale levels wherein the selected fractal-like form is dominant. The range is established by analyzing subimages containing the fractal-like form and minimal abnormal structures. The method uses the fractal-like form in subimages having no abnormalities as a model to be applied to subimages derived from actual images having abnormalities. The degree to which this model fails is a measure of the likelihood of the abnormality.

The dominant fractal-like form of the subimage constitutes a background pattern that may hide significant features of the abnormality. Since the method effectively models this background, filtered images can be produced with the background attenuated or processed as needed. If the dominant fractal like feature is a nodule, the feature is a foreground pattern which can be enhanced.

A signal derived from the binary image parameters is used to compress the image. Lossless image compression can be achieved by generating residual image data (defined as the difference between the target image and the model image data). Since the model image data are generated for a large number of pixels rather than the small number used in subsample plus interpolation, the residual image has a lower entropy than other compression algorithms. The combined data representing the model and residual image are a lossless representation of the target image.

A smooth transition of form and spatial-position shift follows from the geometry of ribs; the depth of the bone varies gradually from the edge to the center. This smooth pattern of change has some degree of consistency over the gray-scale levels in which the ribs are the dominant feature.

A fundamental theorem of fractal mathematics is that small changes in affine transformation values cause small changes in a corresponding attractor. The affine transformation values used in the method of the present invention change slightly and regularly from one gray-scale level to the next. Each transformation value is one of a finite number of quantification levels between zero and unity, while variations from one gray-scale level to the next are stored as incremental quantification level changes.

By imposing proper constraints, the fractal model closely matches the dominant fractal-like structure of a target binary image at each gray-scale image. A model binary image is derived from stored signals having values that are a function of affine transformations which are selected by numbers of a pseudo-random number sequence represented by a binary signal bit set. The selected stored signals for each set of affine transformation coefficients rotate, shear, scale or reflect an arbitrary image that is independent of the target image to derive a sequence of transformed images that are superimposed on each other to derive the model image.

At each step of the process, the methodology employed in the present invention does not generate the Hutchinson operator attractor. Instead, there is generated an approximation to the attractor, dependent on: (1) a predetermined number of iteration points, (2) predetermined quantification levels and (3) the pre-determined selected pseudo-random sequence. The procedure guarantees monotonicity and convergence. It does not guarantee convergence to the attractor, but virtually assures that the final approximation has a smaller error measure, when compared to the target image, than the actual attractor. This occurs because different random sequences generate a random distribution of error measures around the error measure corresponding to the true attractor for a preset number of iteration points. The methodology of the present invention selects approximations to the attractor having error measures at the lower extreme of this distribution and consequently may have lower error measures than the true attractor.

Affine transformation values as representations of image data enable significant data compression because only a limited number of the affine transformation values are independent, the remainder being fixed by dependencies defined by a standard for each catalog entry. Compression ratios are further reduced by approximating the independent variable values by one of a finite number of acceptable quantification levels between zero and unity. Quantified values of the variables on the order of $1/256$ are sufficiently small to allow minor changes in the attractor and can be stored in a single byte of computer storage.

The affine transformation values represent compressed forms of a binary image on a single threshold cutoff plane. A multiple gray-scale level image requires data representing several gray-scale planes. There are small variations between affine transformation values of images in adjacent gray-scale planes. Accordingly, a coding scheme further compresses the data required to produce a multiple gray-scale level image.

Four levels of data compression of the image model are attained:
(1) the image is modeled using fractal coefficients;
(2) the fractal coefficients are quantified into a finite number of possible states.
(3) the differences of quantification levels are stored, rather than the states themselves; and
(4) the stream of differences of quantification levels is coded.

In both examples, the constraints are imposed by linear dependencies between and among the coefficients of the affine transformations. A catalog of constrained fractal standards corresponding to fractal-like forms is created; each catalog entry has linear dependencies for a small number of affine transformations which force the attractor to assume the geometric and fractal properties of a predetermined fractal-like form. A major advantage of the invention is that the constraints on allowable forms reduce the amount of data required to establish parameters for the image, rather than increase the amount of data.

There is significant need for such data compression in the medical field for patient medical records systems, and in systems providing consultative and diagnostic support from remote locations. Similar needs exist in other fields.

There is significant potential for use of fractal analysis for differentiating between normal and diseased conditions and for quantifying fractal characteristics. The literature indicates there is research using fractal dimension, lacunarity and texture for diagnosing abnormalities of pulmonary trees, heart, lungs, kidney, liver, breast and other anatomical structures. Since the method of the present invention uses fractal models to approximate features in a digitized image, the affine transformation values provide a means for establishing parameters for these fractal characteristics. In addition, the method of the invention enables edge orientation and other feature characteristics to be derived.

The method of the invention enables different types of computers to be used for (a) the subsystem which generates and models the binary images from the input source and the data library (steps 1–6) and (b) the subsystem which reverses this operation (step 7). In general, the process of generating and modeling the binary images from the input source and data library is significantly more time-consuming than the reverse process.

In processing the Original Image, individual standards and individual subimages for each standard are independently processed. Moreover, the procedure of generating the approximation of the fractal is readily implemented using parallel processing.

Accordingly, an object of this invention is to provide a new and improved automated method of and apparatus for facilitating detecting, identifying, and analyzing anomalies and abnormalities in digitized images.

Another object of this invention is to provide a new and improved topographical approach using fractal mathematics for modeling subimages of a digitized image containing an underlying fractal-like structure in plural threshold cutoff levels.

An additional object of this invention is to provide a new and improved automated method of and apparatus for identifying abnormalities and error measures between and among binary subimages of threshold cutoff levels on the basis of changes in fractal transformation variables.

A further object of the invention is to provide a new and improved library of catalogs including "standard" underlying, fractal-like structures and associated Hutchinson operators, wherein each Hutchinson operator is defined by a small number of affine transformations and linear dependencies among the affine transformation variables in such a way that an attractor of the Hutchinson operator matches the geometric and fractal characteristics of the target fractal-like structure to within predetermined criteria.

A further object of the invention is to provide a new and improved method of and apparatus for segmenting an original image into plural binary subimages corresponding to the threshold cutoff levels of the original image to derive similar binary subimages to be compared with binary representations of (a) single subimage model and/or (b) a subimage of the original image at another gray-scale level.

Another object of the invention is to provide a new and improved method of and apparatus for segmenting an original image into plural binary subimages corresponding to the threshold cutoff levels of the original image and to associate with each binary image a "standard" Hutchinson operator from a catalog in the library.

An added object of the invention is to provide a new and improved method of and apparatus for approximating an attractor of a Hutchinson operator within specific criteria using a predetermined pseudo-random number sequence.

Still another object of the invention is to provide a new and improved method of and apparatus for measuring an error between an approximation of the attractor of the Hutchinson operator and a target binary image.

Yet a further object of the invention is to provide a new and improved method of and apparatus for systematically varying the values of the independent variables of the Hutchinson operator so that the resultant approximation of the attractor of the Hutchinson operator models the threshold cutoff binary images within specified criteria.

Yet a further object of the invention is to provide a new and improved method of and apparatus for assuring monotonicity of an error measure in the systematic variation of the independent affine transformation variables of the Hutchinson operator to assure termination of the process in a finite number of steps.

Still an added object of the invention is to provide a new and improved method of and apparatus for utilizing correlations of the independent affine transformation values of the Hutchinson operators, error measures and spatial coordinates among plural threshold cutoff levels to generate probabilistic measures of anomalies and abnormalities within a subimage.

Yet an added object of the invention is to provide a new and improved method of and apparatus for generating data using fractal models to generate parameters, filter, compress, reproduce and enhance the image of underlying fractal-like structures, and of anomalies and abnormalities.

Another object of the invention is to provide a new and improved method of and apparatus for using fractal transformation, error measures, and spatial coordinates to generate fractal dimensionality parameters, lacunarity, texture analysis and other diagnostic indicators of the digitized image.

Yet an additional object of the invention is to provide a new and improved method of and apparatus for achieving a high level of data compression using a small number of affine transformations for the purpose of computer storage, transmission and reproduction.

Still an additional object of the invention is to provide a new and improved method of and apparatus for reducing the number of independent variables in the affine transformations by imposing linear dependencies between and among the transformation variables.

Another object of the invention is to provide a new and improved method of and apparatus for reducing the required computer storage space by restricting acceptable levels of each independent variable in the affine transformations to predetermined quantification levels.

Another object of the invention is to provide a new and improved method of and apparatus for generating compressed image data for plural threshold cutoff levels by recording changes in quantification levels from one threshold cutoff level to the next.

Another object of the invention is to provide a new and improved method of and apparatus for compressing data representing changes in quantification level from one transition level to the next using a coding scheme.

Another object of the invention is to provide a new and improved method of and apparatus for generating a residual image representing the difference between the original data and image model, such residual image having low entropy and high correlation between adjacent pixel values.

Another object of the invention is to provide a new and improved method of and apparatus for using combined compressed model data and coded residual data in order to achieve a high level of compression without distortion.

Another object of the invention is to provide a new and improved method of and apparatus for achieving significant reduction in image data processing time by using a methodology which is amenable to parallel processing, and can also be used on a non-parallel computer system.

Another object of the invention is to provide a new and improved method of and apparatus for image analysis and image reproduction in plural different computer environments.

An additional object of the invention is to provide a new and improved method of segmenting an image, represented by discrete multi-dimensional data, into two-dimensional segments wherein a plurality of the two dimensional segments are represented by binary images which are members of a class of binary images.

An additional object of the invention is to provide a new and improved method of specifying how to segment an image, represented by discrete multi-dimensional data, into two-dimensional segments represented by binary images which are members of a class of binary images, wherein the segmenting is on the basis of characteristics of the class of binary images.

An additional object of the invention is to provide a new and improved method of associating with each binary image within a class of binary images a corresponding set of representative binary images.

An additional object of the invention is to provide a new and improved method of associating with a class of binary images a corresponding class of Hutchinson operators.

An additional object of the invention is to provide a new and improved method of generating an approximation to an attractor for each Hutchinson operator with a class of Hutchinson operators associated with a class of binary images.

An additional object of the invention is to provide a new and improved method of deriving a measure of an approximation of an attractor of a Hutchinson operator associated with a binary image representing a two-dimensional segment associated with a multi-dimensional discrete image.

An additional object of the invention is to provide a new and improved method of modifying a multi-dimensional discrete image by using an approximation to an attractor of a Hutchinson operator associated with a binary image which represents a two-dimensional segment associated with the multi-dimensional discrete image.

An additional object of the invention is to provide a new and improved method of obtaining a signal representing multi-dimensional image data.

An additional object of the invention is to provide a new and improved method of modifying image representing data so that compression of the modified data results in a smaller file than when data representing an unmodified image is compressed using the same data compression procedure.

An additional object of the invention is to provide a new and improved method of modifying image representing data so that the modified data contains instructions for reversing the modification.

BRIEF DESCRIPTION OF THE DRAWING

FIG. 7C is also a representative illustration of threshold cutoff binary images in accordance with a first process of the invention;

FIGS. 9A(1)–9G(2) comprise a series of illustrations used to show how representative affine transformations form a standard;

FIG. 18 is an illustration of representative analytic data obtained from processing image data;

FIG. 20 is a Huffman code book Table enabling the quantification differences of FIG. 19 to be efficiently coded;

DESCRIPTION OF THE PREFERRED EMBODIMENT

Figure 1:
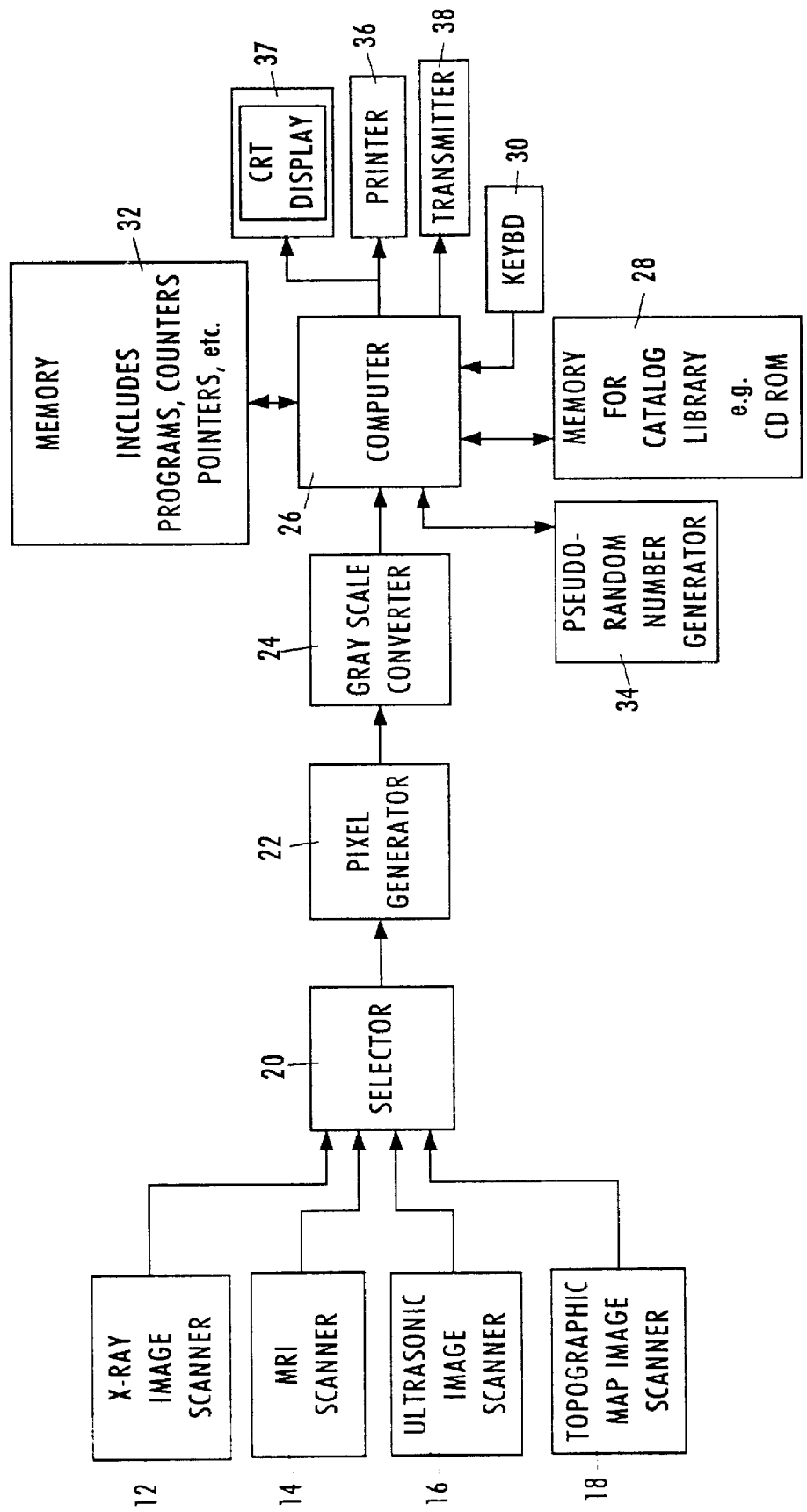
FIG. 1 is a schematic, block diagram of apparatus including the present invention.

Reference is now made to FIG. 1 of the drawing, a block diagram of a preferred embodiment of apparatus for performing the methods of the present invention. In the exemplary apparatus of FIG. 1, four image scanners 12, 14, 16 and 18 are provided for respectively scanning X-ray images, magnetic resonance images, ultrasonic images and topographic map images. Each of scanners 18 can be responsive to images representing several different objects. For example, X-ray image scanner 12 can be responsive to chest X-ray images, arm X-ray images, leg X-ray images, etc. while each of scanners 14 and 16 can be responsive to images from other parts of the anatomy or from other types of sources. Topographic map image scanner 18 can be responsive to maps for a particular city, maps for a particular region, maps for a particular state or country, or topographical representations of meteorological data.

Each of scanners 12–18 derives an analog signal representing the opacity of a scanned area of each image. The analog signals derived from scanners 12–18 are supplied to signal selector 20, which derives an analog output signal having a value commensurate with the scanned selected image from one of scanners 12–18. The output of selector 20 is supplied to pixel generator 22, which divides each scanned image into a series of M×N areas, i.e. pixels. The output of pixel generator 22 is thus a sequence of analog values representing the degree of opacity of M×N areas of the scanned image. The analog signals derived by generator 22 are converted into digital gray-scale values by gray-scale converter 24 which thereby supplies a sequence of digital signals representing the opacity of the image at each pixel in the selected scanned image. The output of gray-scale converter 24 is supplied to digital computer 26, preferably capable of parallel processing. While selector 20, pixel generator 22 and gray-scale converter 24 are shown as separate elements, it is to be understood that they can be, and usually are, incorporated into computer 26.

Computer 26 is coupled with a first memory 28 for storing a library of catalogs; a CD ROM can be used to store the library of catalogs in memory 28. The catalog library stored in memory 28 includes several catalogs, one for each of the scanners which produces signals to be supplied to computer 26 via selector 20, pixel generator 22 and converter 24. Within each catalog there are several entries, each for a different image which is expected to be derived from the scanner associated with the particular catalog and/or segments of such images. Thus, for example, the catalog associated with X-ray image scanner 12 stores data related to X-ray images for ribs, arms, legs, and/or segments of such images, such as individual ribs of a chest-X-ray image, etc. As described in detail infra, in connection with Table I, each catalog entry includes data values enabling a model data image for the particular catalog entry to be derived, as well as a header containing descriptive information for the particular image.

Computer 26 is also responsive to operator inputs, as derived from keyboard 30. A second memory 32, also associated with computer 26, stores digital signals for programs to control the computer, counters, pointers and other data. Memory 32 also includes provisions for (1) temporary data storage, in the form of a random access memory and disc storage, and (2) storing data to be supplied as output signals to printer 36, display 37 and/or transmitter 38.

Computer 26 is also responsive to pseudo-random number generator 34. In response to commands from computer 26, pseudo-random number generator 34 produces first and second pseudo-random number sequences, each including bytes representing numbers that occur in pseudo-random sequences. The first sequence has a length (e.g., 500,000 bytes) determined by certain details of the processed entry of catalog 28, while the second sequence has a length (e.g., 2,000,000 bytes) determined by the overall features of the processed entry of catalog 28. In response to commands from computer 26, the first and second sequences are derived so they are always identical and always begin at the same position in the sequence for a particular catalog entry.

Computer 26 is also coupled with printer 36 and a CRT display 37 which derive output signals and images indicative of images derived by scanners 12–18 and the differences between the images and standard images derived by computer 26 in response to signals from memories 28 and 32, as well as keyboard 30 and pseudo-random number generator 34. Computer 26 also supplies transmitter 38 with data compressed signals indicative of the scanned image and indicative of an assigned code number for a catalog entry from memory 28. These data are sent by transmitter 38 to a remote location including a computer, memory and pseudo-random number generator similar to computer 26, memory 28, memory 32 and pseudo-random number generator 34.

The operations performed by computer 26 to enable the aforementioned results to be attained are now described in connection with the remaining figures.

Figure 2:
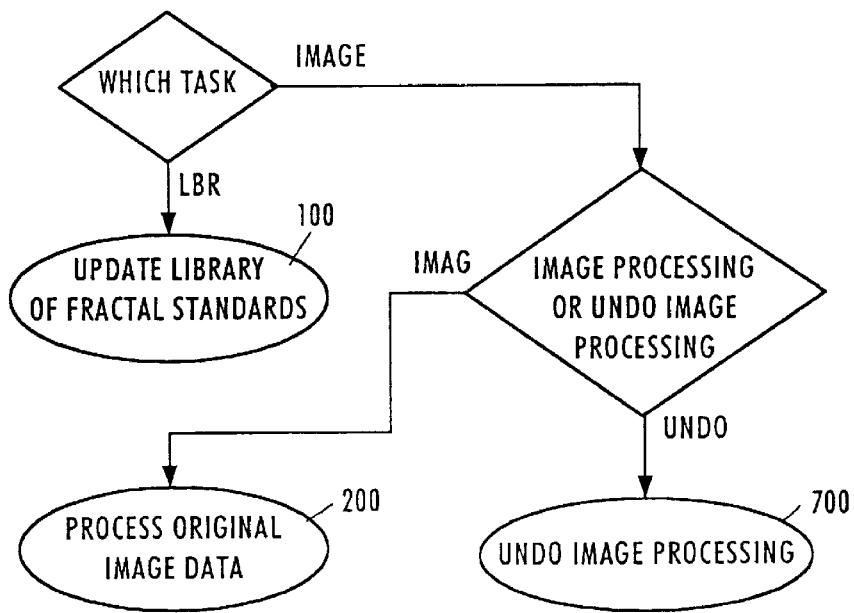
FIG. 2 is a flow diagram of the major tasks performed by the apparatus illustrated in FIG. 1.

FIG. 2 is a flow diagram of how the two separate tasks performed by the invention are generally performed. A library of catalogs, each including multiple entries, is selectively updated during operation 100. As discussed in connection with Table I, each catalog entry contains data defining fractal standards, specifications and procedures for deriving from an image source a signal which represents information content of the image source, such as one of sources 12–16. One catalog stores multiple entries of a similar type; e.g., one catalog stores standard X-ray image data for different body parts, another catalog stores MRI data for different body parts and a further catalog stores standard ultrasonic image data for different body parts. The information content which is derived may either be reversible or irreversible. If the information content is reversible, then an exact copy of the original image source may be reproduced from the information signal; if the information content is irreversible, than an exact copy of the original image source cannot be obtained from the information signal.

A reversible information signal generated in step 200 may be used as the source signal. In this case, operation 700 is performed to regenerate the original image from the reversible information signal. Details of step 200 are set forth in FIGS. 4–6, 8 and 17 while details of step 700 are set forth in FIG. 21 for a first and a second process.

Figure 3:
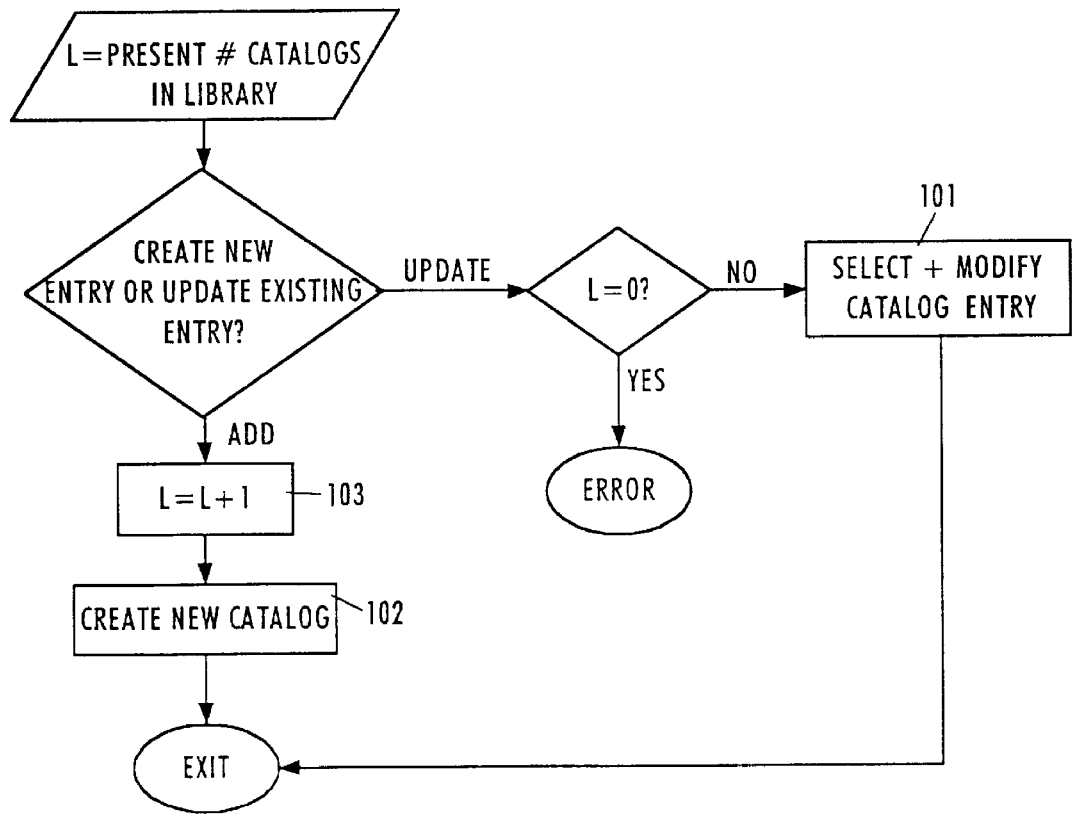
FIG. 3 is a flow diagram for creating and updating catalogs of standards in the library of the apparatus illustrated in FIG. 1.

FIG. 3 is a flow diagram of process 100, updating the library of catalogs. The catalog associated with image scanner 12 contains a single entry for chest X-ray images having multiple gray-scale levels, another entry for forearm X-ray images, etc. The same catalog entry is used for all standard-form chest X-ray images, regardless of the number of pixels or the number of gray-scale levels. Because of the fractal analysis, it is not necessary for the image from the scanner to have a standard position or size. Standards within a catalog or catalog entry are selectively modified by altering the specifications of the catalog or catalog entry; additional standards are added by changing the "number of standards" field and adding appropriate specification data. Additional catalog entries are added by including specifications following the form of Table I.

Table I includes lists of specifications defining exemplary catalog entries for the first and second processes indicated in the Table and elsewhere herein as process 1 and process 2. The significance of the specifications will become clearer as the specific embodiments of the invention are described. In general, a separate catalog entry is provided for each actual image type. The catalog entry indicates inter alia, the name of the image and the affine transformations to convert the data representing the standard image into a fractal model of the standard image. The term "process" refers to specific procedural steps which are carried out in order to derive a desired information signal. Catalog item 1 contains 2 processes:

1) Process 1 generates a reversible information signal which is used for compressing the image data. The information signal may also be used as the source signal for feature analysis apparatuses.

2) Process 2 generates a reversible information signal which is used as the source signal for other image compression apparatuses. The information signal may also be used as the source signal for feature analysis apparatuses.

A catalog entry of the type illustrated in Table I is entered or modified by the computer entering a list of operations as illustrated in FIG. 3. If an operator has entered commands whereby an existing catalog entry is to be modified, the entry to be modified is accessed, and modified as indicated by operation 101. If a new catalog entry is to be added, the program proceeds to operation 102, after assigning a number equal to the last catalog entry plus one, in operation 103.

Figure 4:
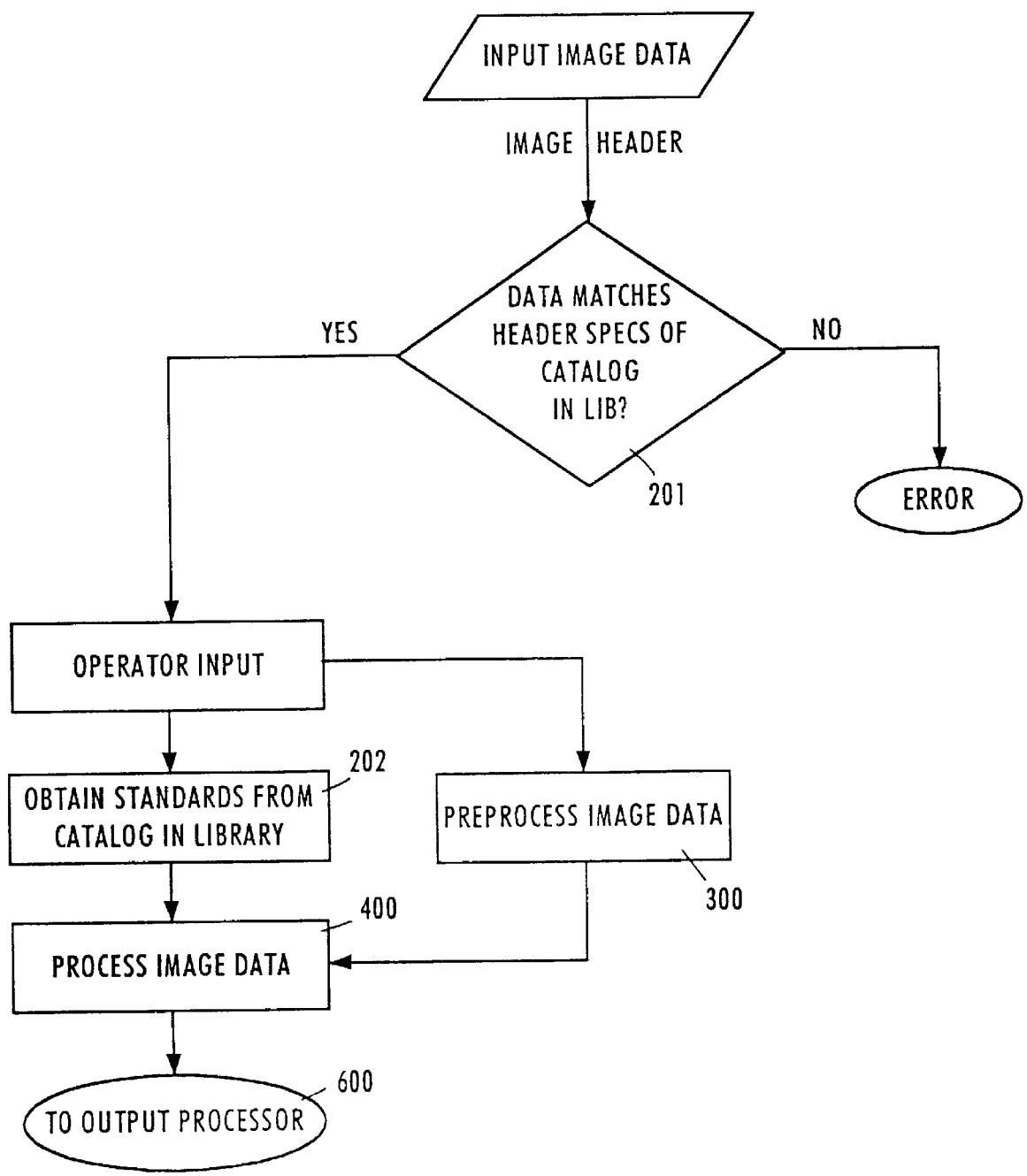
FIG. 4 is a flow diagram of how the image data are matched to catalog standards and image data are processed.

FIG. 4 is a flow diagram of how data from an original image source, e.g., scanner 12 as derived during operation 200, FIG. 2, are processed. The initial step 201 of operation 200 is a determination of whether the input data in a header accompanying the original image data match a header specification in a catalog entry of the library. If the original input header data do not match a header specification in the library, processing of the image is terminated. In both process 1 and 2, an operator determines if the digitized image is a 14"×17" multiple gray-scale chest X-ray. The number of gray scales, D, and the number of pixels, M×N, are obtained from a header label of the digitized original image. The operator inputs the number of the process which is to be performed.

If the input original image header data match the header data of a catalog entry, operations 202, 300, 400 and 600 are executed. During operation 202 details of the catalog entry, including the number of quantification levels, the number of standards, the specifications for each standard, and the specifications of the selected process, are transferred from memory 28 to RAM in computer memory 32 and used to process input data. The input data are preprocessed during operation 300, illustrated in detail in FIG. 5. The catalog entry details and the pre-processed data are processed to produce analytic and image data for output processing operation 400, illustrated in detail in FIG. 6 for both embodiments. The analytic and image data are passed to output processing operation 600, illustrated in detail in FIG. 17.

Figure 5:
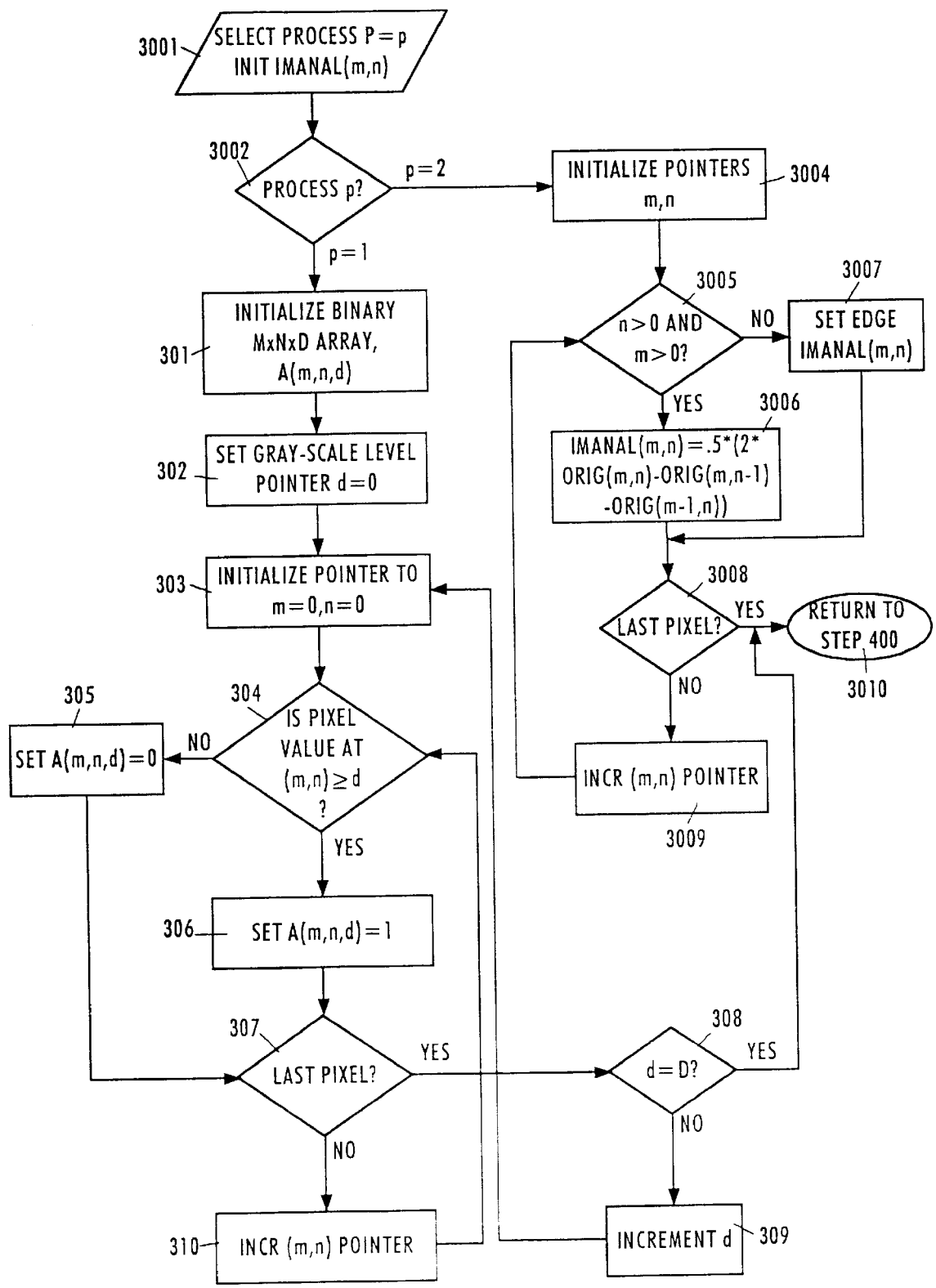
FIG. 5 is a flow diagram of how input image data are pre-processed.

FIG. 5 is a flow diagram of how pre-processing operation 300 is performed. The pre-processing operation generates the Analysis Image. At step 3001 the Analysis Image is initialized to all zeros.

For process 1, control goes to step 301. For each gray-scale level d of the Original Image which is to be analyzed, a corresponding binary image is generated and stored in an M×N binary array, A: a pixel array element, (m,n), of the binary image contains "0" if the pixel value is below d and "1" if the pixel value is equal to or above d. The binary images for all gray-scale levels are stored in memory or computer storage 32. Alternatively, binary images are generated and processed, one at a time.

After array A has been initialized at step 301, a gray-scale level pointer is initially set at zero, operation 302. Then during step 303, a pixel array pointer is set to an initial value of m=0, n=0. Determinations and appropriate settings for the values of A(m,n,d) are then made during steps 304–306 so that if the image amplitude associated with pixel m,n equals or exceeds d, A(m,n,d)=0; if pixel m,n is less than d, A(m,n,d)=1. If step 307 indicates the last pixel of array A(m,n,d) has not been processed, the pixel pointer is incremented, in step 308, to the appropriate row and/or column and operations 304–307 are repeated until the last pixel of the array is detected as being reached; operation 307. In response to d being detected during operation 308 as less than D, d is incremented during operation 309 and steps 303–308 are repeated until d=D, at which time all pixels of the image for all D gray scale levels have been read, and step 320 is reached. Thus the pixel values of the original image are evaluated many times, one for each possible gray-scale level, and a determination is made during each evaluation for each pixel as to whether or not the particular pixel is above or below the gray-scale level associated with the particular evaluation.

The so obtained collection of binary images for all gray-levels comprises the Analysis Image. Formally, if location (m,n) of the Original Image has intensity level d, the value of ImAnal(m,n) consists of the set [0,1, . . . ,d] which is associated, under a canonical map, with the gray scale level d.

Upon reaching step 3010, control is transferred back to step 400 in FIG. 4.

In the description of FIG. 5 and many subsequent figures, reference is made to reading or setting values of pixels in images. In fact, corresponding arrays in memory contain the values of the pixels. The memory locations are indexed in the same way the pixels are indexed in the image. For each pixel in the original image, a corresponding pixel is generated and stored in an Analysis Image upon which analysis is performed.

For the second embodiment, gray-scale values of pixels in Analysis Image are the differences between gray scale values of pixels in the Original Image and gray scale values of pixels which are immediately adjacent and to the left of the pixels being evaluated. For pixels on the left edge and top of the Original Image, the determination of pixel values in the Analysis Image is modified as indicated in FIG. 5.

At operation 3004 pointers (m,n) are initialized to values (m=0,n=0) pointing to the corner pixel of both the Original Image and the Analysis Image. At operation 3005, a determination is made if n=0 or m=0, i.e., if the pointers indicate a left-border or top-border pixel. If n=0 and m=0, pixel (m,n) of the Analysis Image is set to 0 in operation 3007. Otherwise, if m=0, n>0, (i.e., top row) pixel (m,n) of the Analysis Image is set to the difference between pixel value (m,n) of the Original Image and pixel value (m,n−1) of the Original Image. Otherwise, if n=0, m>0 (i.e., left column) pixel value (m,n) of the Analysis Image is set to the difference between pixel value (m,n) of the Original Image and pixel value (m−1,n) of the Original Image. Otherwise, pixel value (m,n) of the Analysis Image is set to the average of the differences between pixel value (m,n) of the Original Image and pixel values (m−1,n) and (m,n−1) of the Original Image. The process is repeated for all (m,n) spanning the Original Image. Alternatively, the difference is computed as the difference between the gray-scale value of reference pixels and combinations of gray-scale values of pixels which are adjacent to or neighboring the reference pixels according to a preset relationship. A variety of such relationships may be used. The Analysis Image is stored in memory or computer storage 32.

Figure 6:
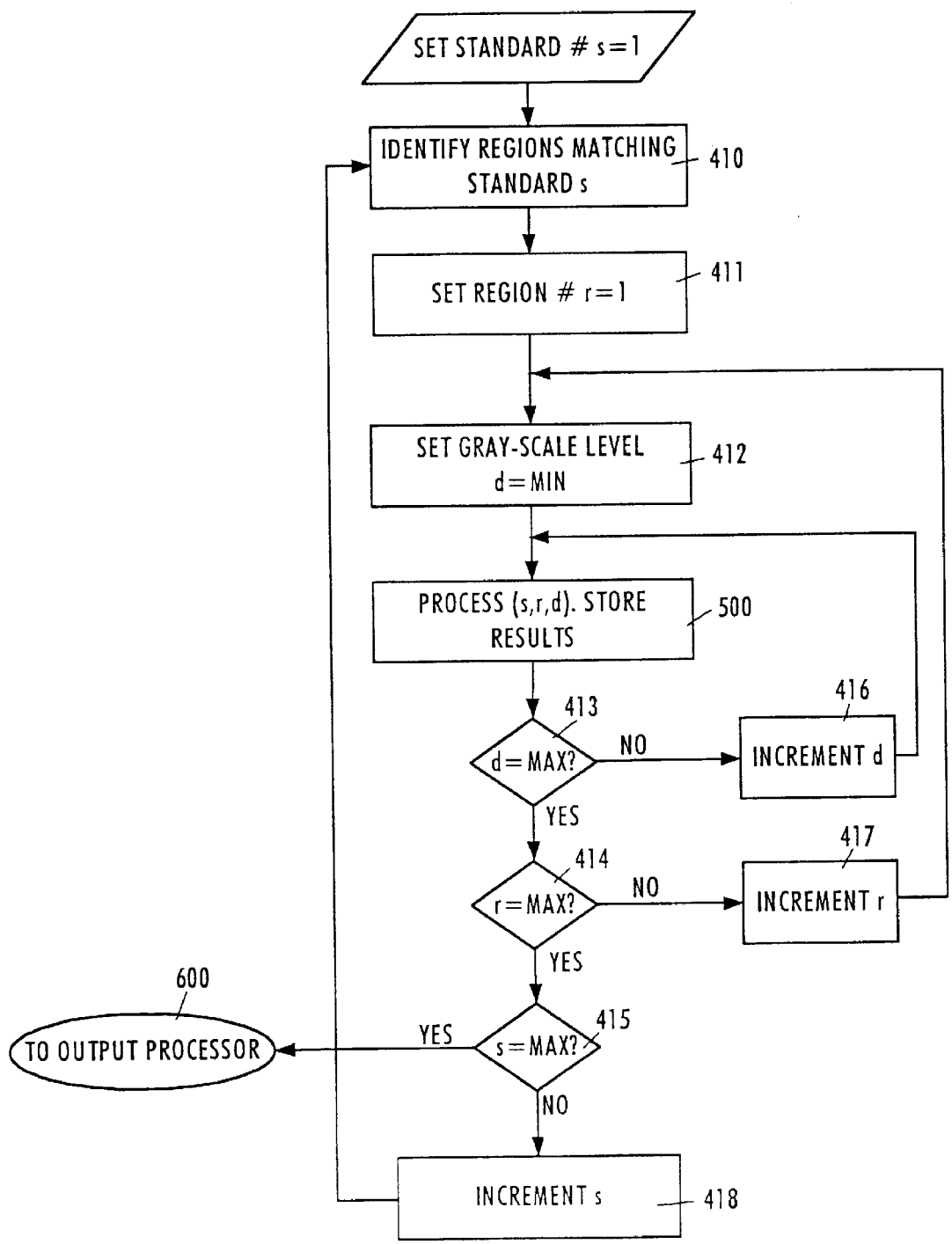
FIG. 6 is a flow diagram of how image data are processed after catalog matching and pre-processing.

Analysis Image data derived during pre-processing step 300 are processed during step 400, illustrated in FIG. 6 for both process 1 and 2. At step 410, for each fractal standard within the catalog which is specified by the process, regions of the input image are located which match a structure specification of the fractal standard. In the preferred embodiment, the located regions are blocks of pixels which are identified by a trained operator. For chest X-ray images, processes 1 and 2, a structure is a pattern of four ribs as defined by the structure specification of standard 1, Table I, and a region is a quadrilateral set of pixels encompassing the structure. Alternatively, automatic pattern matching techniques can be utilized for identifying regions containing geometric and/or fractal properties matching the structure specifications of the standard. After step 410, the region number is initially set at 1 during operation 411, and then the gray scale level is initially set at the minimum value of gray scales found in the Analysis Image during step 412. At step 500 for each standard=s, region=r, and gray-scale level=d, a binary image, or set of binary images, is generated and processed, one at a time, and the resultant fractal data are stored for later use.

Steps 410–412 are repeated until all gray-scale levels (d) of the Analysis Image have been read for all regions (r) of all standards (s). To these ends, operations 413, 414, and 415 respectively determine in sequence if $d=d_{max}$, $r=r_{max}$ and $s=s_{max}$. If d is not $d_{max}$, d is incremented during operation 416 and operation 500 is repeated until $d=d_{max}$, at which point operation 414 is executed. If r is not $r_{max}$, r is incremented during operation 417 and steps 412–417 and 500 are repeated until $r=r_{max}$, at which time step 415 is executed. If s is not $s_{max}$, s is incremented during operation 418 and steps 410–418 and 500 are repeated until $s=s_{max}$. The data specified in the process specification are then passed to output processing step 600, FIG. 17. Additional regions matching the structure specification of the standard and additional standards within the catalog are processed within major loops.

Figure 7A:
FIGS. 7A, 7B and 7C are illustrations of a segment of a representative chest X-ray displayed with 16, 8 and 2 gray-scale levels.

FIG. 7A, useful in describing the operation of processes 1 and 2, is a segment of a chest X-ray pixel image from source 12 having 16 gray-scale levels, for purposes of example. The pattern of five anterior ribs is clearly visible but somewhat distorted because of the relatively small number of gray-scale levels in FIG. 7A. FIG. 7A includes four regions containing structures defined by the specification of standard No. 1 (Table I), from the bottom of a first rib to the bottom of the next lower rib and from the left edge where the posterior ribs curve down, to the right boundary of the X-ray segment. These regions are identified in step 410, FIG. 6.

Figure 7B:

FIG. 7B is the same segment as illustrated in FIG. 7A for eight gray-scale levels. Only six of the eight possible levels appear in the segment of FIG. 7B. Each gray-scale level is the union (OR function) of two adjacent gray-scale levels in FIG. 7A.

Figure 7C:
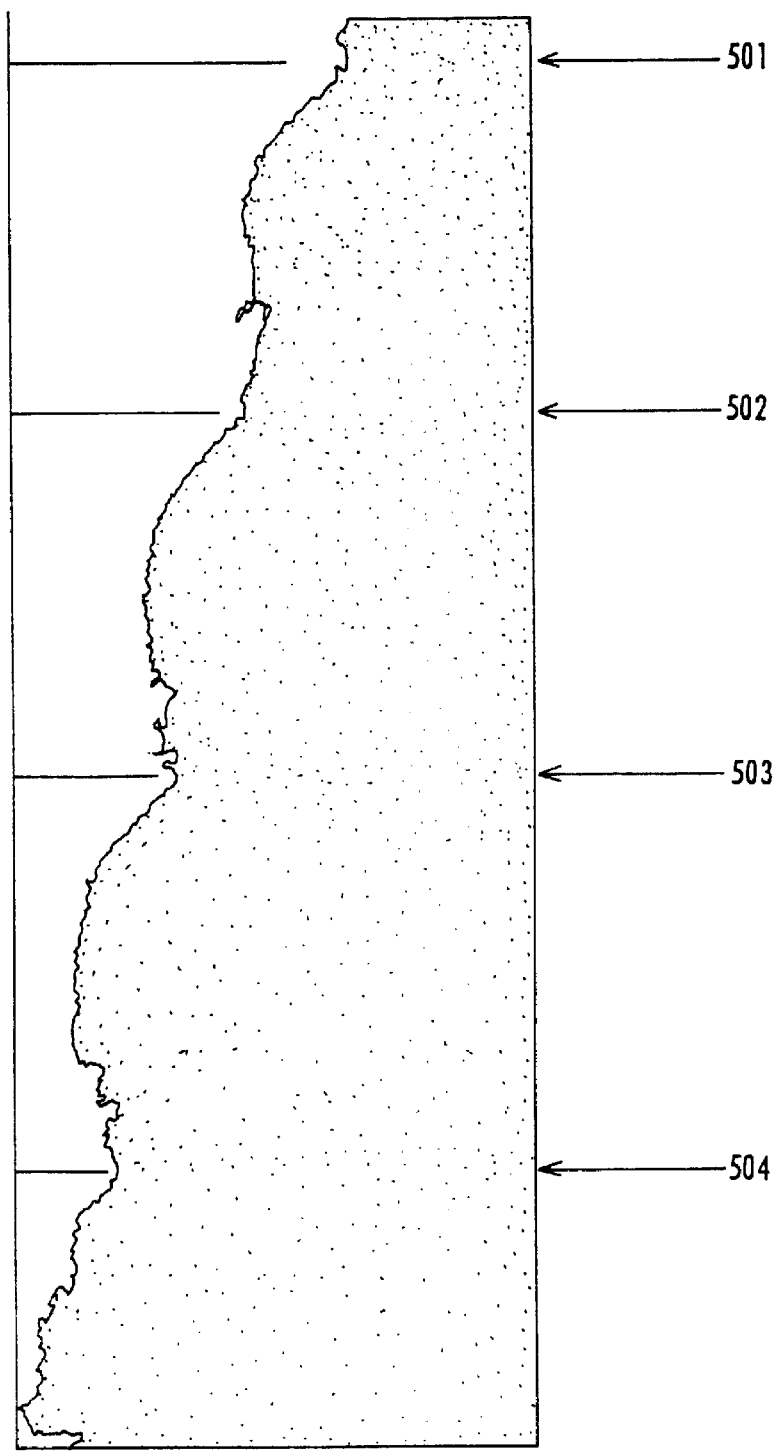

FIG. 7C is the same segment illustrated in FIG. 7A for two gray-scale levels. Each gray-scale level is the union of four adjacent gray-scale levels in FIG. 7B. FIG. 7C contains three complete binary block patterns for process 1, each matching the specifications of standard 1, process 1, Table I, for a chest X-ray subimage. Block 1 extends from horizontal line 501 to horizontal line 502 and from the left border to the right border of the image. Block 2 runs from line 502 to line 503 while block 3 extends from line 503 to line 504. The indentation on the bottom row in each block is caused by a rib; the bulbous portion on the top is caused by the dark space between the ribs. Other gray-scale levels have similar geometric and fractal characteristics. However, they have different edge characteristics, depth of indentation, width of ribs and size.

Figure 7D:
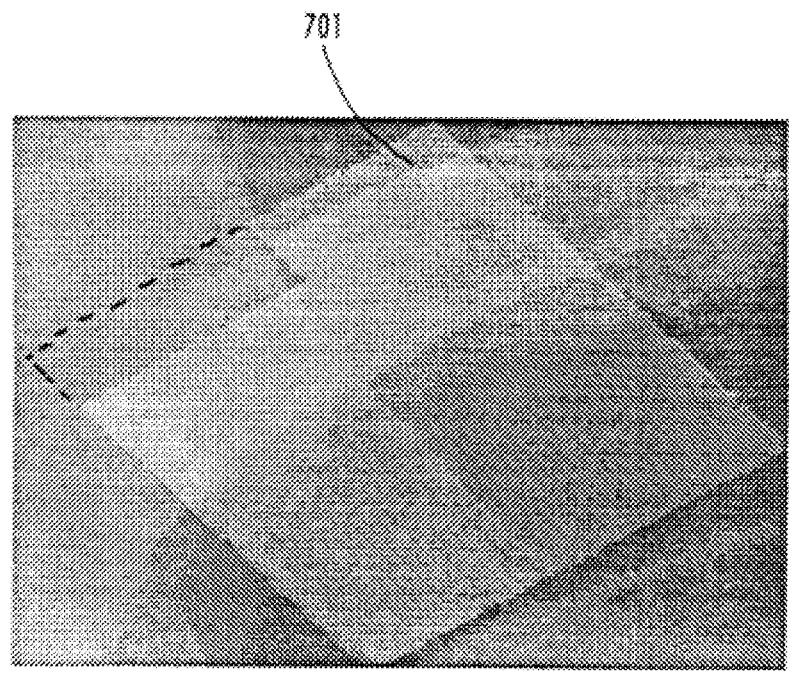
FIGS. 7D, 7E and 7F are illustrations of how an exemplary image is processed in accordance with a second process of the invention.

FIG. 7D is an illustration of a typical set of pixels in an Original Image with 256 gray-scale levels shown. The highlighted area 701 in FIG. 7D has the shape of a parallelogram with a corner removed. The completed parallelogram, which includes the removed corner, is a rib-segment corresponding to one of the four regions illustrated in FIGS. 7A–7C.

Figure 7E:
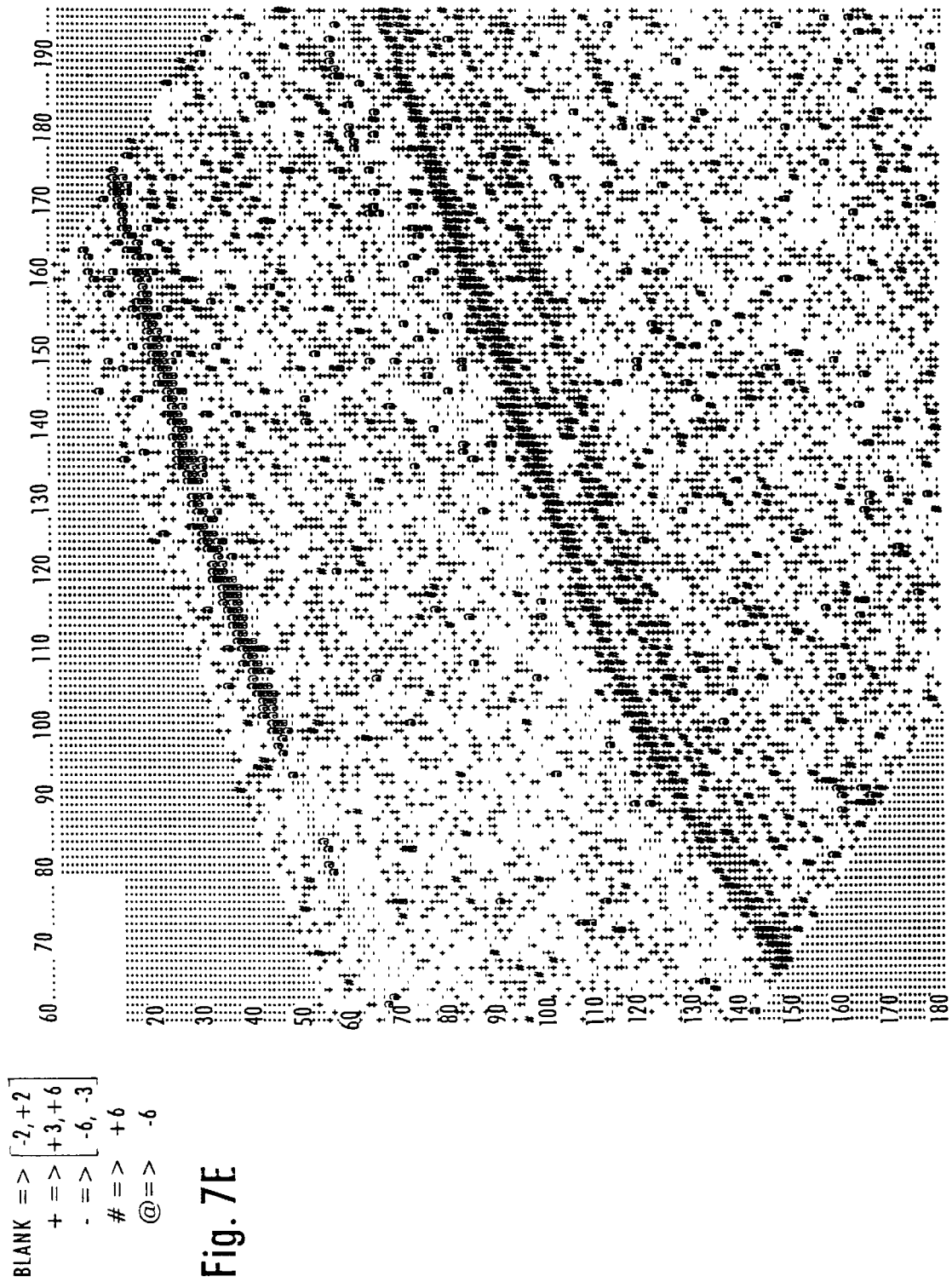

According to the specification of process 2, i.e. the second embodiment, the Analysis Image is distinct from the Original Image. While the binary pixel set corresponds to a subset of the region of the Original Image, the binary block patterns can only be illustrated with reference to the derived Analysis Image, as illustrated in FIG. 7E, described below.

Figure 8:
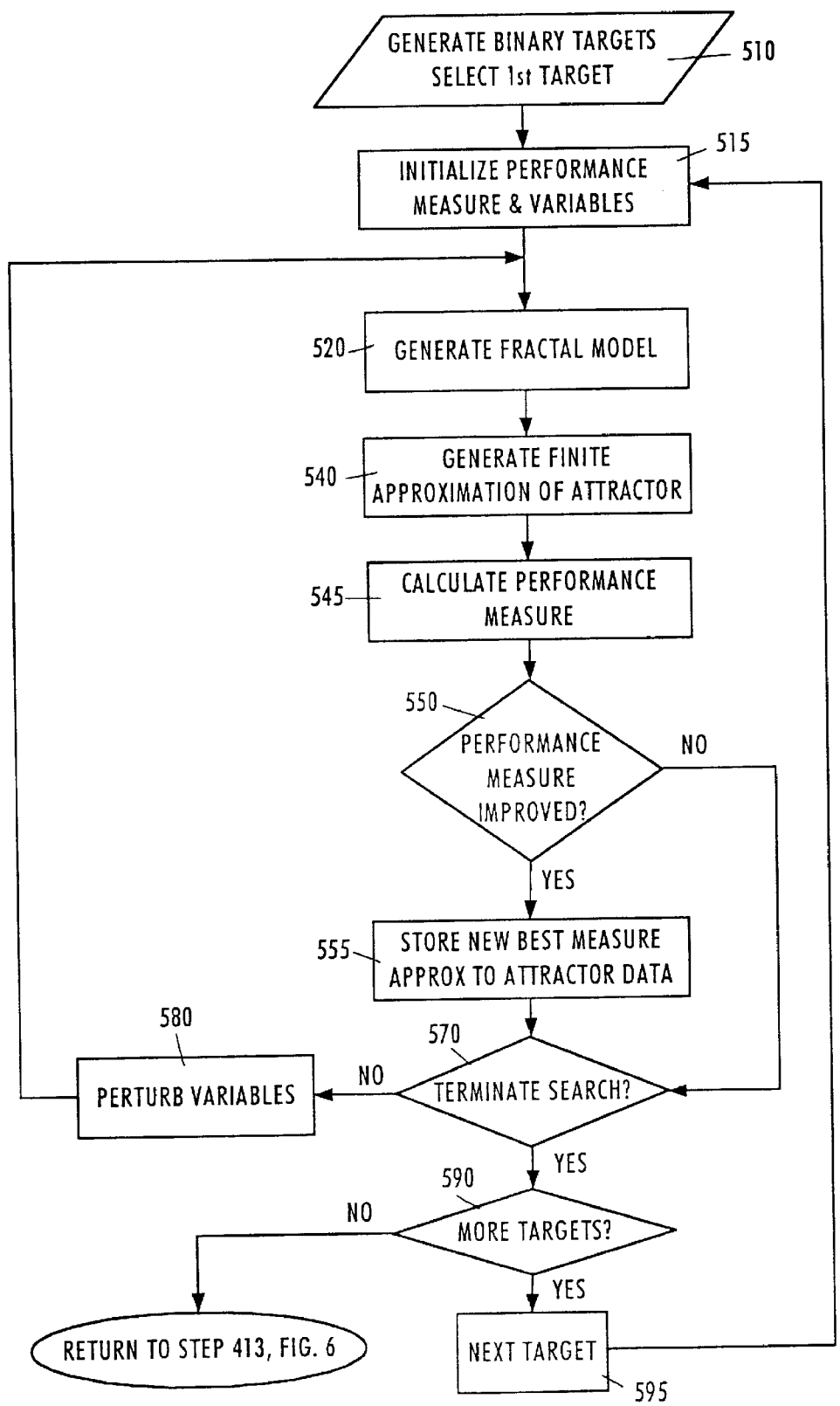
FIG. 8 is a flow diagram of how individual gray-scale level binary arrays are processed.
Figure 8A:
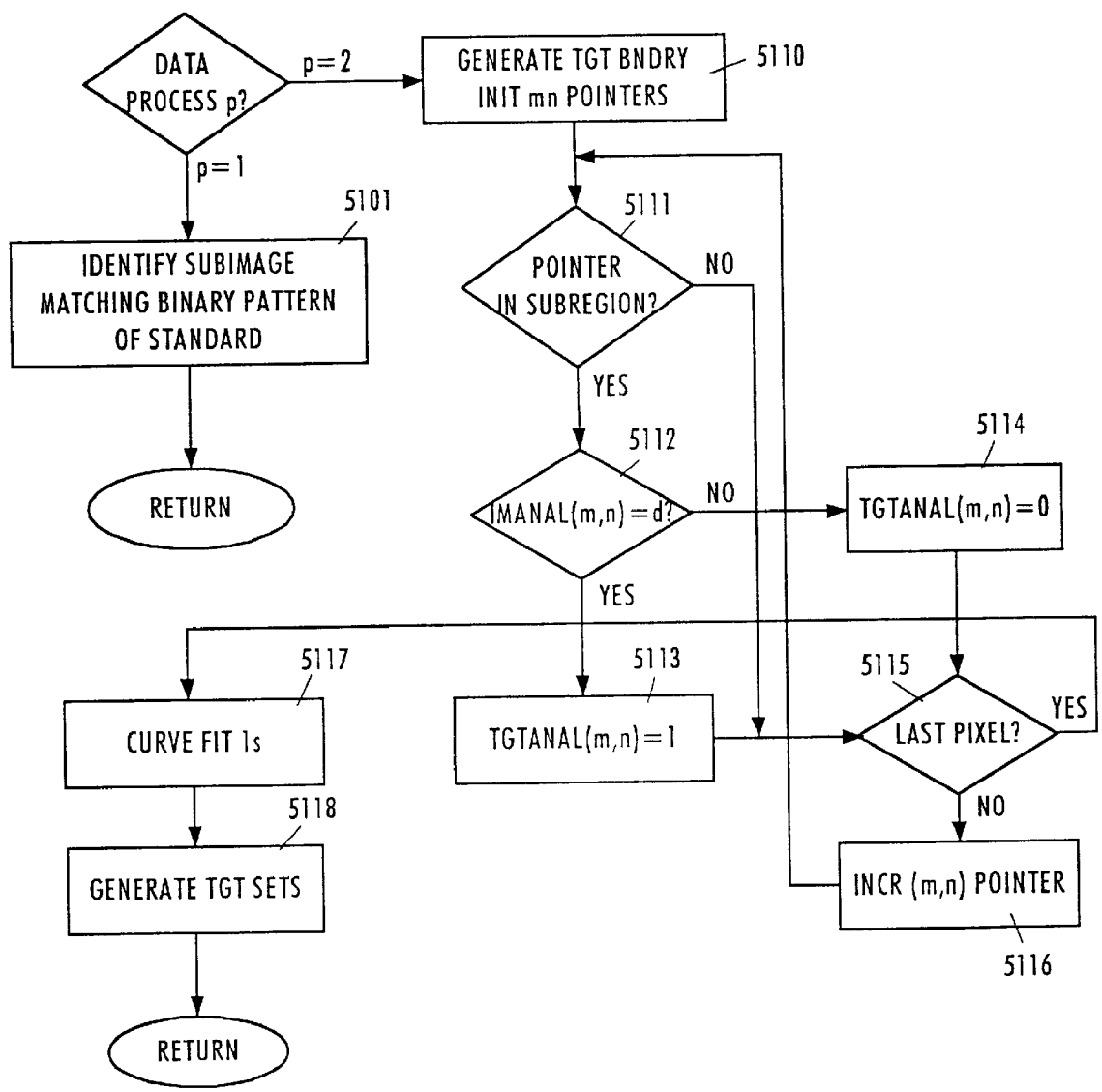
FIGS. 8A, 8B and 8C are flow diagrams of processes performed in the process of FIG. 8.
Figure 8B:
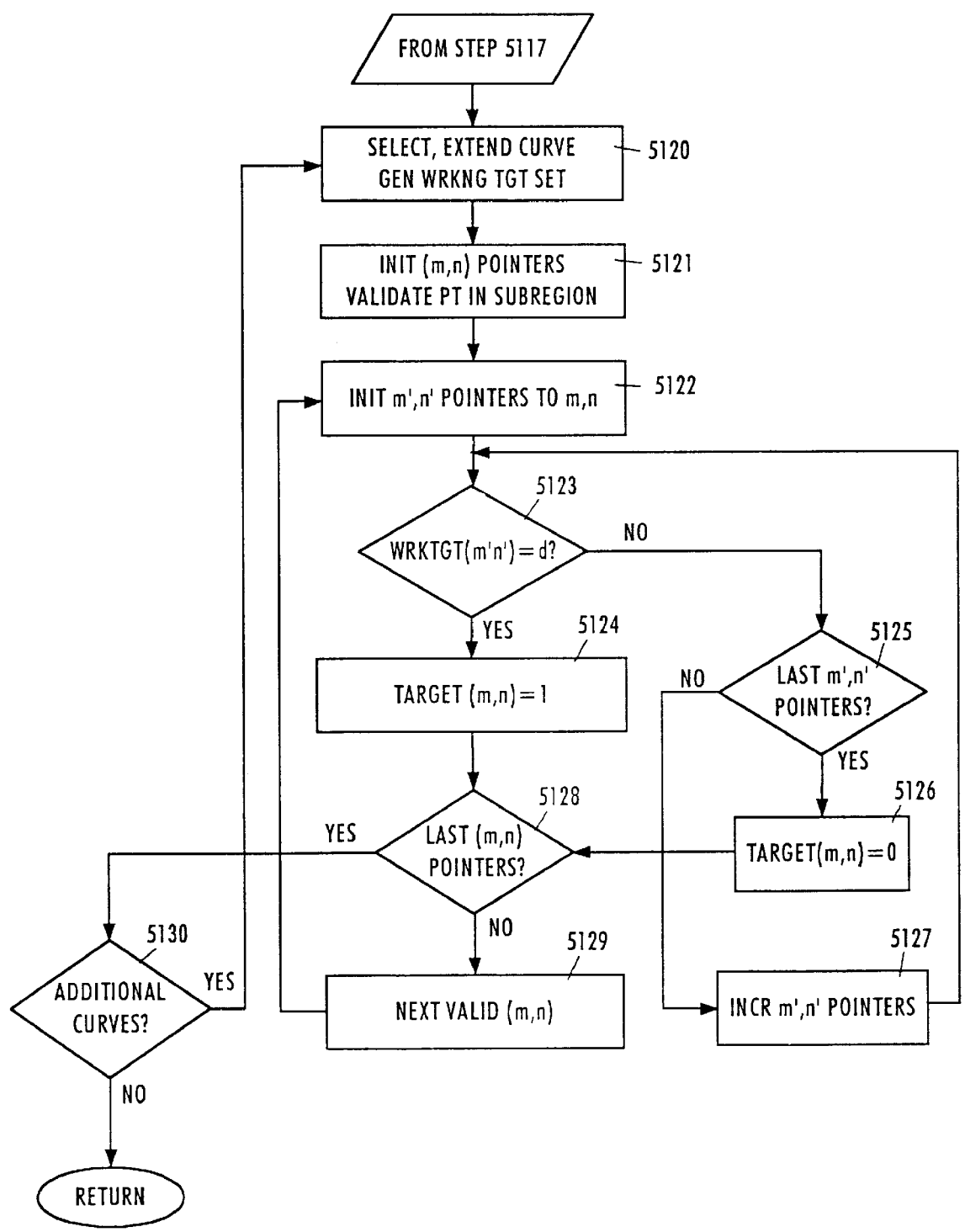
Figure 8C:
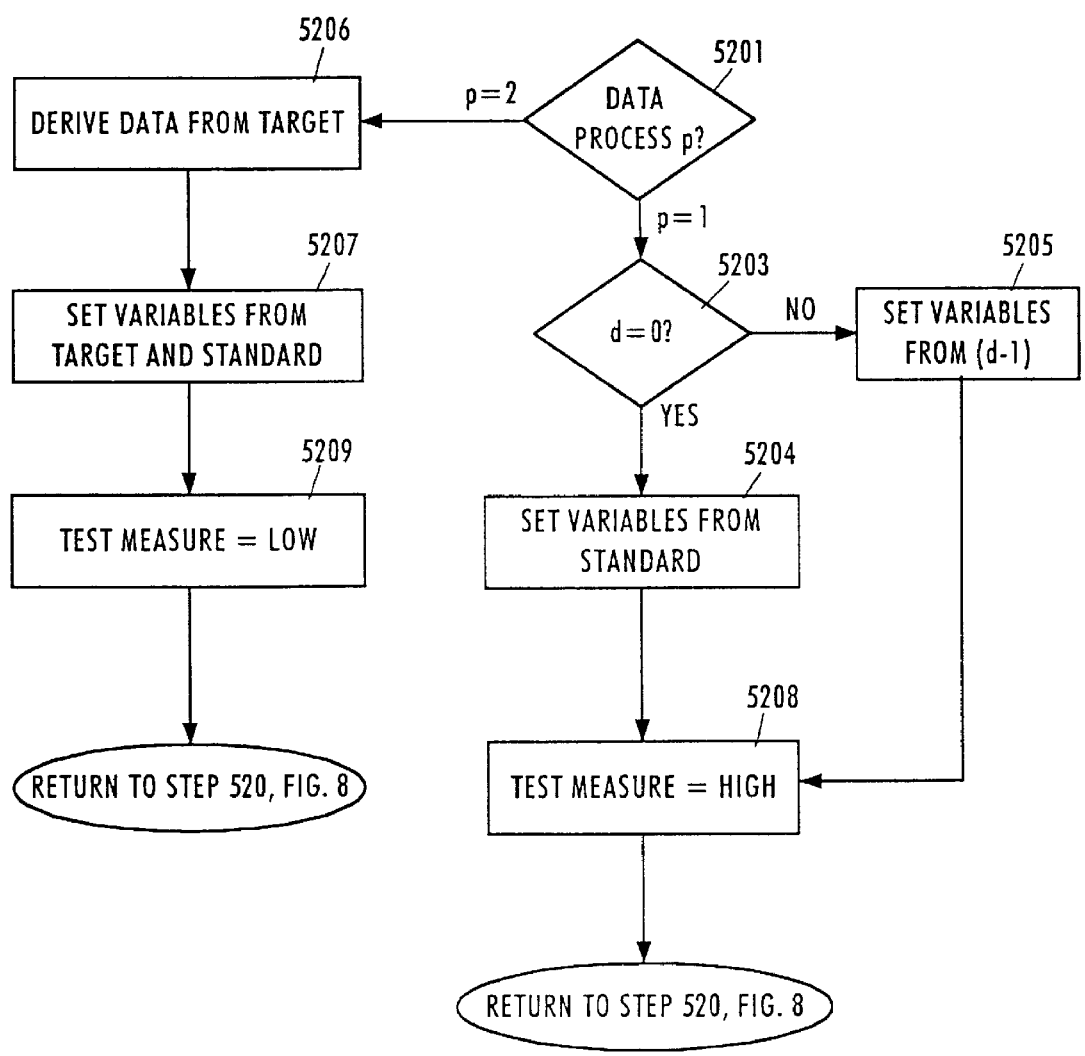

FIG. 8 is a flow diagram of how the binary arrays are processed for a specified region=r, standard=s, and gray-scale level=d in step 500, FIG. 6. In operation 510, a binary image target, or set of binary image targets, is generated and stored in memory or computer 32. Also in operation 510, a first binary target is selected using a predetermined sequencing method.

FIG. 8.1 is a flow diagram of how the binary target images are derived for region=r, standard=s, and gray-scale level=d in step 510, FIG. 8. Process 1, as indicated by Table I, utilizes a single threshold cutoff target image per region for each gray scale level. In step 5101 subimages of the region from source 12 which match binary patterns of the standard are identified.

A representative binary subimage identified during step 5101 is the block illustrated in FIG. 7C between lines 501 and 502, from the left to the right border. As the gray-scale level (d) shifts there are corresponding shifts in the boundary of the binary image (the subframe) so that, e.g., the boundary equivalent to line 502 shifts vertically for the value of d which is one greater than the previous value of d to establish the binary image of FIG. 7C as can be determined from an inspection of the gray-scale levels of FIG. 7B. In the preferred embodiment the demarcation lines between the binary block patterns are detected by the shift of the rate of change in the ratio of "0" to "1" values in adjacent pixel rows, i.e. by determining the location of the local discontinuity of a smoothed replica of the slope of the black to white transition of FIG. 7C. Alternatively, the demarcation lines can be determined by a trained operator or by geometric or fractal pattern matching techniques. The binary targets identified in step 510 fill a P×Q rectangular subframe containing a collection of binary points, representing a corresponding P×Q collection of pixels in the Analysis Image. The collection of binary values so derived defines the Binary Target. The resulting binary values are stored in memory 32.

Process 2, as indicated by Table I, utilizes multiple targets for any given region r, standard s, and gray-scale levels d. However, all targets contain a set of binary pixels which are in a 1-1 relationship with a subregion of the pixels in the region as defined by the standard. Each region consists of pixels which form a parallelogram; each subregion is obtained by excluding from the set of pixels within the parallelogram, a specified group, or specified groups of pixels according to predefined criteria. For each region, the location of pixels defining the perimeter of the subregion are derived in step 5110 and stored in memory for later use.

Figure 20A:
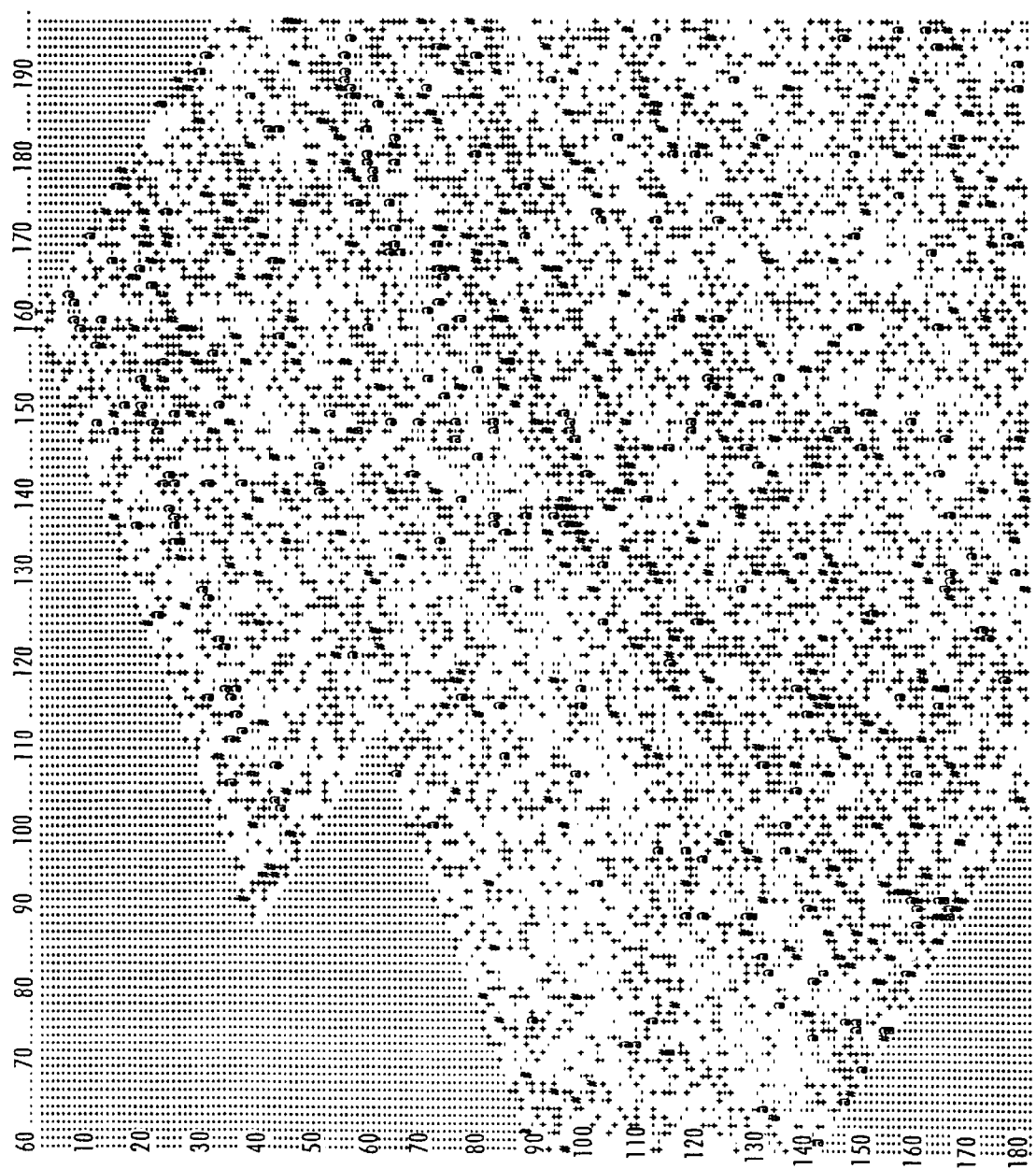
FIG. 20A is an illustration of a modified image segment in accordance with process 2.

In FIG. 7D, the excised corner is the portion of the overlapping ribs which obscures the pattern in the Analysis Image as described below. This pixel set corresponds to the binary pixels used in all target images for all d under process 2. FIG. 7E is a simplified representation of the range of gray-scale values in a portion of the completed parallelogram in the Analysis Image, before the corner has been excised. The excised corner is in a corresponding matrix illustrated in FIG. 20A, described later. The horizontal and vertical grids indicate pixel count relative to the top and left extremes. The gray-scale values in the Analysis Image are the prediction errors obtained from the original Image as the average of: (1) the difference between the original pixel values and the pixel values immediately to the left, and (2) the difference between the original pixel values and the pixel values immediately above. A line running parallel to the right sloping side of the parallelogram, through grid point (62,111), defines one side of the excised corner. This line is the break in pattern caused by the overlapping ribs. A corresponding line parallel to the sloping top-left side and running through the same grid point defines the other side of the excised corner. The demarcation between the two sub-segments in which the pattern is disrupted by the overlapping ribs, is identified by a trained operator or by geometric or fractal pattern matching techniques.

In FIG. 7E, the gray-scale values of pixels in the Analysis Image are quantified. That is, each illustrated gray-scale level is the union (OR function) of a range of adjacent gray-scale levels in the Analysis Image corresponding to FIG. 7D. For illustrative purposes, symbols have been used to indicate the quantified gray-scale levels as follows:

"@" for values less than −6;
"−" for values between −6 and −3;
" " for values between −2 and +2;
"+" for values between +3 and +6;
"#" for values greater than +6.

The excised corner is uniquely identified by a single pixel and by sides parallel to the sides of the completed parallelogram. The two diverging bands of #s corresponds to pixels in the original image which have high positive prediction errors, i.e., pixels at the edge of the rib. The two bands are caused by a hollow portion of the rib containing the vessels and nerves. Most pixels in the Analysis Image having a gray-scale value equal to a specific value greater than 6, e.g. 7, are contained in these bands.

In operation 5110, FIG. 8.1, pointers (m,n) are set and initialized to pixels in a bounding rectangle of region r, segment s, of the Analysis Image. Such a bounding rectangle consists of all pixels illustrated in FIG. 7D. In operation 5111 a test is conducted to determine if pointers (m,n) indicate a pixel used in the binary target image. If the pixel is not used in the binary target image, the pointers are incremented and the next pixel is selected for testing. If the pixel is contained in the binary target image, i.e., the excised parallelogram illustrated in FIG. 7D, control passes to operation 5112.

In operations 5112–5116, an array representing a Target Analysis Image is generated which contains a binary value associated with the spatial location of each pixel of the Analysis Image in the given region. In operation 5112, a test is conducted to determine if the value of the corresponding point (m,n) in the Analysis Image equals d. If the test is positive, in operation 5113, the binary value of the corresponding pixel in the Target Analysis Image is set equal to 1; if the test is negative, in operation 5114, the binary value of the corresponding pixel in the Target Analysis Image is set equal to 0. Thus a Target Analysis Image, with binary pixels associated with spatial locations of pixels in the excised parallelogram is developed. In operation 5117 Hough transforms are used to trace curves running through the 1's in the Target Analysis Image. The use of Hough transforms for tracing curves is known to one skilled in the art. Also in operation 5117, the curves so traced are either selected to be used in subsequent steps or are not selected for such use according to predetermined criteria. Alternatively, other automatic or manual curve-tracing techniques can be used in operation 5117. Also in step 5117 data sufficient to specify the derived curve are stored for later use. In operation 5118, a target binary image is generated for each curve selected in operation 5117 by the process illustrated in FIG. 8.1A.

FIG. 8.1A is a flow diagram of how Target Sets are generated in operation 5118. In operation 5120 a curve generated in operation 5117 is selected according to a preset criterion. The curve creates a boundary within the region, dividing the region into two parts, a set of binary pixels which are on, above and to the left of the curve and a set of binary pixels which are below and to the right of the curve. In operation 5120 an array representing binary pixel values of a Working Target Set is created so that for each element of the array, the binary value is 1 for each element corresponding to a binary pixels on the extended curve and 0 for binary pixels off of the extended curve. Thus the Working Target Set has dimension corresponding to the dimensions of the region r. Elements of the Working Target Set are indexed in two dimensions. Element (0,0) corresponds to the upper left corner of a bounding rectangle which may, or may not, lie within the region.

In operations 5121–5128 the Working Target Set is used to generate an array representing binary pixel values in a Target Set. The dimension and indices of the Target Set are the same as the dimension and indices of the Working Target Set. In operation 5121 pointers (m,n) are initialized to (0,0) and a test, similar to that performed in operation 5111, is used to restrict processing to those (m,n) which point to binary pixels in the Working Target Set. For each binary pixel in the Working Target Set a determination is made, in operations 5123–5127, as to whether any pixel below and to the right within the Target Set has a value of 1. Any binary pixel satisfying this condition has the corresponding pixel in the Target Set equal to 1. Any binary pixel in the Working Target Set which does not satisfy this condition has the corresponding binary pixel in the Target Set equal to 0. In operation 5128, a determination is made if pointer (m,n) is the last such pointer. If there are additional pointers (m,n) the pointer is incremented, in operation 5129, to the next valid point in the Working Target Set. In operation 5130, the working target set is stored in computer memory 32, and a test is conducted to determine if there are additional curves for level d. If so, the next curve is selected in operation 5120 according to a preset criteria and a Target Set is generated for this next extended curve. The thus generated arrays representing the Target Sets are stored in memory.

FIG. 8.2 is a flow diagram of how the initial performance measure and variables are set in step 515, FIG. 8. The performance measure is set high or low as specified in Table I.

A Hutchinson operator is formed from a set of contractive affine transformations. Each affine transformation in the set is defined by six variables. The standard specifies which of the six variables are independent and the dependencies for the remaining variables.

An affine transformation maps a unit square into a parallelogram. Accordingly, an affine transformation can be specified by mapping-image coordinates of the three corners A=(0,0), B=(1,0), C=(0,1) of the unit square. The mapping-image (i.e., the result of transforming a domain by the map) differs from the Original Image, Analysis Image, etc., all of which have a pictorial connotation. The affine transformation specifications use the symbols AX and AY to indicate the x and y coordinates of the image of A; similarly for B and C. The index i of AX[i] indicates which of the affine transformations is being specified.

For process 1, after step 5204 or 5205, whichever one is executed, the test measure is initialized high and control returns to step 520, FIG. 8. In step 520 a fractal model is generated and in step 540 a finite approximation of the attractor to the model is generated as described below and illustrated in FIGS. 10–12 and in the flow diagram of FIG. 13.

After step 540, during step 545, a performance measure for the approximation to the attractor is derived. Process flow for evaluating the performance measure is given in FIG. 14 and discussed below.

Figure 15:
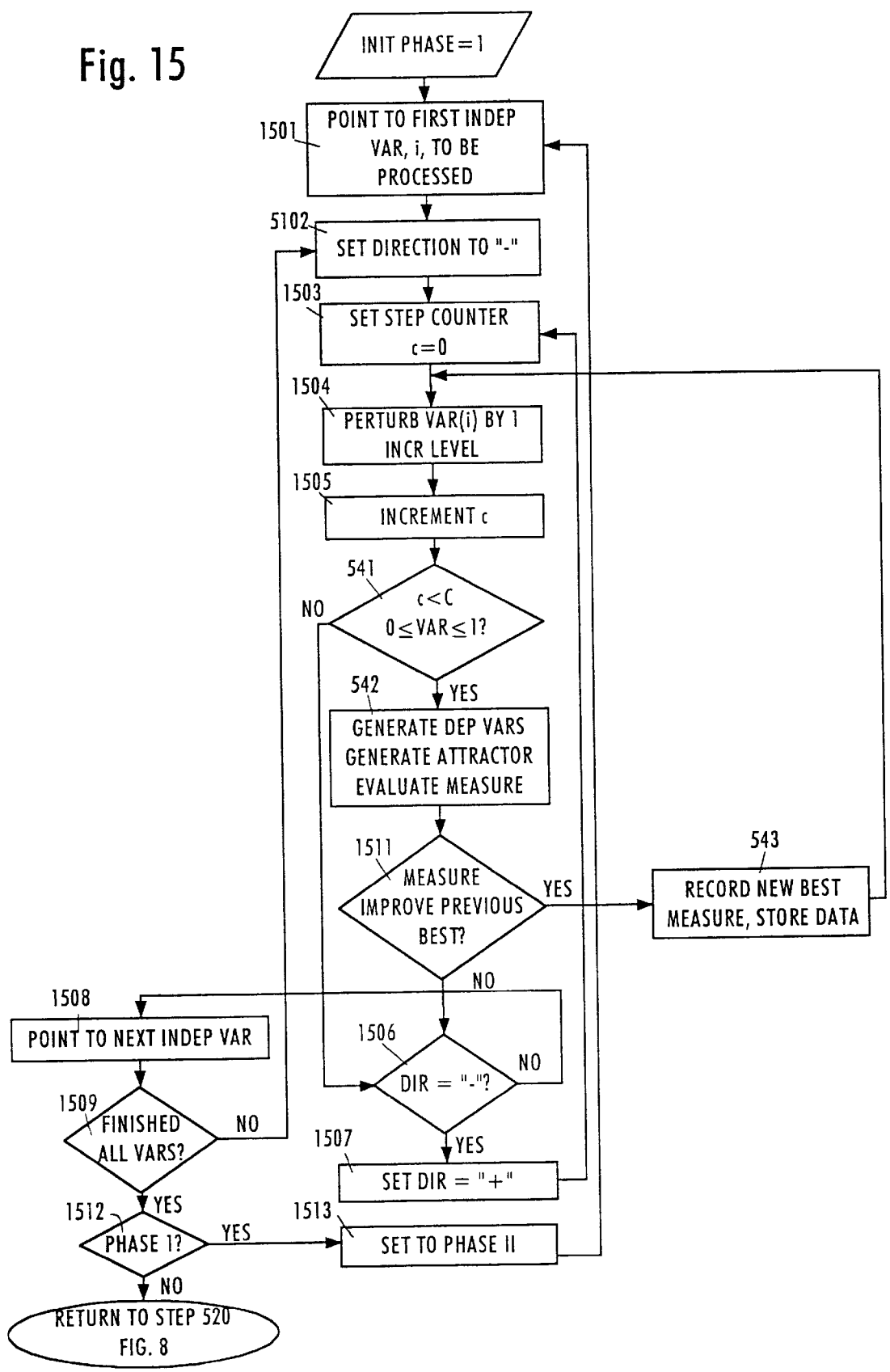
FIG. 15 is a flow diagram of how the independent variables are perturbed.
Figure 16:
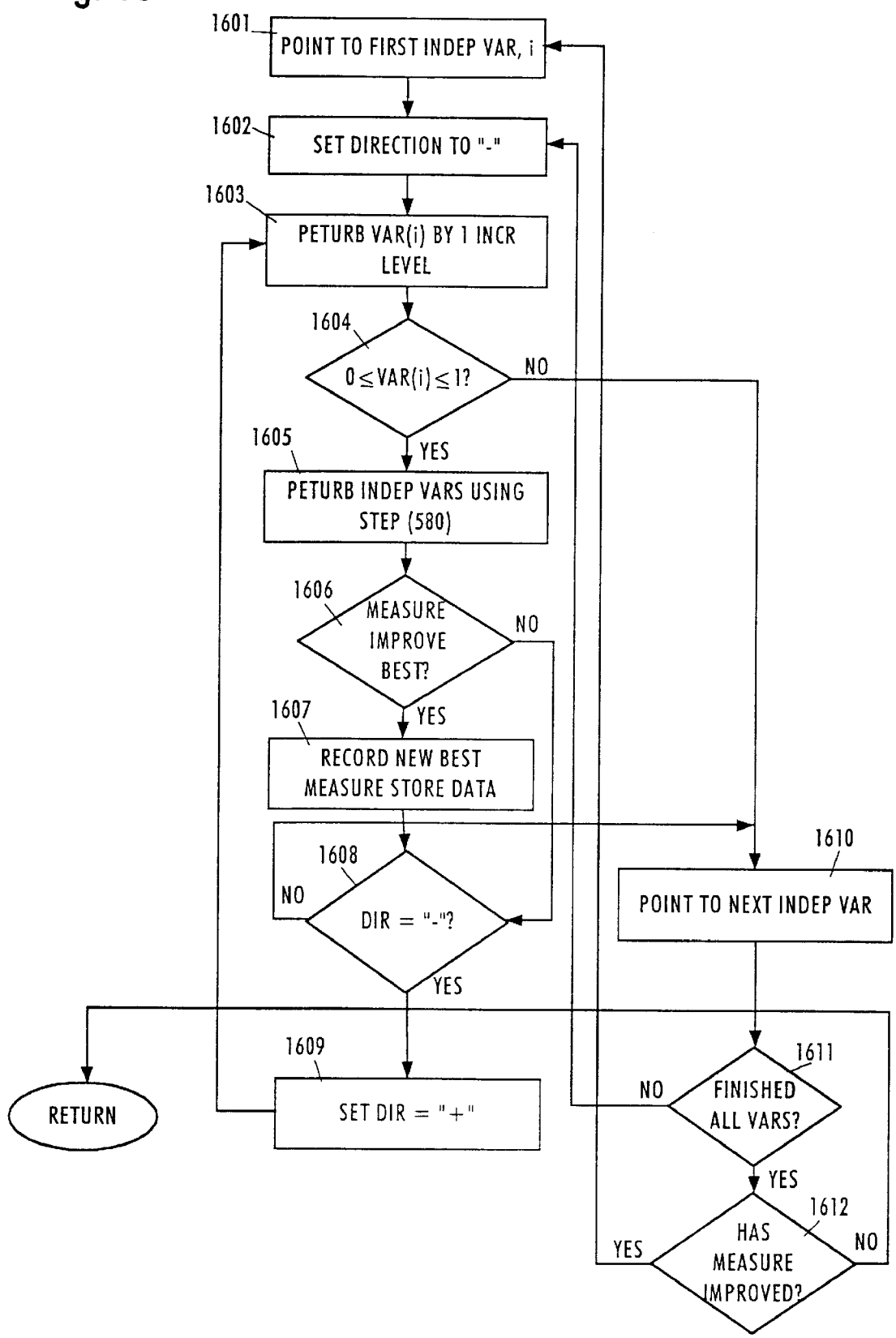
FIG. 16 is a flow diagram of an extension to the perturbation method of FIG. 15 in which performance measures are improved but processing time is increased.

To determine a relative merit of the performance measure, a "best measure" is initialized either high or low as per the specification and stored in computer memory 32. The performance measure generated at step 545 is compared to the previously stored best measure. If step 550 indicates the measure has been improved or the initial loop of step 545 is being processed, the new best measure is stored during operation 555 and a determination is made at step 590 whether the performance measure needs additional improvement. If there is to be additional improvement, variable values are perturbed during operation 580 in an attempt to improve the best performance. Perturbation of the variable at step 580 continues by continuously executing steps 520, 540, 545, 550, 555, 570 until predetermined criteria indicate that no additional improvement in performance measure should be sought. Process flow for the perturbation operation 580 is shown in FIGS. 15 and 16. When operation 570 indicates there should be no further perturbation of the variables, a determination is made at step 590 if there are additional target images for the standard s, region r, level d being evaluated. If there are additional targets, the next target is selected according to a predetermined ordering and the loop consisting of steps 515–570 is processed for this next target. When no more targets are to be processed, the program returns to step 413, FIG. 6.

For process 1, standard 1 (Table I) for the chest x-ray image of FIGS. 7A–7C, there are seven affine transformations including 13 independent variables and 29 dependencies, i.e. values which result from the transformation rules, and 13 independent variables. For the gray-scale level d, starting values of the independent variables for the iterative procedure are obtained during operation 5204 from the standard in Table I. For d>0, starting values are obtained during operation 5205, from the values of the previously processed level (d−1); in general, as d increases, the demarcation line between black and white regions moves from right to left in FIG. 7C. Starting affine transformation values are illustrated as the resultant image of a the unit square (containing a stick figure of a man) under the transformation. The resultant images are illustrated in FIGS. 9A–9G.

Figure 7F:
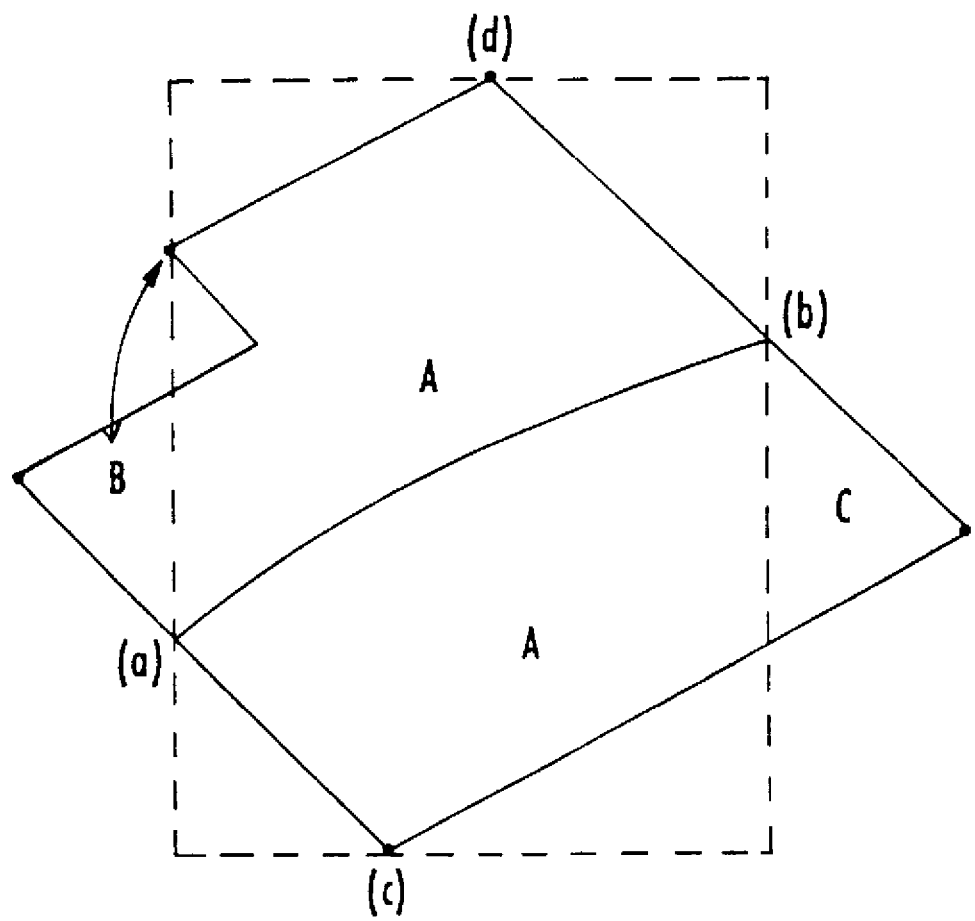

For process 2, standard 1 (Table I) for the chest x-ray image of FIG. 7D a series of Target Images is derived from FIG. 7E as described above in step 5118. Each Target Image generated in step 5118 consists of a partitioned subset of a parallelogram with 1's in the upper partitioned region and 0's in the lower partitioned region. FIG. 7F is an illustration of an idealized target image. Point (a) is the intersection of the boundary between the partitioned regions with the left side of the perimeter of the Target Image; (b) is the intersection of the boundary between the partitioned regions with the right side of the perimeter of the Target Image; (c) is the lower-most corner of the Target Image; and (d) is the upper-most corner of the Target Image. A rectilinear frame is superposed with the left vertical side running through (a), the right vertical side running through (b), the bottom edge running through (c), and top edge running through (d) as shown in FIG. 7F. A binary fractal model is then generated within the rectilinear frame using affine transformations as specified by the standard of Table I. Pixels that lie within the intersection of the Target Image and the rectilinear frame (indicated by "A" in FIG. 7F) have values determined by the fractal model which is constructed on the rectilinear frame. Pixels corresponding to the Target Image and (1) to the left of the vertical line running through (a) and (2) outside the rectilinear frame are set to 1 (indicated by "B"); pixels corresponding to the Target Image and (1) to the right of the vertical line running through (b) and (2) outside the rectilinear frame are set to 0 (indicated by "C").

Figure 7G:
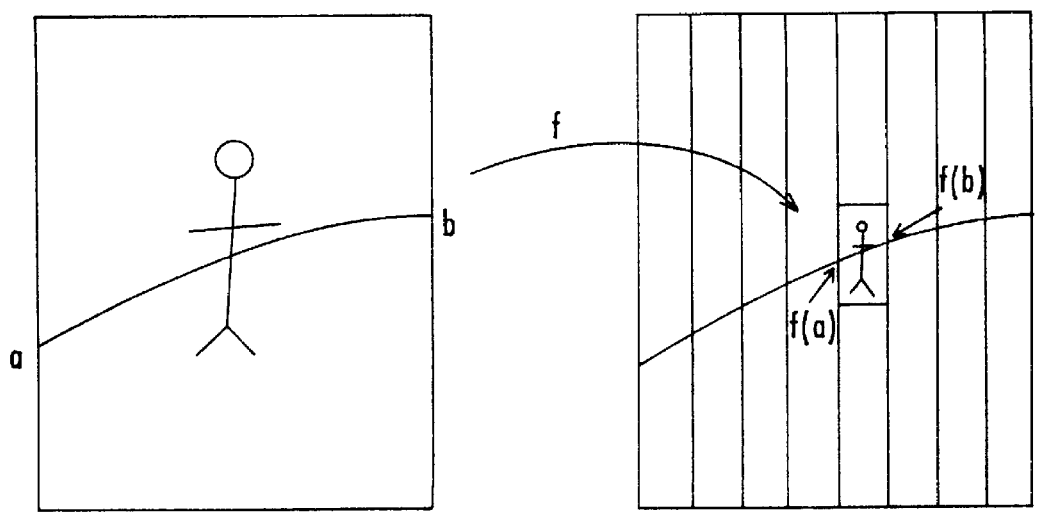
FIG. 7G is an illustration of a representative image in accordance with the second process.

Each affine transformations defined in the standard maps the rectilinear frame into itself. In the standard specified in Table I there are 8 transformations with each transformation mapping the rectilinear frame into one of 8 equal-width vertical strips which partition the rectilinear frame. In operation 5206, data are derived from the binary target image used to set the initial values in operation 5207 which define each affine transformation. Thus the transformation dependencies for process 2 are set on the basis of data derived from the Target Image. Specifically, for each strip, the transformations are constrained to force the transformation to map points (a) and (b) onto the boundary curve of the Target Image and to force the image of the affine transformation to be vertically oriented within the strip without shear, reflection or rotation. These constraints permit each transformation to be defined by two independent variables, and the remaining parameters determined by the dependencies. FIG. 7G is an illustration of a representative image of such an affine map where the representative affine transformation is denoted by "f". Thus, the eight affine transformations have 16 independent variables and 32 dependent variables. During operation 5209, FIG. 8, a low test measure is initialized to be used for comparison in operation 550.

After initial values are set in operation 515, a fractal model is generated in operation 520. The fractal model is defined to be the attractor, or fixed point, of the Hutchinson operator which corresponds to the set of affine transformations which are obtained from the independent variable values and dependencies derived in operation 515 and from the standard.

A fractal is an infinitely complex image in which patterns are repeated to infinitesimally small scale. Since the Target Image has only a finite number of pixels, and since the pixel model is to contain pixels in a 1-1 correspondence to the Target Image, the modeling method is modified to generate a finite approximation to the fractal attractor. In operation 540 procedures and specifications are defined for each standard to generate a finite approximation of the fractal model.

For process 1, the predefined pseudo-random sequence method of generating the FAA is specified in the standard. In this method, a fixed pseudo-random number sequence generates the finite approximation to the attractor, as illustrated by the process steps of FIGS. 9–13.

FIGS. 9A(1)–9G(2) indicate how the independent variable values for each of the seven affine transformations for a representative set are established from standard No. 1 (Table I) for the chest X-ray image. The remaining variable values are obtained from the dependencies specified in the standards of Table I. A pictorial representation of the image of a stick figure in the unit square under each of the affine transformations is also shown. Variable values are restricted to quantification levels n★0.005, where n is between 0 and 200 as required by the specification.

The Hutchinson operator is formed by taking the union of the images shown in FIGS. 9A (2)–9G (2). The union involves superposing the images of FIGS. 9(A)2–9G(2) on each other. This union, a collage of seven rotated, shrunken and skewed stick figures, is then used in place of the single stick figure in the unit square (as illustrated in each of FIGS. 9A(b)–9G(1)). Then the process of forming seven new images is started again. The process is repeated a large number of times. Eventually, the process stabilizes and the union of the seven copies of the input figure looks somewhat like the input image. The figure which is not changed by this process is the attractor of the Hutchinson operator. If we had started with a picture of a horse, or any other picture, instead of a stick figure, the same attractor would have been derived. A finite algorithm generates an approximation to the attractor, rather than the attractor itself.

Affine linear transformations involve changing one image into another by scaling, shearing, reflection, rotation and translation; Fractals for the Classroom, Petitgen et al., (1991) published by Springer-Verlag, page 260. An image P=(x,y) in one plane is linearly transformed into the image F(p)=(u,v) in a second plane by the transformation equations u=ax+by+e, v=cx+dy+f, ibid, pages 261–263. The values of a, b, c, d, e and f are the affine transformation coefficients. While these coefficients are not directly used in the preferred embodiment, the values of AX[1–7], BX[1–7], CX[1–7], AY[1–7], BY[1–7] and CY[1–7] in Table I are functions of a, b, c, d, e and f.

In FIGS. 9A(1)–9G(2), values to transform the corners of the unit square including the stick figure images of FIGS. 9A(1)–9G(1) to the stick figure images of FIGS. 9B(2)–9G (2) are given above each corresponding pair of figures. Thus in the rotational transformation of FIG. 9A(1) to FIG. 9A(2), point x=0, y=0 at the lower, left corner of the unit square of FIG. 9A(1) is transformed into the point x=0, y=0.35 in FIG. 9A(2); point x=1, y=0 at the lower right corner of the unit square of FIG. 9(A)2 is transformed into the point x=0.785, y=0.115; and point x=0, y=1 at the left, upper corner is transformed into the point x=0.255, y=1. The unit square of FIG. 9B(1) is transformed into the parallelogram of FIG. 9B(2), point x=0, y=0 is transformed to x=0.36, y=0.005m; x=1, y=0→x=0.91, y=0.905; and x=0, y=1→x=0, y=0. From the foregoing, the transformations for the remaining FIGS. 9C–9G are easily deduced from the data above each pair of figures.

The transformations of FIGS. 9A(1)–9G(2) were specifically chosen to derive the approximate attractor image for the binary standard chest X-ray image. The transformations of FIGS. 9A(1)–9G(2) cause the stick figure image to be (1) translated toward the right edge of the figure, where the ribs of FIGS. 7A–7B are located, and (2) bent to define the location of the indentations of the black-to-white transitions associated with the subimages of FIG. 7C between lines 501 and 502 or 502 and 503 or 503 and 504. The stick figure is thus transformed into the attractor image.

Figure 10:
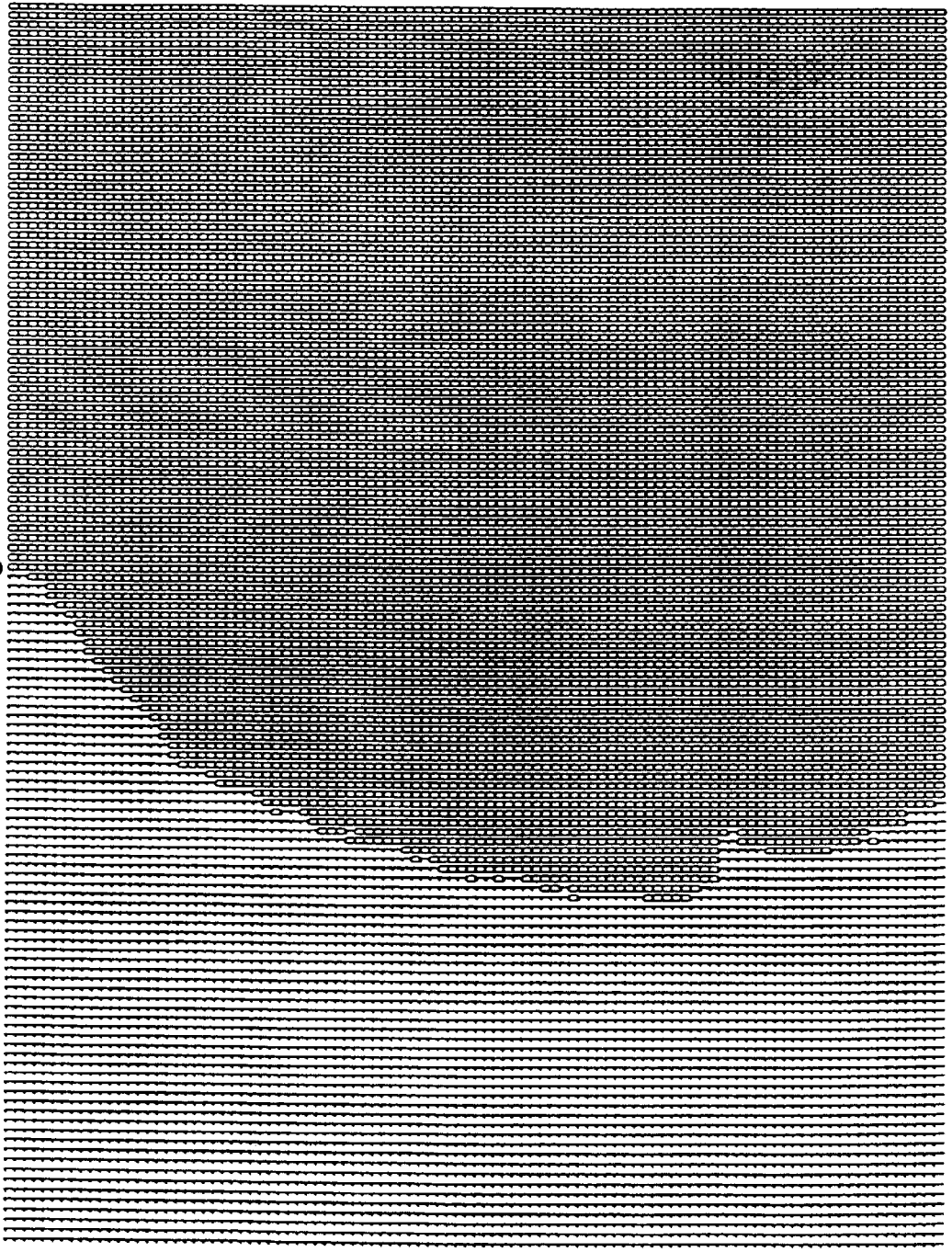
FIG. 10 is a representative threshold cutoff binary image.

FIG. 10 is a binary matrix representing a Binary Target image between lines 501 and 502 obtained from binary standard matching step 510, FIG. 8, by using the transformations of FIGS. 9A(1)–FIGS. 9G(2). This is the target which is fractally modeled by the Hutchinson operator. As indicated by pages 263–265 of *Fractals of the Classroom*, the Hutchinson operator in this instance is the union of the seven images of FIGS. 9A(2)–FIGS. 9G(2). This particular subimage was generated from gray-scale level 26. The "0" values of FIG. 10 indicate "black" pixels of the standard image while the "1" values indicate "white" pixels, similar to the white and black regions of FIG. 7C.

Figure 11:
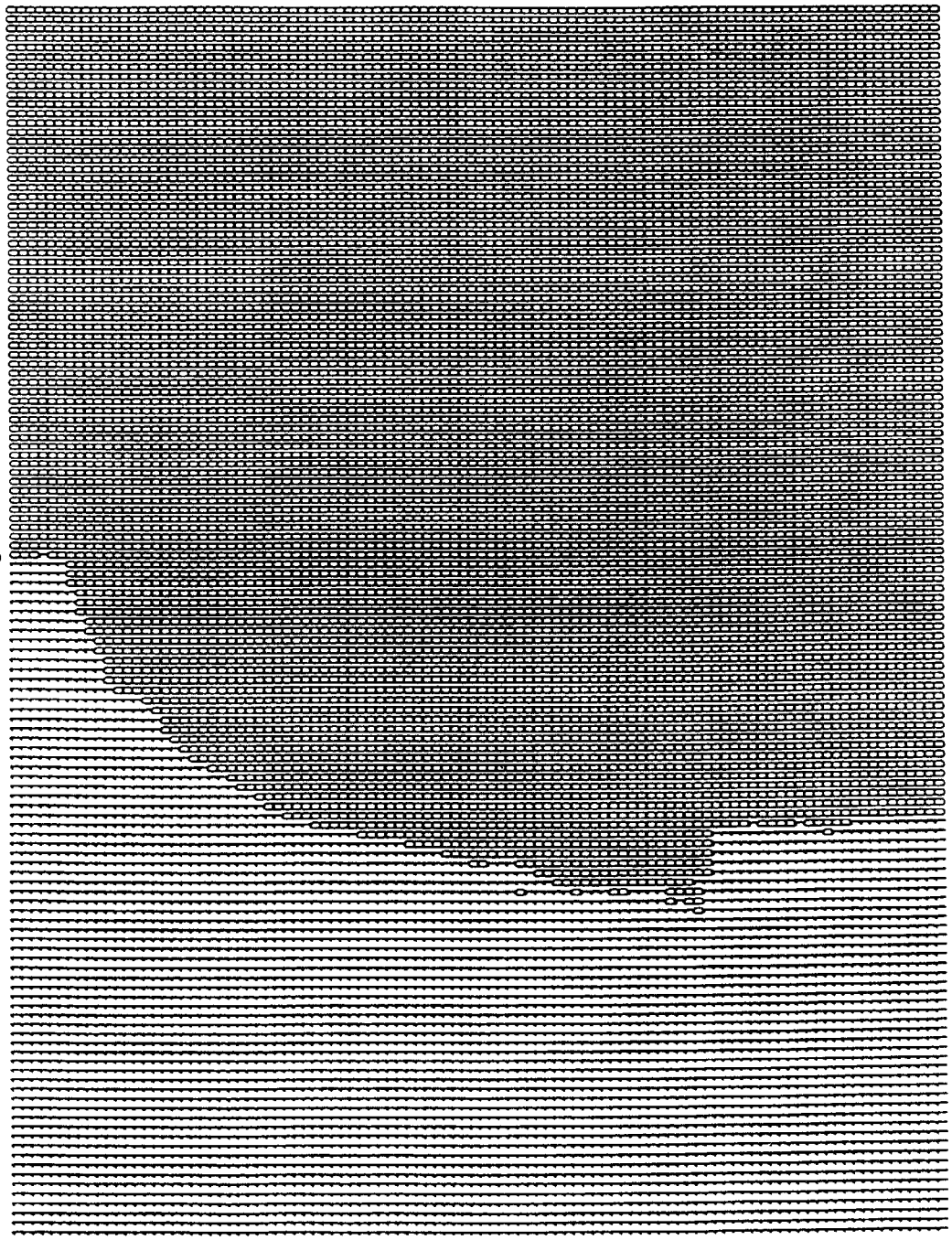
FIG. 11 is an approximation of an attractor of a Hutchinson operator for modeling the image of FIG. 10.

FIG. 11 is an approximation to the attractor of the Hutchinson operator defined by the affine transformations shown in FIG. 9 and mapped by function g of the standard of Table I. The approximation to the attractor is a subset of the unit square; the mapping stretches the unit square into a rectangle matching the dimensions of the target binary subimage. The independent variables are obtained using the perturbation methodology of step 540 to approximate the pattern in FIG. 10. Again the binary "1" and "0" values respectively represent white and black pixels of the image.

Figure 12:
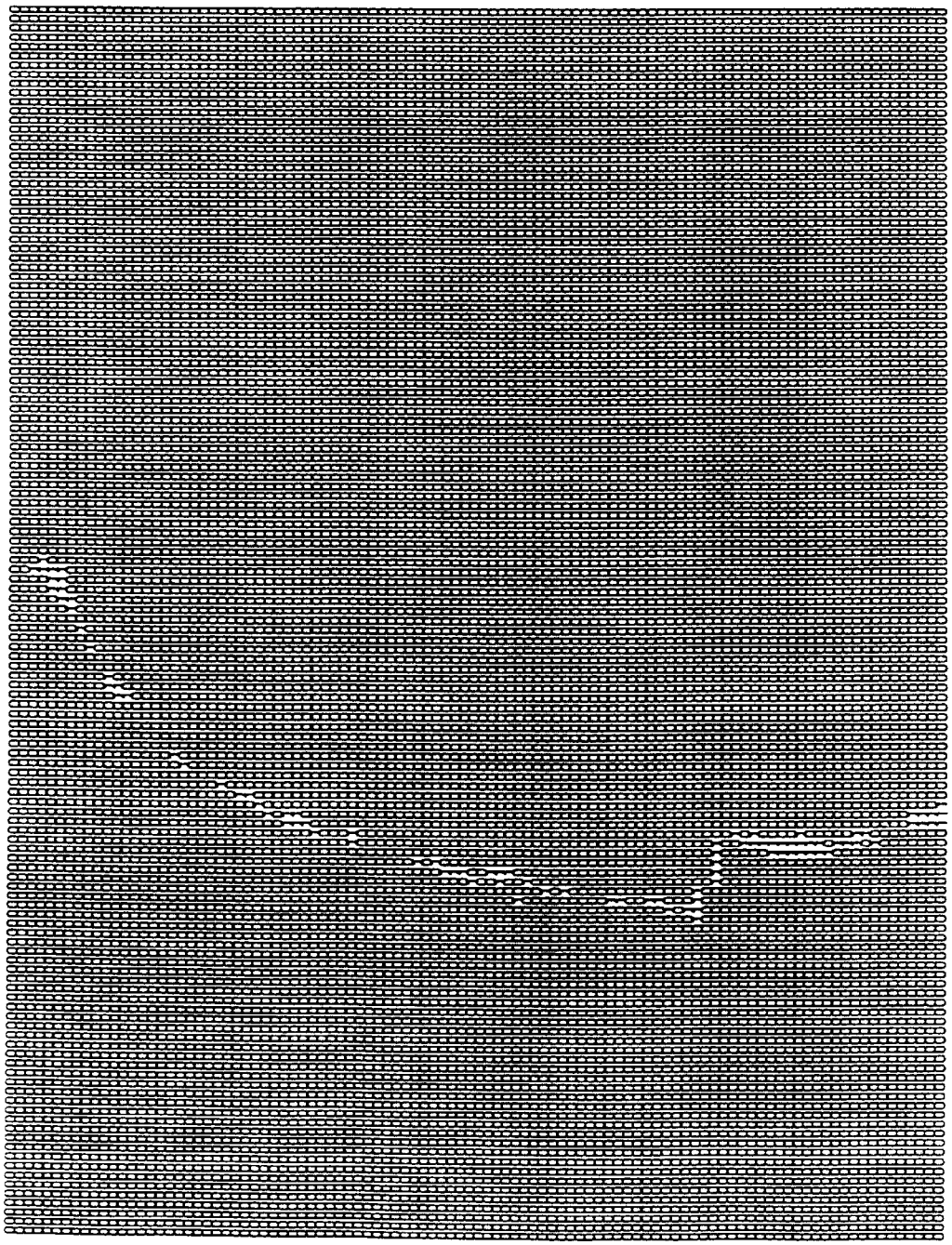
FIG. 12 is an illustration of points which differ between FIGS. 10 and 11 such that the number of differing points in FIG. 12 is a measure of the error of the approximation when used as a model of the binary image in accordance with the first process.

FIG. 12 is a map of the pixel values which differ between FIGS. 10 and 11, where "0" and "1" values respectively represent pixels having the same and differing values in FIGS. 10 and 11. The number of differing points (i.e. number of "1" values) is a measure of the error of the approximation of FIG. 11 as a model of the target image of FIG. 10, which is derived from source 12. The error measure so derived is used as a measure of the performance of the approximation of the attractor in modeling information content of the original image.

FIG. 13 is a flow diagram of how the approximation to the attractor of the Hutchinson operator is derived in step 540, FIG. 8 using the predefined pseudo-random sequence method as specified in process 1. The process control switches to step 1301. Let "T" denote the number of affine transformations in the standard. A predetermined sequence of pseudo-random integers in the range (1,T), as derived from generator 34, is used in all steps requiring pseudo-random numbers. Specifications sufficient to generate such a predetermined sequence in a variety of computer systems are required; such specifications are known to persons skilled in the art.

In the process of FIG. 13, an approximation to the attractor of the Hutchinson operator in the unit square is generated by principals as described in connection with FIG. 9: a P×Q array U, representing central points of a rectangular grid, superimposed on the unit square, is initialized during operation 1301 to all 0's. The values of P and Q are obtained from the pixel dimensions of the binary block pattern being modeled. An initial point is selected according to predetermined criteria. The first pseudo-random number is read during operation 1302 to identify which affine transformation is to be used. Then during operation 1303, the first image point (p,q) of array U is selected. The selected transformation maps the presently selected image point to a new point in the unit square during step 521. Selection of which of the seven transformations is to be performed depends on the number in the pseudo-binary number sequence read during operation 1302.

During the first L points involving pseudo-random selection of the affine coefficients, where L is determined by a predefined criterion, the transformations are not used because the process is in a start-up state in which the derived points are still distant from the attractor; the value of L is determined by how many transformations are necessary to assure acceptable proximity to the attractor. Step 522 determines if L has been reached. After step 522, the random number generator is incremented during step 1304, after which the program returns to mapping step 521.

If the pseudo-random sequence has advanced past the first L points, the transformed point in array U is stored and marked during operation 1305. Remaining points in array U which are hit during the iterative process identify entries in the array U which are set to a 1 value.

After step 1305, a determination is made during operation 523 as to whether the last point, K, to be retrieved from the pseudo-random sequence has been reached. If the last point has not been reached, steps 1304, 521, 522, 1305 and 523 are successively repeated in sequence until the last point is reached. When the last point has been reached, array U is mapped during operation 524 to a quadrilateral frame, as defined between lines 501 and 502, FIG. 7. In step 524, the set of points of the unit square obtained by the transformation process is mapped by superposition to corresponding points in a grid structure of the quadrilateral frame using map g of the standard, Table I. After step 524, the program returns to error evaluation step 545, FIG. 8. For a rib X-ray subimage between lines 501 and 502, the value of L set at step 522 is set to an appropriate value, e.g., 1,000, and the set value K at step 523 is either 500,000 or 2,000,000 as prescribed by the standard (Table I) and described in connection with FIG. 15.

Figure 13A:
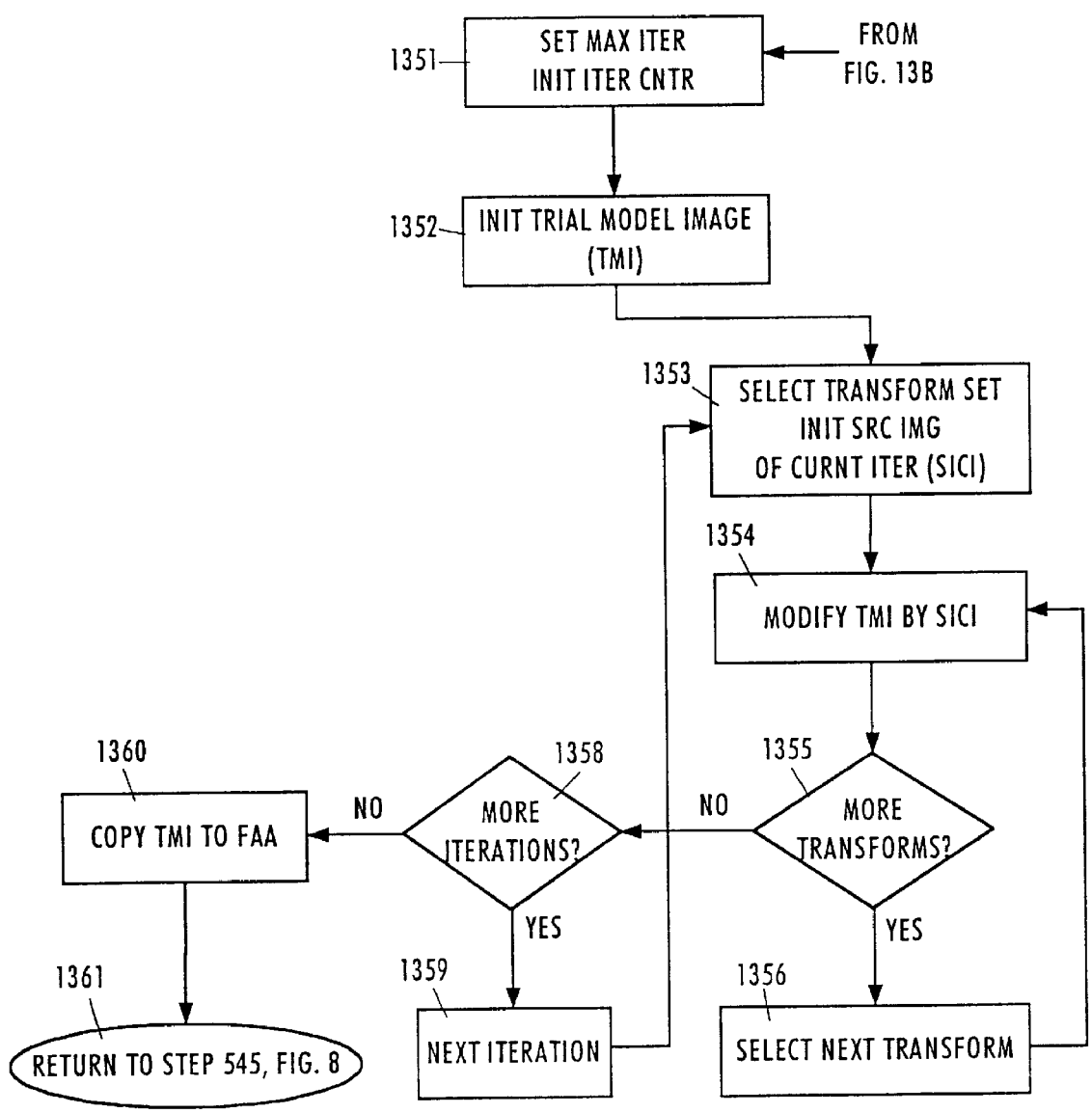
FIGS. 13A and B are flow diagram of how the approximation to the attractor of the Hutchinson operator is generated.

For process 2, the modified MRCM method is specified by the standard. Implementation of the modified MRCM method is shown in the procedures of steps 1351–1360, FIG. 13. In step 1351 a maximum iteration counter in computer 25 is set equal to the Cycles for Processing Pass specification and other parameters are obtained from other specifications of the standard. The iteration counter is initialized to 1. In step 1352, a binary array representing pixels in a Trial Model is initialized to all 0's. Each binary pixel in the Trial Model corresponds to a pixel in the rectilinear frame generated in steps 5206–5207. In step 1353, pixels above the horizontal line which runs through point (b), defined in step 5207 and illustrated in FIG. 7F, are set to 1. Thus the current Trial Model is an image containing 1's in an upper rectangle and 0's in a lower rectangle. An illustrative Trial Model corresponding to FIG. 7F is shown in FIG. 13A. In step 1354, an array corresponding to the Source Image of the Current Iteration (SICI) is made as a pixel-by-pixel copy of the current Trial Model. Thus the SICI has the same dimensions and pixel count as the rectilinear frame of steps 5206–5207. At this stage of processing, the SICI is also illustrated by FIG. 13A. Data representing the SICI are stored in memory 32.

Figure 13B:
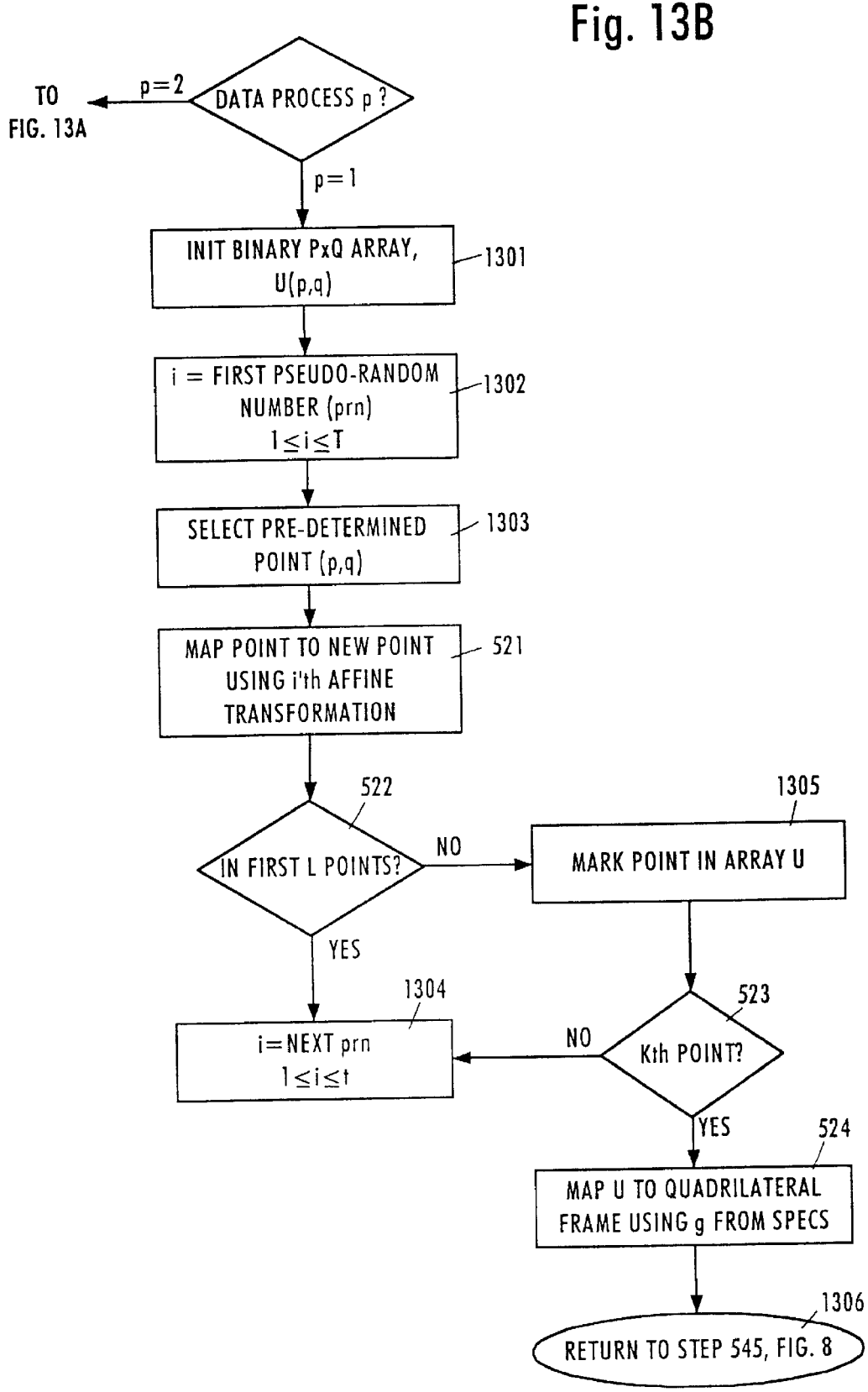
FIGS. 13C, 13D, 13E and 13F are illustrations of how the approximation to the attractor is generated in accordance with process 2.

In step 1354 an affine transformation, from the collection of affine transformations which define the Hutchinson operator generated in step 530, is selected according to a predetermined sequencing. The horizontal and vertical scale indicators of the CISI are normalized using the inverse of the affine transformations of the specification of Table I so that the normalized CISI is indexed by the unit square. The normalized CISI is mapped into the unit square using the selected affine transformation. The projected image is then transformed back to the rectilinear frame using mapping g. The result, FIG. 13B, is a reduced copy of the CISI contained inside the rectilinear frame. The reduced copy contains 1's (represented by hatched rectangle 5 in FIG. 13B) in the upper portion and 0's (represented by rectangle 6) in the lower portion of the miniaturized frame.

Figure 13C:
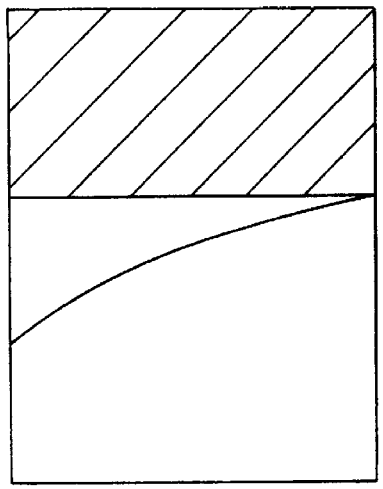
Figure 13D:
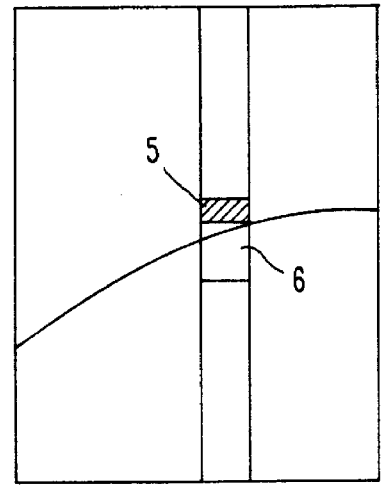
Figure 13E:
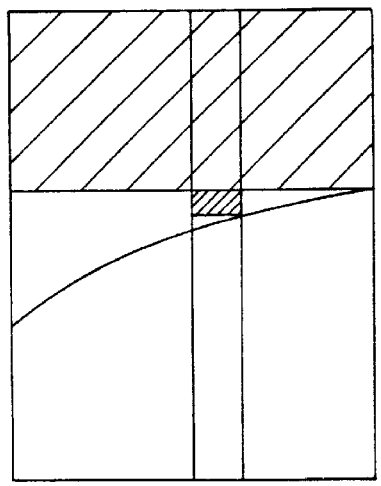
Figure 13F:
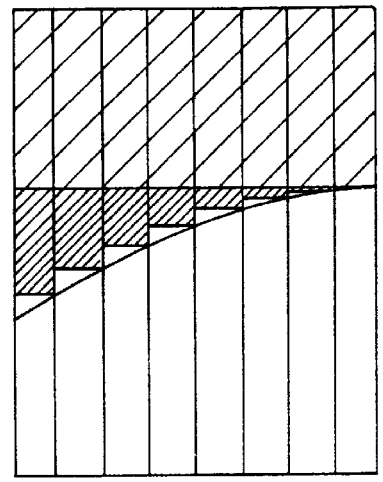

In step 1355, FIG. 13, the reduced copy of the CISI is superimposed on the Trial Model and the Trial Model is modified as follows: (A) any pixel, (m,n), where m indicates row and n indicates column, which has binary value 1 in either the current trial model or the superimposed reduced copy of the SICI is set equal to 1; (B) all pixels (m',n) where (m,n) was set to 1 in step (A) and m'<m are also set to 1. That is, all pixels above a 1 are also 1. The modified Trial Model is illustrated in FIG. 13C.

In steps 1356–1357, the next sequential transformation is selected and the process continues until all affine transformations have been so processed. When step 1355 detects completion of the process, causing 1358 to be entered, the trial model contains a stair-case image, illustrated in FIG. 13D. In step 1358, the iteration counter is checked for termination by comparing the content of the iteration counter with a maximum value therefor stored in a register of computer 26 or memory 32. If additional iterations are required, the current Trial Model is copied to the CISI and the process is repeated.

In operation 1360, values of an array designated Finite Approximation of the Attractor (FAA), with the same dimensions as the Target Image, are determined by assigning: (1) elements of the FAA corresponding to elements of the Target Image which are within the rectilinear frame described above and illustrated in FIG. 7F, section "A", the corresponding values from the Trial Model; (2) value 1 to elements of the FAA to the left of the frame, i.e., x coordinate less than ($a_x$), Section "B", and (3) value 0 to elements of the FAA to the right of the frame, i.e., x coordinate greater than ($b_x$), section "C".

In step 545 a performance measure is derived for the Finite Approximation of the Attractor derived in step 540 according to the specification of Table I.

Figure 14:
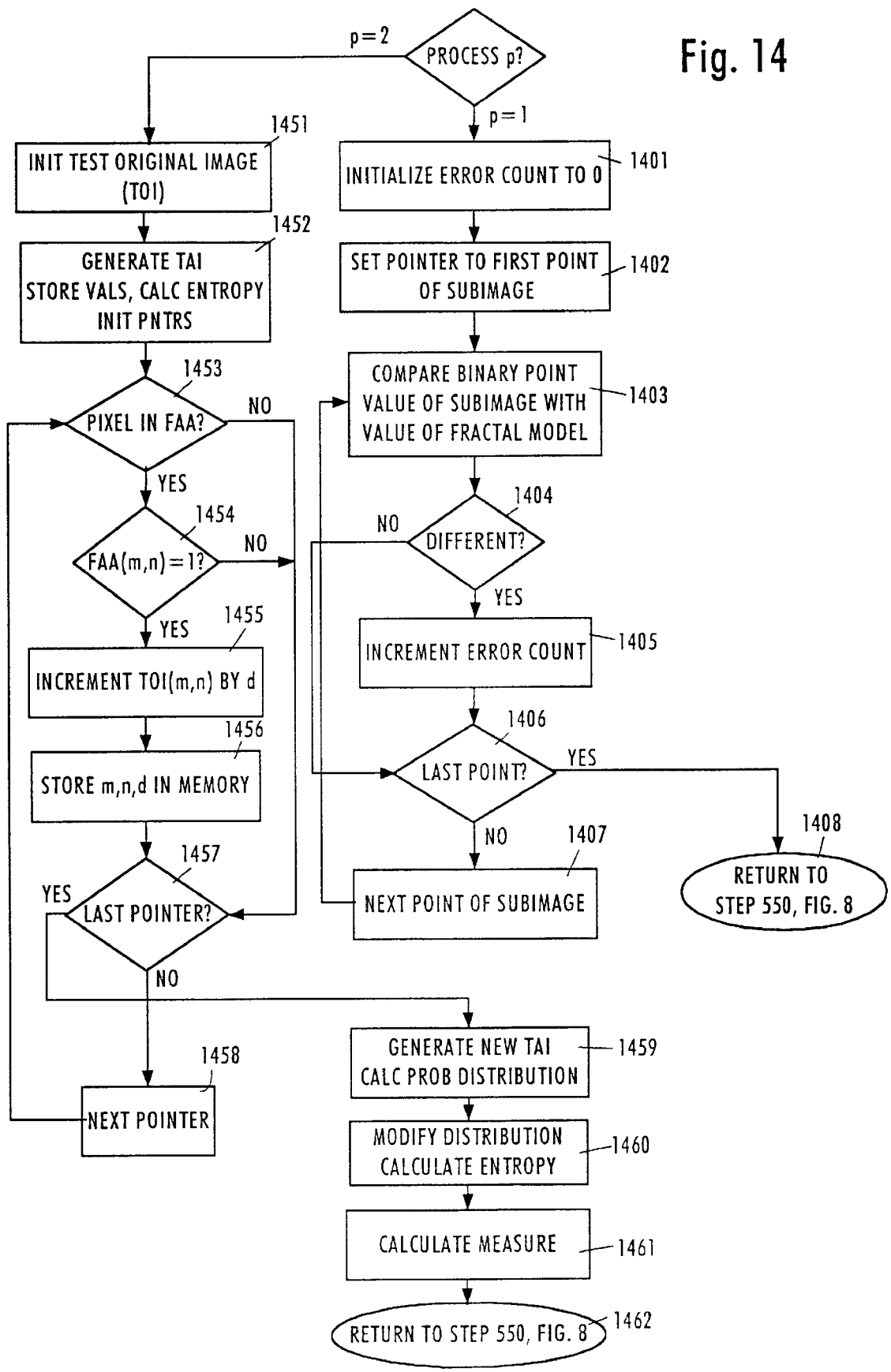
FIG. 14 is a flow diagram of how a representative performance measure is generated.

FIG. 14 is a flow diagram of operations to determine the performance measure in using the Finite Approximation of the Attractor generated in step 540 as a model of the Target Image generated in step 510. To assure convergence of the Hutchinson operator to the attractor the affine transformations must be eventually contractive with regard to an underlying metric. The measure for evaluating the quality of a finite approximation to an attractor is independent of, and distinct from, any measure used in establishing convergence of the Hutchinson operator.

For process 1, the measure (e.g. FIG. 12) consists of a count of pixel points that differ between the target image and the FAA. To these ends, after the error count has been initialized to zero during operation 1401, a pixel pointer is set during step 1402 to the first point in the subimage being processed. The binary value of the subimage first point is compared during step 1403 to the binary value of the FAA first point. If the two values considered in operation 1403 have different values, as determined during operation 1404, an error counter in computer 26 is incremented by a count of one during step 1405. A determination is made during operation 1406 as to whether the last point in the subimage has been reached. Step 1406 is performed after step 1405 or after step 1404 indicates the two values compared in step 1403 are the same. If the last point in the subimage has not been reached, the subimage pointer is incremented during operation 1407 and operations 1403–1406 are repeated until the last subimage point has been processed. The program then returns to operation 550 where the measure is compared against the previous best measure.

Alternative measures, such as mean square distance of error points from the point to the boundary between 1's and 0's can be used instead of the process of FIG. 14 for process 1. In the rib X-ray analysis, the Hausdorff distance does not have sufficient ability to distinguish between fractally generated modes that are in error in a small number of boundary points. However, for other applications, the Hausdorff distance may be acceptable.

For process 2, entropy reduction is specified as the measure by the standard. The entropy reduction measure is evaluated by generating during operation 1451 an array containing the values of pixels of the Original Image in the subregion of region r corresponding to the Target Image; this array, referred to as the Test Original Image, is also stored in memory during operation 1451. Then, during operation 1452, a corresponding array containing pixel values in a Test Analysis Image is generated using the method of generating an Analysis Image from the specification as described in step 300. In operation 1452, the gray-scale values of elements of the Test Analysis Image corresponding to pixels on the perimeter of the Target Image obtained in step 5118 and comprising the solid line segments of FIG. 7F, are stored in memory for later use. The entropy of the pixel values of the Test Analysis Image is also obtained in operation 1452 by using methods known to those skilled in the art.

In operations 1453–1458, the FAA induces a change in a Test Original Image as described in detail below. Then, during operation 1459, a new Test Analysis Image is generated from the modified Test Original Image, and a measure of the entropy of the new Test Analysis Image is obtained. The measure equals the signed (i.e. polarity) difference between the entropy of the unmodified Test Analysis Image obtained in step 1452 and the entropy of the modified Test Analysis Image obtained in step 1459. In the preferred embodiment, the entropy reduction is used as the performance measure. However, it is evident that any functional relationship relating a set of pixel values to a single number could also be used. As an example, the functional relationship can be the sum of a positive contribution and a negative contribution, where the positive contribution is from the entropy reduction, as defined above, and the negative contribution is a function of the amount of data necessary to specify procedures used for inducing the entropy reduction.

Considering the above steps in greater detail, in step 1451, a Test Original Image (TOI) array containing elements corresponding to pixel values in the subset of the Original Image comprising region r is generated and stored in memory. Then during step 1452, pointers (m,n) are initialized to point to a first element of the array TOI, the TAI is obtained using steps described in connection with procedure 300 in which an analysis image is derived from an original image for process 2, the TAI is evaluated for entropy, and gray scale values of pixels in the TAI corresponding to the perimeter of the target image are stored. A determination is then made during step 1453 as to whether TOI(m,n) corresponds to an element in the FAA array, that is, a point in the subregion corresponding to the Target Image.

If TOI(m,n) corresponds to a point in FAA, operation 1454 tests whether the corresponding FAA array element is 0 or 1. If the corresponding element in FAA has a value of 1, element TOI (m,n) is incremented by the signed value d, operation 1455. That is, if d is positive, the element value is increased by d; if d is negative, the element value is decreased by the absolute magnitude of d. In step 1456, the current values of m, n and level d are stored in memory for later use. In step 1457, a determination is made as to whether this is the last element in the array TOI. If there are additional elements, the pointer is incremented in step 1458, and the process is continued for the new element. Alternatively, it is possible to store a description of the curve separating the 1's and 0's and the value of d to derive the set of (m,n,d)'s for later use.

After all elements of TOI have been processed, a corresponding Test Analysis Image (TAI) array is generated using the same procedures used in step 1452, operation 1459. During operation 1459, computer 26 computes a probability distribution of gray-scale values of elements in TAI corresponding to pixels in the subregion corresponding to the Target Image. The probability distribution is computed by determining the gray-scale value for each element in TAI in the subregion corresponding to the Target Image and then calculating the probability of each possible gray-scale value. In step 1460, the distribution is modified by changing the gray-scale value used in this calculation for elements on the perimeter of the subregion corresponding to the Target Image to the corresponding value stored in step 1452. Also in step 1460, entropy is calculated for the modified TAI. In step 1461, the entropy reduction measure is calculated as the difference between the entropies calculated in steps 1452 and 1460.

When the TAI entropy is calculated using standard methods, a contribution towards the entropy is calculated for each pixel, and the overall entropy is computed as the sum of the contributions. Pixels having gray-scale values with a low probability of occurrence contribute significantly to the entropy; pixels having gray-scale values with a high probability of occurrence contribute only slightly to the entropy. During operation 1455 the TOI is modified so certain elements have gray-scale values in TAI changed from a low probability of occurrence values to a high probability of occurrence values. As a result, each of these TAI elements contributes to a reduction in entropy.

When a pixel in TAI has a gray-scale value of d, the corresponding pixel in TOI has a prediction error of d, by definition. If a pixel in TOI is unchanged, but there is a change the average value of the predictors by d, the prediction error is changed by −d. The corresponding change in TAI involves changing the gray-scale value of the pixel from d to 0.

The loop comprising operations 1453–1458 changes the gray-scale value of a pixel in TAI only when the pixel or its predictor, but not both, is changed in TOI. Excluding, for the moment, points on the perimeter of the subregion corresponding to the Target Image, only boundary points between the 1's and 0's of the FAA have their corresponding points in TAI changed. Since this boundary is constructed in step 5117 as a curve extending through pixels in TAI having gray scale value d, these boundary points are, predominantly, pixels with a TAI gray-scale value of d. By the above argument, the gray-scale values in TAI for the pixels corresponding to the boundary between 1's and 0's in the FAA are shifted, in general, towards 0. Operations 1453–1458 reduce the entropy contributions of pixels along the curve.

This entropy reduction is effectively shifted to pixels on the perimeter of the subregion corresponding to the Target Image. The predictors for these perimeter pixels can be outside the subregion and thus not modified in the 1453–1458 loop. To adjust for this effect, in operation 1460, the gray scale values of perimeter pixels in TAI are artificially revalued to corresponding values therefor in the TAI derived from the unchanged TOI. These original values, stored in operation 1452, are retrieved and used in operation 1460. After the adjustment, the TAI no longer corresponds to any TOI. However, the original TOI is readily derived from the adjusted TAI and data stored in steps 1452 and 1456.

Then, during step 1461, entropy is calculated, using known procedures, from the modified gray-scale distribution obtained in step 1460. Upon completion of step 1461, control is returned to step 550, FIG. 8.

In step 550, the performance measure generated in operation 540 is compared to the current best performance measure to determine if the present FAA generates a new best performance measure. The specification defines if a better measure is high or low. If a new best is generated, control transfers to operation 555 when computer 26 or memory 32 stores the value of the new best performance measure, level value d, specifications sufficient to reproduce the FAA, and other data specified in the standard.

In step 570, a determination is made to detect if predefined criteria have been met to indicate a satisfactory performance measure has been achieved or that the sequence of performance measures so generated has converged to an acceptable limit. If the test is positive, the control transfers to step 590. If the test is negative, control transfers to operation 580 during which the variable values defining the Hutchinson operator are perturbed and then a new fractal model is generated in operation 520.

When a pixel value in TAI is reduced from d to 0, the entropy reduction is the difference between the entropy contribution associated with level d and the entropy contribution associated with level 0. Thus the entropy reduction is a function of the ratio of the entropy contribution for gray-scale levels d and 0. This ratio is directly related to the probabilities of gray-scale levels d and 0 occurring. The lower the relative probability of d compared to 0, the higher the entropy contributions ratio. Thus, if d has a high probability of occurrence relative to 0, there is a small reduction in entropy when the pixel is switched from d to 0; if d has a low probability of occurrence relative to 0, there is a large entropy reduction.

If multiple Target Images are processed, the cumulative entropy reduction is greater than the sum of the individual entropy reductions. Changing some pixels with gray-scale value d to value 0 in the first Target Image induces an entropy change and lowers the probable occurrence of d relative to 0. Thus, when a subsequent Target Image changes pixels with gray-scale value d to value 0, there is a larger entropy reduction per pixel changed.

When step 590 is reached, processing of a specific Target Image has been completed, and a test is conducted to determine if there are additional Target Images to be processed. If there are additional Target Images, step 595 stores appropriate pointers and array values, and control is transferred back to operation 515 with values in the most current TOI used as initial TOI values for the next loop. In this way, changes induced in the TAI by a Target Image are carried forward for processing the next Target Image to provide proper accounting of the improved entropy reduction. After all targets have been so processed, the final gray scale values of the TOI and TAI are stored in memory from step 555. The final TOI is used to derive an output representing the modified original image as described in step 700.

The variables for the standard rib X-ray subimage are perturbated by the method of FIG. 15, a flow diagram of details of step 580, FIG. 8. The general shape of the attractor is likely to be significantly more sensitive to the variable values in a particular subset A of the affine transformation independent variables than to the variable values in the remaining independent variables. For process 1, in the chest X-ray subimage, subset A includes the independent variables for the affine transformations of FIGS. 9C, 9D, 9E, 9F, and 9G which collectively define the block structure and position of the subimage attractor; the remaining affine transformations of FIGS. 9A and 9B define the texture and shape of the boundary between the black and white regions of the attractor, e.g., as illustrated in FIG. 7C. For process 2, in the chest X-ray subimage, subset A includes the independent variable for each of the two affine transformations which map to the side strips, and control the vertical position at the points (a) and (b) of FIG. 7F. These two independent variables assure that the boundary between the 1's and 0's aligns on the sides; the remaining independent variables control the shape of the curve between the sides.

The procedure of FIG. 15 perturbs the transformation variables in subset A to some predefined limits during Phase 1 and then perturbs the entire set of transformation variables using a second set of limits during Phase 2. For process 1, standard 1 of the chest X-ray image, approximations to the attractor are generated using K=500,000 points in Phase 1 and K=2,000,000 points in Phase 2; these values are set out in the chest X-ray catalog entry (Table I) in memory 28. At step 542 the procedures of steps 540 and 545 (FIG. 8) shown in detail in FIGS. 13 and 14, approximate the attractor with the appropriate value of K used in step 523. For process 2, standard 1 of the chest X-ray image, approximation to the attractor is generated using five iterations of the modified MRCM for Phase 1 and six iterations of the modified MRCM for Phase 2.

Within each of Phases 1 and 2, independent variable values are perturbed incrementally by the quantification level specified in the standard. Each variable value is perturbed in the negative direction until (1) the performance measure stops improving or (2) a predefined limit of incremental steps is reached. The variable is then perturbed in the positive direction. In the preferred embodiment, the maximum number of increment steps, C, of step 541 equals 4 for both Phases 1 and 2 of Process 1 and equals 2 for both Phases 1 and 2 of Process 2, as set out in the catalog entry.

After each perturbation the performance measure is calculated using the procedure of step 545, shown in detail in FIG. 14. When improvements to the performance measure are obtained, the new performance measure, variable values and position coordinates are recorded in memory 32.

To these ends, the first step 1501 in processing the transformation points of Phase 1 is set to a pointer in memory 32 to the first independent variable, i, to be processed. Initially, the perturbation direction is set during step 1502 in the negative direction. A step counter in memory 32 is then set to zero during step 1503. Independent variable i is then incremented by one step during operation 1504, after which the step counter is incremented by one during step 1505. A determination is then made during step 541 as to whether the maximum perturbation level has been reached by detecting whether the step counter has reached its maximum count, C.

At step 541, a check is made to determine if the count of the step counter is less than or equal to the counter maximum count C, and if independent variable i is in the unit interval [0,1]. If both conditions of step 541 are satisfied, step 542 is executed, wherein values of dependent variables are set according to the constraints set out in the catalog entry, a trial attractor is generated using the procedure of step 540, and a performance measure is generated using the procedure of step 545. During step 1511, a determination is made as to whether the performance measure of the trial attractor is an improvement over the previous best performance measure, where the catalog entry indicates whether the best performance measure has a higher or lower value. If the performance measure is an improvement, the new performance value is stored as the best measure for future comparison during operation 1511, the transformation values are stored as the model data corresponding to the best measure, and step 1504 is re-executed. If the performance measure is not an improvement, as determined at step 1511, no further testing is performed in the direction being executed and step 1506 is executed as described below.

If both conditions are not met at step 541, step 1506 is executed immediately after step 541.

In step 1506, the perturbation direction is tested. If the test at step 1506 indicates the perturbation direction is negative, the direction is reversed to positive at step 1507. Steps 1503, 1504, 1505 and 541 are then executed. If the test at step 1506 indicates a positive perturbation direction, the independent variable pointer is incremented by one during step 1508. If all the independent variables have not now been processed, as determined during step 1509, the program re-executes operations 1502, etc.

If operation 1509 indicates all variables of the processed Phase have been processed, a determination is made during operation 1512 as to whether Phase 1 or Phase 2 is being processed. If Phase 1 is being processed, the independent variables for Phase 2 are set during step 1513, after which operations 1502 etc. are performed for the Phase 2 independent variables. If Phase 2 has been completed, the program returns to step 520 to generate the fractal model.

The iterative procedure illustrated in FIG. 15 produces a monotonic and convergent sequence of performance measures. The resultant variable values define a local extreme performance measure with respect to incremental steps in the direction of each of the independent variables; however, there may be nearby sets of variable values with superior measures.

Modifications and refinements of the steps in the block diagram of FIG. 15 are possible. FIG. 16 is a flow diagram of a representative extension of the perturbation procedure resulting in identification of nearby points likely to have improved measures. The perturbation process of FIG. 15 is initially executed as described until it terminates. The extended perturbation procedure is then executed before control returns to step 520, FIG. 8. The initial perturbation steps of FIG. 15 establish a baseline set of independent variable values and a local optimum measure as described above.

The perturbation process of FIG. 15 is then rerun twice for each independent variable. In the first rerun for variable i (step 1601), the starting values are the same as the baseline values for all independent variables except for starting variable, i; the starting value of variable i is then decremented by one quantification level from the baseline by setting the perturbation direction negative during step 1602 and perturbing variable i by one incremental level during step 1603. If the resultant value for variable i is determined during step 1604 as being outside the unit interval, the evaluation is omitted; otherwise, the perturbation process of FIG. 15 is rerun at step 1605 with the modified initial values using the procedures of step 580.

The process assures revisiting of the point where the baseline local minimum was attained. The methods of generating the fractal model and evaluating the performance measure assure that the previously attained results are duplicated. In Process 1, the use of a predetermined pseudo random sequence assures this duplication; in Process 2, the modified MRCM method always generates the same results when the same transformation values are used. Hence the best measure for the rerun is better than or equal to the best measure of the baseline established by the steps of FIG. 15. In the second rerun, variable i is incremented one quantification level. This process is iterated during steps 1601–1611 wherein the independent variable values which produced the best measure of the previous iteration as recorded in step 1607, are used as the starting independent variable values for the next iteration. The iteration is terminated when step 1612 indicates no further improvement in the measure is detected. The monotonicity of the derived sequence of best measures assures that the procedure terminates in a finite number of steps.

Figure 17:
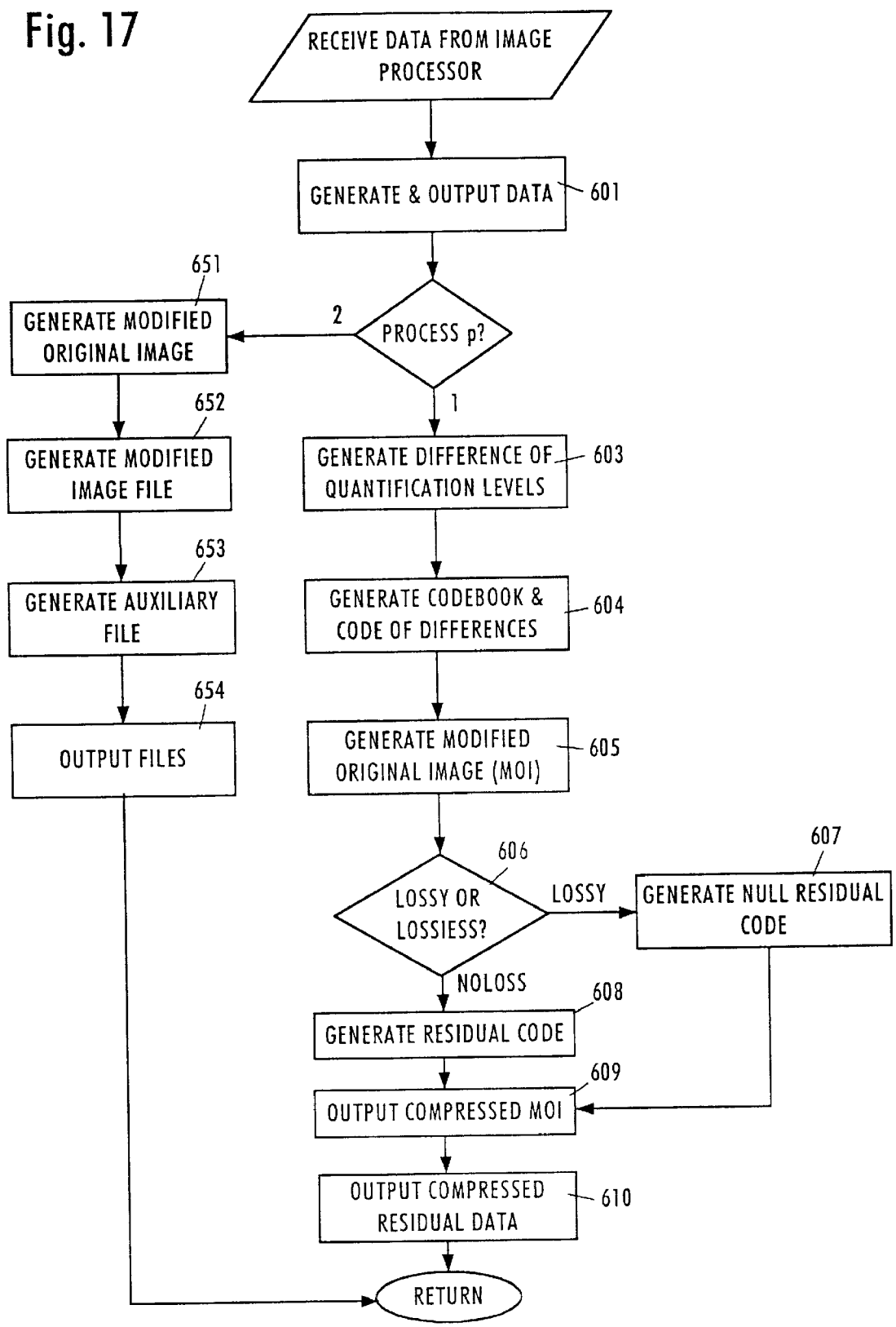
FIG. 17 is a flow diagram of how the output data from the image processor are processed.

FIG. 17 is a flow diagram of the output processing steps for outputs, as performed during step 600, FIG. 6. The outputs are set out in the catalog entry. In step 601, data are generated as specified by the catalog entry. These data include affine transformation values, measures, binary block position coordinates, and other data used as input for diagnostic and analytical apparatuses. Also in step 601, data generated in step 601 and specified in the catalog entry are converted to an output signal and passed to an output device such as transmitter 38 or output storage device 39.

For Process 1, an additional output signal, generated in steps 603–610, includes a coded representation of the Original Image pixel values and necessary specifications to decode the output signal, i.e., a compressed form of the Original Image. A coded representation of pixel values includes two parts: (1) a coded representation of a Modified Original Image, defined below in step 605, and (2) a coded representation of the data necessary to convert the Modified Original Image back to the Original Image. Parts (1) and (2), together, provide all necessary data to reconstruct an image and can be used as a "lossy" representation of the Original Image. To generate a "lossless" representation, coded values of residual pixels, defined as the difference between original pixel values and the Modified Original Image pixel values, are also generated.

Continuing the description of Process 1, for each subimage, independent variables are generated for each of plural gray-scale levels. These variables define the best realizable approximation using the methodology of the described embodiment. The independent variable values are restricted to a limited number of quantification levels as specified in the catalog entry. The range of gray-scale levels used for image compression and analysis can include all possible levels or a subset of the levels as determined by predefined criteria.

For each subimage and each independent variable, the quantified variable levels for the minimum gray-scale level are recorded and used as a baseline. The values for the next lower gray-scale level are retained as differences from the corresponding variable values at the lowest gray-scale level. The differences from one gray-scale level to the next are calculated for the range of gray-scale levels. The number of possible differences is one less than the number of possible gray-scale quantification levels as defined by the standard. Differences are derived for all subimages and the total number of occurrences for each possible difference is calculated. Differences from one gray-scale level to the next for a range of gray-scale levels in a representative subimage, for example between lines 501 and 502, are shown in FIG. 18.

Figure 19:
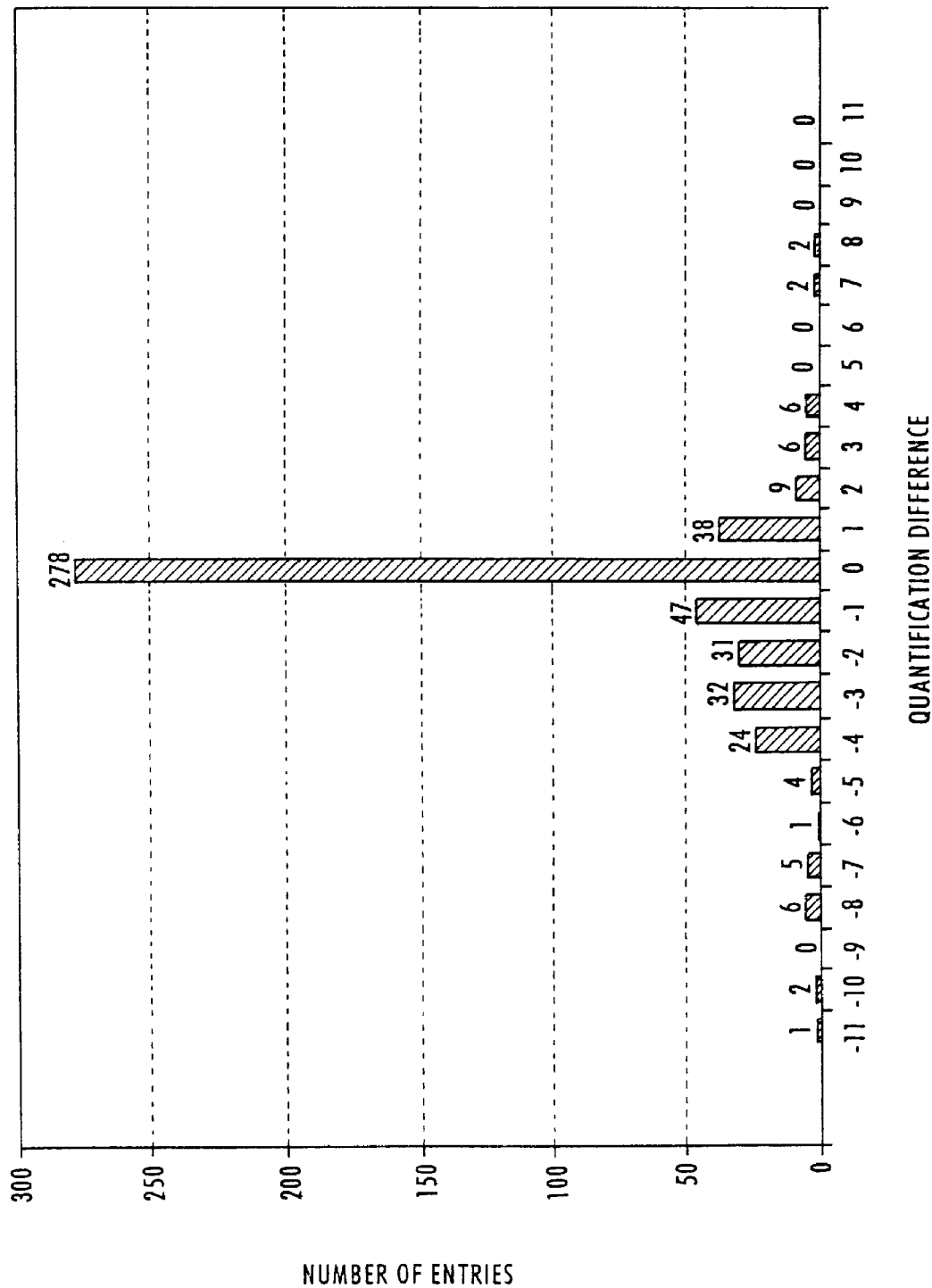
FIG. 19 is a histogram of quantification differences in variable values of FIG. 18.

In operation 603, the set of difference data is analyzed and a histogram is generated. A representative histogram, plotting the number of each difference value against the differences of FIG. 18, is shown in FIG. 19. In step 604, the histogram of FIG. 19 is used to generate a code book that is stored in memory 32 and enables efficient coding of the difference data. FIG. 20 is a Huffman code book stored in memory 32 for the histogram of FIG. 19. In the Huffman code book of FIG. 20, short strings of 0's and 1's are assigned for differences that frequently occur and longer strings of 0's and 1's for differences that occur less frequently. Procedures for generating code books are known to those skilled in the art. While a Huffman code book is used in the preferred embodiment, it is clear that other coding schemes, such as Arithmetic Coding, can be similarly used. The difference values are also coded using the code book during step 604.

During step 605, the coded subimages are cropped from the Original Image and replaced with constant value pixels to produce a Modified Original Image. The minimum gray-scale level quantification values, Huffman codes, position vectors, measure values and other data for each subimage are also stored in the computer storage system and/or transmitted to remote locations during step 605. The specifications of the standard are stored and/or transmitted as part of the header.

In step 606, a switch is set in response to an operator input. The switch state indicates if the final stored compressed image data are to be lossy (containing errors introduced by the fractal modeling) or lossless (enabling exact reproduction of the original image.) If the switch state set during step 606 indicates the final stored compressed image data are to be lossy, null residual data are generated in step 607. If the final stored compressed image data are to be lossless, residual compensation data are obtained in step 608 as the difference between the Original Image data and the Modified Original Image data.

In step 609, the Modified Original Image is compressed using standard JPEG lossless image compression techniques. The subimages removed from the original image are generally among the least correlated portions of the original image. Since compression techniques such as JPEG exploit correlation among nearby pixels, the removed subimages are among the least compressible portions of the original image. In consequence, compression ratios for the Modified Original Image are significantly improved over those obtained from the Original Image. While the preferred embodiment uses JPEG to compress the Modified Original Image, other compression techniques known to those skilled in the art may be utilized. Also during step 609, the compressed codes of the Modified Original Image are sent to computer memory 32 and/or to another location by transmitter 38 and/or to computer storage device 39.

During step 610, the residual data are compressed using standard JPEG compression techniques and stored/transmitted with data from step 609.

FIG. 18 is a chart of representative analytical data for a rib X-ray subimage, as derived during step 601, FIG. 17 for process 1. In this example, there are six bits of depth, i.e., $2^6=64$ gray-scale levels. Analytic data for binary block patterns of gray-scale levels 15–53 are shown; in these gray-scale levels, the standard (rib structure) is dominant, and the patterns are fractally modeled using the basic perturbation process of FIG. 15. Less than 2% of the model values differ from the original values. The number of points in error within the illustrated 13,100 point frame is given for each gray-scale level. Quantification values for level 15 of this example are derived from the initial independent variable values given in the specification of Table I. The quantification levels are multiplied by 0.005 to obtain the independent variable values.

The Huffman code book entry of FIG. 20 efficiently codes the differences with probabilities shown in the histogram of FIG. 19. If the quantification levels of the fractal coefficients were retained, levels 16–53 would require 38×13×8=3,952 bits of data. By coding incremental changes to the quantification levels using the code book of FIG. 20, the number of data bits is reduced by about 70% to 1,192 bits.

For Process 2 an additional output signal includes data sufficient to specify pixel values of a Modified Original Image and data sufficient to specify transformations to convert the pixel values in the Modified Original Image back to pixel values of the Original Image. To these ends, in step 651 gray scale values of pixels of a Modified Original Image corresponding to a subregion processed in step 500 are obtained from memory, having been stored in step 555. As detailed in connection with step 545, gray scale values for corresponding pixels in the Original Image are derived from gray scale values of the final Modified Original Image, the (m,n,d)'s stored in step 1546, or equivalent descriptors defining the fractal curves used to generate the (m,n,d)'s as described in step 1456, and the specifications of the subregions stored in step 5110.

In step 652, a Modified Image file is generated using the file specifications of the file containing the Original Image data. Pixels in the Modified Image are in a 1-1 relationship with pixels in the Original Image. Pixels in any processed subregion are determined in step 651. Pixels outside of a processed subregion have the same gray-scale value as the corresponding Pixels in the Original Image. Changes to pixel values in the Modified Image are best illustrated by comparing the prediction error matrix associated with the Modified Image, FIG. 20A, with the prediction error matrix associated with the Original Image, FIG. 7E.

In step 653, there is generated an auxiliary file containing data sufficient to obtain the Original Image pixel values from the Modified Image pixel values. These data include descriptions of the subregions as stored in step 5110, and for each region r and level d, specifications of the curves used to derive the Target Sets stored in step 5117.

In step 654 the Modified Image File and the Auxiliary File are sent to computer memory 32 and/or to another location by transmitter 38 and/or to computer storage device 39.

In the preferred embodiment the Modified Image File and the Auxiliary File are sent as separate files. Alternatively, the data from the Auxiliary File can be added to, and incorporated into the data in the Modified Image File with appropriate modifications made to a header of the Modified Image File.

Figure 21:
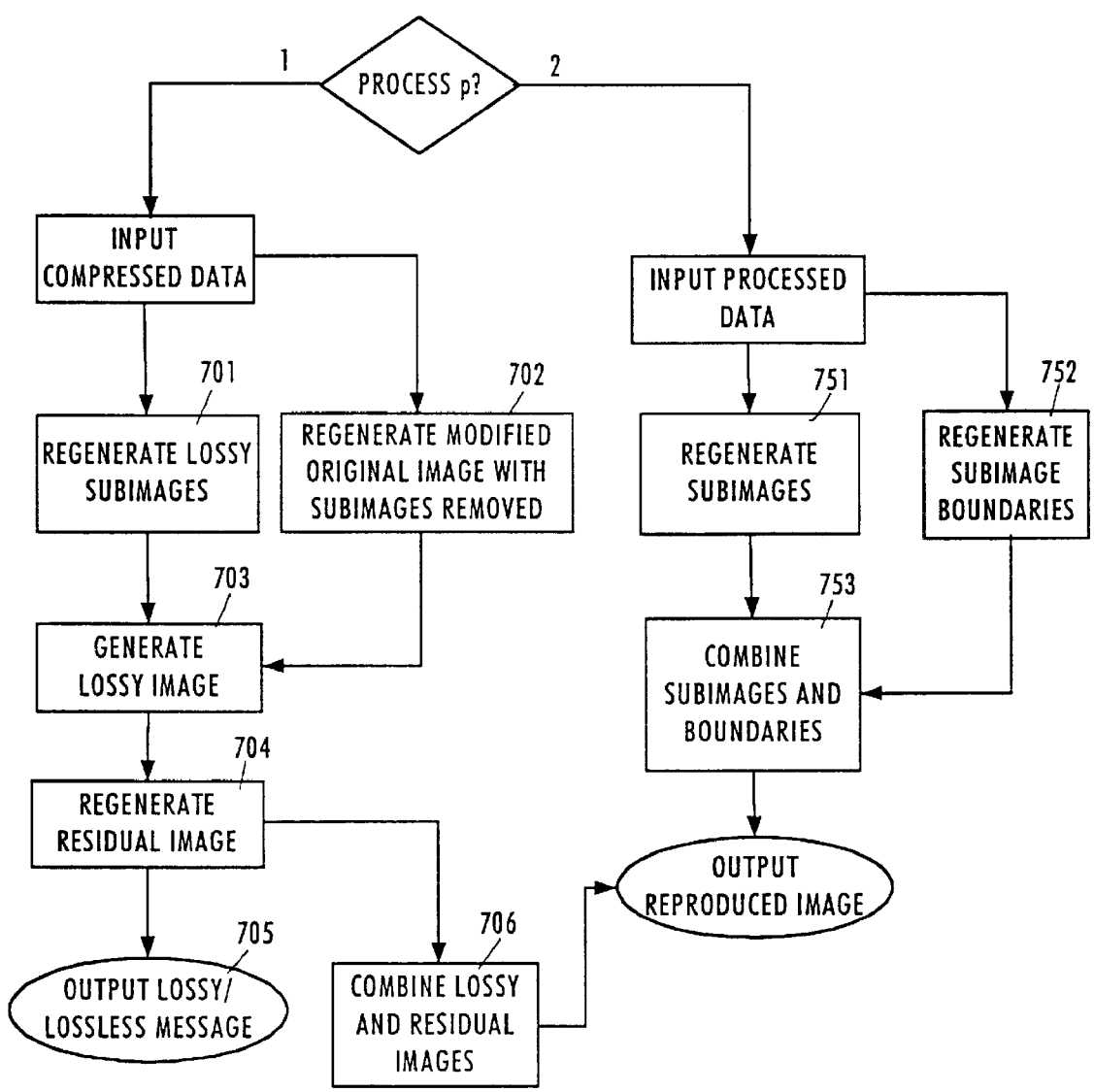
FIG. 21 is a flow diagram of how processed image data are processed.

FIG. 21 is a flow diagram of how reversible representations of data which have been retrieved from computer memory 32 or received from a transmitter, having been generated with process 1 or process 2, are reverse-processed.

For process 1, in step 701, the Huffman codes of FIG. 20 regenerate the difference values for each independent variable in each subimage. The difference values are combined with quantification values for the lowest gray-scale level to regenerate arrays of quantification values. From the quantification levels and the specifications of standards in Table I, the affine transformations defining the Hutchinson operators are generated. The approximation to the attractor image is reproduced by using a pre-defined algorithm for generating the preset pseudo-random number sequence. The approximations are mapped into the appropriate spatial frames per the standard specification.

The plural gray-scale levels are then combined to produce a single multiple gray-scale level image for the subimage. A collage of the subimages is generated by forming the union of the regenerated subimages. Conflicts may arise in two ways: (1) within a subimage the approximations to the attractors for various gray-scale levels may indicate conflicting intensity level values for a set of points; (2) differing subimages may indicate differing intensity levels for pixels in overlapping portions of the subimages. In both cases, the measure is used for conflict resolution. For Process 1 the measure is an indicator of error, and consequently an indicator of which parts of the compressed data are more reliable representations of the original image. During step 702, the modified original image, in which the structures were cropped out and replaced by constant values in step 605, is regenerated using standard techniques. Then, during step 703, pixel maps produced during steps 701 and 702 are combined to produce a resultant image which is a lossy copy of the original image. Then, during step 704, the compressed data of the residual image are decompressed using standard techniques. If a lossy option has been selected, there is a null residual image. After step 704, at step 705, the processor outputs a message indicating if the final image is lossy or lossless. In step 706, which also occurs after step 704, the decompressed lossy image and the decompressed residual image are combined using standard techniques to generate the final reproduced copy.

For process 2, an exact pixel-by-pixel representation of the original image is generated in steps 751–753.

In step 751, for interior pixels of each subimage, gray-scale values are derived from the following data included in the processed data: (1) gray-scale values of the Modified Original Image, (2) the (m,n,d)'s or equivalent descriptors defining the fractal curve used to generate the (m,n,d)'s, (3) the subimage specifications. The method for combining these data has been detailed in the description of step 545.

For each subimage, the corrected gray-scale values of pixels on the perimeter of the subimage are derived from the processed data as described in conjunction with step 1460; step 752.

The gray-scale values for interior pixels of the subimages derived in step 751 and the gray-scale values for perimeter pixels derived in step 752 are then combined in step 753 to form an array of gray-scale values exactly matching the original gray-scale values for pixels in the subimages. For any pixel not interior to or on the perimeter of any subimage processed in step 752, a gray-scale level equal to the gray-scale level for the corresponding pixel in the Modified Original Image is used.

In step 760, the reconstructed image is stored in memory 28, or supplied to video output 37, printer 36, or transmitter 38.

While there have been described and illustrated specific embodiments of the invention, it will be clear that variations in the details of the embodiments specifically illustrated and described may be made without departing from the true spirit and scope of the invention as defined in the appended claims.

TABLE I

Representative Catalog Entry
Catalog #: 1
Catalog Name: Multiple Gray-Scale Chest X-Ray
Catalog Specifications:
a) Subject matter: Chest X-Ray
b) Image Size: 14" × 17"
c) Number of pixels: M × N (e.g., 2048 × 2560)
d) Bits in depth of pixels: D (e.g., $2^8 = 256$)
e) Pixel data: Gray-Scale level
No. of quantification levels in unit interval: 201
No. of standards: 1
No. of processes: 2
Specification of standard #1:
a) Structure: Quadrilateral space defined by four ribs: the posterior segments of two adjacent approximately horizontal ribs, and the anterior segments of another two adjacent ribs, which angle obliquely. The lower ribs are included; the upper ribs are excluded.
b) Region: Quadrilateral set of pixels encompassing the structure.

| Specification of process #1: | Specification of process #2: |
|---|---|
| a) Applicable standards: 1 | a) Applicable standards: 1 |
| b) Binary Block Pattern:<br>  b.1) Standard 1.<br>  Rectangular frame with dimension P × Q. Boundary line extends from top to bottom of frame: black towards right side; white towards, left side. Boundary line in two distinct segments identified by discontinuity in curvature and/or spatial position and by height of segment. Segments are unequal in width, the larger segment being at the top of the frame. | b) Binary Block Pattern:<br>  b.1) Standard 1<br>  Binary pixel set is pixel set of quadrilateral region less portion of quadrilateral in which pattern of Analysis Image is obscured by overlapping ribs. Curve traversing pixel set running primarily from lower left to upper right. Pixels on and above and to left of curve in segment "1"; pixels below and to left of curve in segment "0". |
| c) Number of processing passes: 2 | c) Number of processing passes: 2 |
| d) Cycles for processing passes:<br>  d.1) Pass 1: 500,000<br>  d.2) Pass 2: 2,000,000. | d) Cycles for processing pass:<br>  d.1) Pass 1: 5<br>  d.2) Pass 2: 6 |
| e) Analysis Image: Binary Threshold Image. | e) Analysis Image: Predictor Image, up and to left predictor. |
| f) Binary Target Definition:<br>  f.1) Type: Threshold Cutoff<br>  f.2) No.: One per Gray-Scale Lvl per region. | f) Binary Target Definition:<br>  f.1) Type: Gray-Scale Isobar of Analysis Image.<br>  f.2) No.: Multiple per Gray-Scale Level per region. |
| g) Performance Measure Definition:<br>  g.1) Type: Point Count<br>  g.2) Initialization: high. | g) Performance Measure Definition:<br>  g.1) Type: Entropy Reduction<br>  g.2) Initialization: low. |
| i) No. affine transformations: 7 | i) No. affine transformations: 8 |
| j) Transformation Dependencies are a function of the image:<br>  $AX[1] = 0$ $CY[1] = 1.0$ $CX[2] = 0$<br>  $CY[2] = 0$ $AX[3] = 0$ $AY[3] = .25$<br>  $BX[3] = 1.0$ $BY[3] = 1.0$ $CY[3] = .25$<br>  $AY[4] = .75$ $BX[4] = AX[4]$ $BY[4] = 0$<br>  $CX[4] = 1.0$ $CY[4] = .75$ $BY[5] = 2*AY[5]$<br>  $CX[5] = AX[5]$ $CY[5] = 1.0 - AY[5]$<br>  $AX[6] = AX[5]$ $AY[6] = AY[5]$<br>  $BX[6] = BX[5]$ $BY[6] = 0$ $AY[7] = 0$<br>  $BX[7] = 1.0$ $BY[7] = 0$ $CX[7] = .7$<br>  $CY[7] = 1.0$ | j) Transformation Dependencies:<br>  Rectangular frame: vertical sides through extrema of Binary Block Pattern curve; top and bottom through top and bottom pixels in Binary Block quadrilateral. Frame partitioned into equal-width vertical strips. Each transformation constrained to map frame to unique strip without rotation, reflection or shear. |
| k) Initial Quantification levels of independent variables:<br>  $AY[1] = 71$ $BX[1] = 162$ $BY[1] = 32$<br>  $CX[1] = 55$ $AX[2] = 52$ $AY[2] = 11$<br>  $BX[2] = 1.98$ $BY[2] = 183$ $CX[3] = 145$<br>  $AX[4] = 106$ $AX[5] = 49$ $AY[5] = 49$<br>  $BX[5] = 172$ | k) Initial Quantification levels of independent variables:<br>  Image of frame within strip forced to align image of extrema of curve to point on curve in Binary Block Pattern. Quantified as specified. |
| l) Method of Generating FAA:<br>  l.1) Type: Predefined Pseudo-Random Sequence.<br>  l.2) Max Perturb. Steps: 4. | l) Method of Generating FAA:<br>  l.1) Type: Modified MRCM.<br>  l.2) Max Perturb. Steps: 2. |
| m) Output Data: Signal representing Image Compression Data, specifications of compression, feature information. | m) Output Data: Signal representing transformed image, specifications of transformation, feature information. |

TABLE I-continued

Representative Catalog Entry
Catalog #: 1
Catalog Name: Multiple Gray-Scale Chest X-Ray
Catalog Specifications:
a) Subject matter: Chest X-Ray
b) Image Size: 14" × 17"
c) Number of pixels: M × N (e.g., 2048 × 2560)
d) Bits in depth of pixels: D (e.g., $2^8 = 256$)
e) Pixel data: Gray-Scale level
No. of quantification levels in unit interval: 201
No. of standards: 1
No. of processes: 2
Specification of standard #1:
a) Structure: Quadrilateral space defined by four
ribs: the posterior segments of two adjacent
approximately horizontal ribs, and the anterior segments
of another two adjacent ribs, which angle obliquely. The
lower ribs are included; the upper ribs are excluded.
b) Region: Quadrilateral set of pixels encompassing
the structure.

| Specification of process #1: | Specification of process #2: |
|---|---|
| n) Map from Unit Square to Rectangular Frame: affine map g: $[0,1] \times [0,1] \to [0,P] \times [0,Q]$ translated to spatial location of rectangular frame of block pattern | n) Map from Unit Square to Rectangular Frame: affine map g: $[0,1] \times [0,1] \to [0,P] \times [0,Q]$ translated to spatial location of rectangular frame as defined in j) |

I claim:

1. A method of analyzing a matrix of pixel values representing an Analysis Image that is a function of pixel values representing an Original Image derived from an image source wherein the matrices representing the Analysis Image and the Original Image are either the same or different, comprising:

(1) selecting (a) a process applicable to a class of images of which the Original Image is member, and (b) specification information for the class of images of which the Original image is a member;

(2) deriving information from the pixel values of the Original Image, and generating a matrix of pixel values for a corresponding Analysis Image as indicated by the specification information selected in step (1);

(3) generating a set of binary images from data representing the Analysis Image data as indicated by the specification information selected in step (1);

(4) modeling the binary images of the set by using fractal geometry using specification information selected in step (1), each binary model being uniquely specified by (a) a set of independent affine transformation parameters, (b) relationships whereby the remaining parameters necessary to uniquely specify affine transformations are derived from the parameters specified in (a), (c) specifications obtained in step (1) and (d) other data derived from the pixel values of the Analysis Image; and (5) generating a signal containing information about the image source in response to the affine transformation parameters, specifications, and derived data obtained in step (4).

2. The method of claim 1 further comprising storing the data representation of the Original Image obtained in step (5) in memory.

3. The method of claim 1 further comprising transmitting the data representation of the Original Image obtained in step (5) to a local or remote site.

4. The method of claim 1 wherein the data representation is reversible and further comprising reconstructing the Original Image from the generated signal.

5. The method of claim 1 wherein the process and specific information are selected from a data library where they are stored.

6. The method of claim 5 further including updating the specification information in the data library.

7. The method of claim 5 wherein the data library is operated so the matrix of pixel values representing the Analysis Image is obtained from the matrix of pixel values representing the Original Image by reading a coded procedure stored in the data library.

8. The method of claim 5 wherein the data library is operated so at least one "standard" fractal-like form of the Analysis Image is read from a catalog.

9. The method of claim 8 wherein the data library is operated so the Analysis Image is segmented by a coded method according to locations of the fractal-like forms.

10. The method of claim 9 wherein the data library is operated so a set of binary images is obtained for each segment by the coded method.

11. The method of claim 5 wherein the data library is operated so models of the binary images are derived by a coded method.

12. The method of claim 5 wherein the data library is operated so a specification of output data is derived.

13. The method of claim 1 wherein the Original Image is a gray-scale level pixel representation of a predetermined type of image source and the Analysis Image is a difference image in which pixels of the Analysis Image spatially correspond to pixels in the Original Image, and further comprising assigning numeric values to each pixel in the interior of the Analysis Image as the gray-scale difference between the values of (a) said each pixel in the Original Image and (b) the weighted average gray-scale values of N pixels of the Original Image immediately adjacent, in directions 1 through N, said each pixel in the Original Image, where the directions 1 through N are not co-linear.

14. The method of claim 7 further comprising identifying subimages corresponding to entries of the catalog.

15. A method of processing data derived from an image source included in a predetermined class of images comprising deriving a matrix of pixel values representing an analysis image that is a function of pixel values representing an original image derived from the image source, generating a set of binary images from data representing the analysis image, modeling the binary images of the set by using fractal geometry, each binary model being uniquely specified by a set of independent affine transformation parameters and relationships whereby the remaining parameters necessary to uniquely specify affine transformations that may be derived, information for the class of images and data derived from the pixel values of the analysis image; and deriving a diagnostic indicator of the set of binary images by generating signals containing information about coordinates of the source image and the deviation of the source image from the modeled binary images uniquely specified by the affine transformation parameters, the information for the class of images and the data derived from the pixel values of the analysis image, the diagnostic indicator being a fractal dimensionality parameter of the set of binary images.

16. A method of processing data derived from an image source included in a predetermined class of images comprising deriving a matrix of pixel values representing an analysis image that is a function of pixel values representing an original image derived from the image source, generating a set of binary images from data representing the analysis image modeling the binary images of the set by using fractal geometry, each binary model being uniquely specified by a set of independent affine transformation parameters and relationships whereby the remaining parameters necessary to uniquely specify affine transformations that may be derived, information for the class of images and data derived from the pixel values of the analysis image; and generating a signal containing information about the source image from the modeled binary images uniquely specified by the affine transformation parameters, the information for the class of images and the data derived from the pixel values of the analysis image, the original image being a gray-scale level pixel representation of a predetermined type of image source and the analysis image being a difference image in which pixels of the analysis image spatially correspond to pixels in the original image, and further comprising assigning numeric values to each pixel in the interior of the analysis image as the gray-scale difference between the values of (a) said each pixel in the original image and (b) the weighted average gray-scale values of N pixels of the original image immediately adjacent, in directions 1 through N, said each pixel in the original image, where the directions 1 through N are not co-linear, where N is an integer greater than 1.

17. The method of claim 16 further comprising locating a boundary between different assigned numeric values in the Analysis Image, the boundary as a function of spatial locations of assigned numeric values having a common value.

18. The method of claim 17 further comprising defining the boundary by a small number of affine transformation parameters.

19. The method of claim 18 further comprising combining signals representing the affine transformation parameters and an indication of the boundary location to transform pixel values of the Original Image into the binary image models.

20. The method of claim 19 further comprising modifying the Original Image with each binary image model to reduce entropy of a prediction error distribution derived from the Original Image.

21. The method of claim 20 wherein entropy is reduced by changing in a predetermined direction all pixels of the Original Image on one side of the boundary by an amount equal to the common value from which the boundary of the Analysis Image is derived.

22. The method of claim 15 wherein pixel values in the Analysis Image are derived from the threshold cutoff values of corresponding pixels in the Original Image, and the set of binary images is derived from the Original Image by: generating at least one threshold cutoff binary image for each of multiple gray-scale levels of the Analysis Image, and modeling the at least one threshold cutoff binary image for each-gray-scale level by using fractal mathematics.

23. The method of claim 22 further including deriving information about the Original Image by generating signals representing affine transformations of each modeled cutoff binary image, a measure of similarity between the model and the Analysis Image, and spatial coordinates of the binary image.

24. The method of claim 15 wherein the Analysis Image differs from the Original Image and further including changing the amplitudes of features of the Original Image as a function of the Analysis Image, and generating a signal indicating the procedure for changing the amplitudes of features.

25. A computer memory for use with a computer analyzing a matrix of pixel values representing an analysis image that is a function of pixel values representing an original image derived from an image source, the matrices representing the analysis image and the original image being either the same or different, the computer memory storing signals causing the computer to:

(1) select (a) a process applicable to a class of images of which the original image is a member, and (b) specification information for the class of images of which the original image is a member;

(2) derive information from the pixel values of the original image, and generate a matrix of pixel values for a corresponding analysis image as indicated by the specification information selected in operation (1);

(3) generate a set of binary images from data representing the analysis image data as indicated by the specification information selected in operation (1);

(4) model the binary images of the set by using fractal geometry using specification information selected in operation (1), each binary model being uniquely specified by (a) a set of independent affine transformation parameters, (b) relationships whereby the remaining parameters necessary to uniquely specify affine transformations are derived from the parameters specified in (a), (c) specifications obtained in operation (1) and (d) other data derived from the pixel values of the analysis image; and (5) generate a signal containing information about the image source in response to the affine transformation parameters, specifications, and derived data obtained in operation (4).

26. The memory of claim 25 wherein the data representation is reversible and the memory stores signals to cause the computer to reconstruct the original image from the generated signal.

27. The memory of claim 25 wherein the memory stores signals to cause the computer to store in the memory further signals indicative of: (a) the original image as a gray-scale level pixel representation of a predetermined type of image source and (b) the analysis image as a difference image in which pixels of the analysis image spatially correspond to pixels in the original image; and the memory stores signals causing the computer to assign numeric values to each pixel in the interior of the analysis image as the gray-scale difference between the values of (a) said each pixel in the original image and (b) the weighted average gray-scale values of N pixels of the original image immediately adjacent, in directions 1 through N, of said each pixel in the original image, where the directions 1 through N are not co-linear.

28. A computer memory for use with a computer that processes data derived from an image source included in a predetermined class of images, the computer memory storing signals for causing the computer to:

(1) derive and store a matrix of pixel values representing an analysis image that is a function of pixel values representing an original image derived from the image source, (2) generate a set of binary images from data representing the analysis image, (3) model the binary images of the set by using fractal geometry, each binary model being uniquely specified by a set of independent affine transformation parameters and relationships whereby the remaining parameters necessary to uniquely specify affine transformations may be derived, information for the class of images and data derived from the pixel values of the analysis image; and (4) derive a diagnostic indicator of the set of binary images by generating signals containing information about coordinates of the source image and the deviation of the source image from the modeled binary images uniquely specified by the affine transformation parameters, the information for the class of images and the data derived from the pixel values of the analysis images, the diagnostic indicator being a fractal dimensionality parameter of the set of binary images.

29. A computer memory for use with a computer that processes data derived from an image source included in a predetermined class of images, the computer memory storing signals for causing the computer to:

(1) derive and store a matrix of pixel values representing an analysis image that is a function of pixel values representing an original image derived from the image source, (2) generate a set of binary images from data representing the analysis image, (3) model the binary images of the set by using fractal geometry, each binary model being uniquely specified by a set of independent affine transformation parameters and relationships whereby the remaining parameters necessary to uniquely specify affine transformations may be derived, information for the class of images and data derived from the pixel values of the analysis image; and (4) generate a signal containing information about the source image from the modeled binary images uniquely specified by the affine transformation parameters, the information for the class of images and the data derived from the pixel values of the analysis image, the original image being a gray-scale level pixel representation of a predetermined type of image source and the analysis image being a difference image in which pixels of the analysis image spatially correspond to pixels in the original image, and the memory storing further signals causing the computer to assign and store in the memory numeric values to each pixel in the interior of the analysis image as the gray-scale difference between the values of (a) said each pixel in the original image and (b) the weighted average gray-scale value of N pixels of the original immediately adjacent image, in direction 1 though N, of said each pixel in the original image, where the direction 1 through N are co-linear, where N is an integer greater than 1.

30. The memory of claim 29 wherein the memory stores additional signals causing the computer to locate a boundary between different assigned numeric values in the analysis image, the boundary as a function of spatial locations of assigned numeric values having a common value.

31. The memory of claim 30 wherein the memory stores other signals causing the computer to define the boundary by a small number of affine transformation parameters.

32. The memory of claim 31 wherein the memory stores additional signals causing the computer to combine signals representing the affine transformation parameters and an indication of the boundary location to transform pixel values of the original image into the binary image models.

33. The memory of claim 32 wherein the memory stores added signals causing the computer to modify the original image with each binary image model to reduce entropy of a prediction error distribution derived from the original image.

34. The memory of claim 33 wherein the memory stores still further signals causing the computer to reduce entropy by changing in a predetermined direction all pixels of the original image on one side of the boundary by an amount equal to the common value from which the boundary of the analysis image is derived.

35. The memory of claim 28 wherein the memory stores other signals causing the computer to derive pixel values in the analysis image from the threshold cutoff values of corresponding pixels in the original image, and derive the set of binary images from the original image by: generating at least one threshold cutoff binary image for each of multiple gray-scale levels of the analysis image, and model the at least one threshold cutoff binary image for each gray-scale level by using fractal mathematics.

36. The memory of claim 35 wherein the memory stores additional signals causing the computer to derive information about the original image by generating signals representing affine transformations of each modeled cutoff binary image, a measure of similarity between the model and the analysis image, and spatial coordinates of the binary image.

37. The memory of claim 28 wherein the analysis image differs from the original image and the memory stores added signals causing the computer to change the amplitudes of features of the original image as a function of the analysis image, and generate a signal indicating the procedure for changing the amplitudes of features. the interior of the analysis image as the gray-scale difference between the values of (a) said each pixel in the original image and (b) the weighted average gray-scale values of N pixels of the original immediately adjacent image, in directions 1 through N, of said each pixel in the original image, where the directions 1 through N are not co-linear, where N is an integer greater than 1.

38. The method of claim 15 wherein the diagnostic indicator provides a measure of lacunarity of the set of binary images.

39. The method of claim 15 wherein the diagnostic indicator is a texture analysis of the set of binary images.

40. The memory of claim 28 wherein the diagnostic indicator provides a measure of lacunarity of the set of binary images.

41. The memory of claim 28 wherein the diagnostic indicator is a texture analysis of the set of binary images.

* * * * *